United States Patent [19]
Brayton et al.

[11] Patent Number: 5,623,628
[45] Date of Patent: Apr. 22, 1997

[54] COMPUTER SYSTEM AND METHOD FOR MAINTAINING MEMORY CONSISTENCY IN A PIPELINED, NON-BLOCKING CACHING BUS REQUEST QUEUE

[75] Inventors: James M. Brayton; Michael W. Rhodehamel; Nitin V. Sarangdhar, all of Beaverton; Glenn J. Hinton, Portland, all of Oreg.

[73] Assignee: Intel Corporation, Santa Clara, Calif.

[21] Appl. No.: 205,040

[22] Filed: Mar. 2, 1994

[51] Int. Cl.[6] .................................................. G06F 12/00
[52] U.S. Cl. ..................... 395/468; 395/444; 395/446; 395/449; 395/471; 395/473; 395/483; 395/859; 395/861; 364/DIG. 1
[58] Field of Search ................................. 395/449, 427, 395/444, 446, 468, 473, 483, 859, 861

[56] References Cited

U.S. PATENT DOCUMENTS

| | | | |
|---|---|---|---|
| 5,193,163 | 3/1993 | Sanders et al. | 395/449 |
| 5,261,071 | 11/1993 | Lyon | 395/449 |
| 5,283,890 | 2/1994 | Petolino, Jr. et al. | 395/449 |
| 5,317,720 | 5/1994 | Stamm et al. | 395/449 |

OTHER PUBLICATIONS

"The Metaflow Architecture", pp. 10–13 and 63–73, by Val Popescu, Merle Schultz, John Spracklen, Gary Gibson, Bruce Lightner, and David Isaman, IEEE Micro, 1991.
GB 1555300 A (IBM), by Eugene Joseph Annunziata, Robert Sidney James and Kwang Gun Tan.
GM 1313530 A (IBM) by Philip Simon Dauber Russell John Robelen and John Randolph Wierzbicki.
"Supersalar Microprocessor Design" by Mike Johnson, Advanced Micro Devices, Prentice Hall, 1991. P6S 1–287.

*Primary Examiner*—Frank J. Asta
*Attorney, Agent, or Firm*—Blakely, Sokoloff, Taylor & Zafman

[57] ABSTRACT

A computer system, and a method performed by it, having a mechanism for ensuring consistency of data among various level(s) of caching in a multi-level hierarchical memory system. The cache consistency mechanism includes an external bus request queue which and associated mechanism, which cooperate to monitor and control the issuance of data requests, such as read requests and write requests, onto an external bus. The computer system includes one or more CPUs each having this consistency mechanism.

13 Claims, 26 Drawing Sheets

5,623,628

COMPUTER SYSTEM AND METHOD FOR MAINTAINING MEMORY CONSISTENCY IN A PIPELINED, NON-BLOCKING CACHING BUS REQUEST QUEUE

FIELD OF THE INVENTION

The present invention relates generally to computer systems, and more specifically to computer systems having multiple levels of hierarchical memories which must be maintained consistent.

BACKGROUND OF THE INVENTION

Computer systems may include multiple levels of memories arranged in a hierarchical manner. For example, a computer may include a main random access memory (RAM), and a central processing unit (CPU) which includes one or more levels of cache memory. Each level of cache is generally faster and smaller than the level above it, but more expensive, either in terms of dollars or silicon area. Caches are provided to enhance the execution speed of an executing program in a manner transparent to the program. Each cache is used to hold valid data logically viewed by the program 1o reside in RAM, for faster access by the CPU. Such a system may include a level one (L1) cache which may advantageously be located within the CPU, and may further include a level two (L2) cache which may be located within the CPU as an on-chip or off-chip memory, and may further include a level three (L3) cache which would more typically be located on the motherboard. Other configurations are, of course, possible.

Because the same logical data are represented at physically distinct locations in perhaps one or more levels of cache, and because a given logical datum may be written to those various levels at distinct times, there is a need for maintaining logical coherency or consistency between the levels of memory.

Advanced computer systems may include a plurality, of agents which are capable of reading and/or writing to memory. This complicates the cache consistency requirement. Such agents may include various entities within a single CPU. They may also include a plurality of CPUs in a single system. Or, they may include other types of agents such as direct memory access (DMA) controllers or the like.

In such a system, the various caches may be coupled to various combinations of buses. It is desirable that the various agents access the caches over these bus(es) in a non-blocking manner, to enhance system performance.

What is desired is an improved such system and method for maintaining cache consistency for non-blocking, multi-level caching. This is particularly desirable in a system which has any or all of the following characteristics: out-of-order instruction processing, speculative execution of instructions especially those involving bus requests, deep bus pipelining, support of self-modifying code, code and data cache fetching independence, L2 cache integration, and multi-level internal caching.

SUMMARY AND OBJECTS OF THE INVENTION

A computer system, and a method performed by it, having a mechanism for ensuring consistency of data among various level(s) of caching in a multi-level hierarchical memory system. The cache consistency mechanism includes an external bus request queue which and associated mechanism, which cooperate to monitor and control the issuance of data requests, such as read requests and write requests, onto an external bus. The computer system includes one or more CPUs each having this consistency mechanism.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
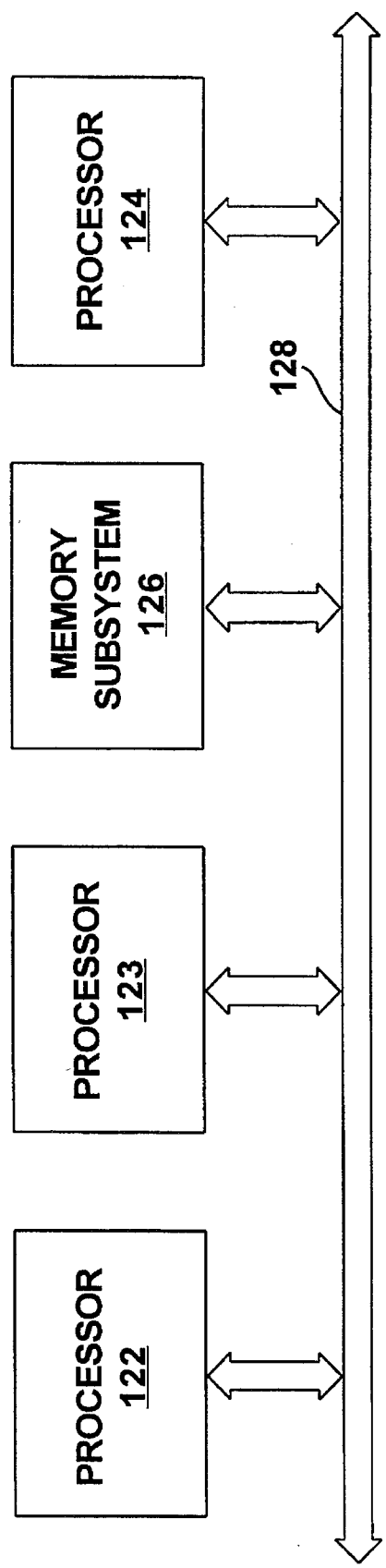
FIG. 1 illustrates a multiprocessor computer system comprising a set of processors and a memory subsystem.

FIG. 1 illustrates a multiprocessor computer system 120. The multiprocessor computer system 120 comprises a set of processors 122–124, and a memory subsystem 126. The processors 122–124 and the memory subsystem 126 communicate over a multiprocessor bus 128.

Each processor 122–124 fetches a stream of macro instructions from the memory subsystem 126 over the multiprocessor bus 128. Each processor 122–124 executes the corresponding stream of macro instructions and maintains data storage in the memory subsystem 126.

Figure 2:
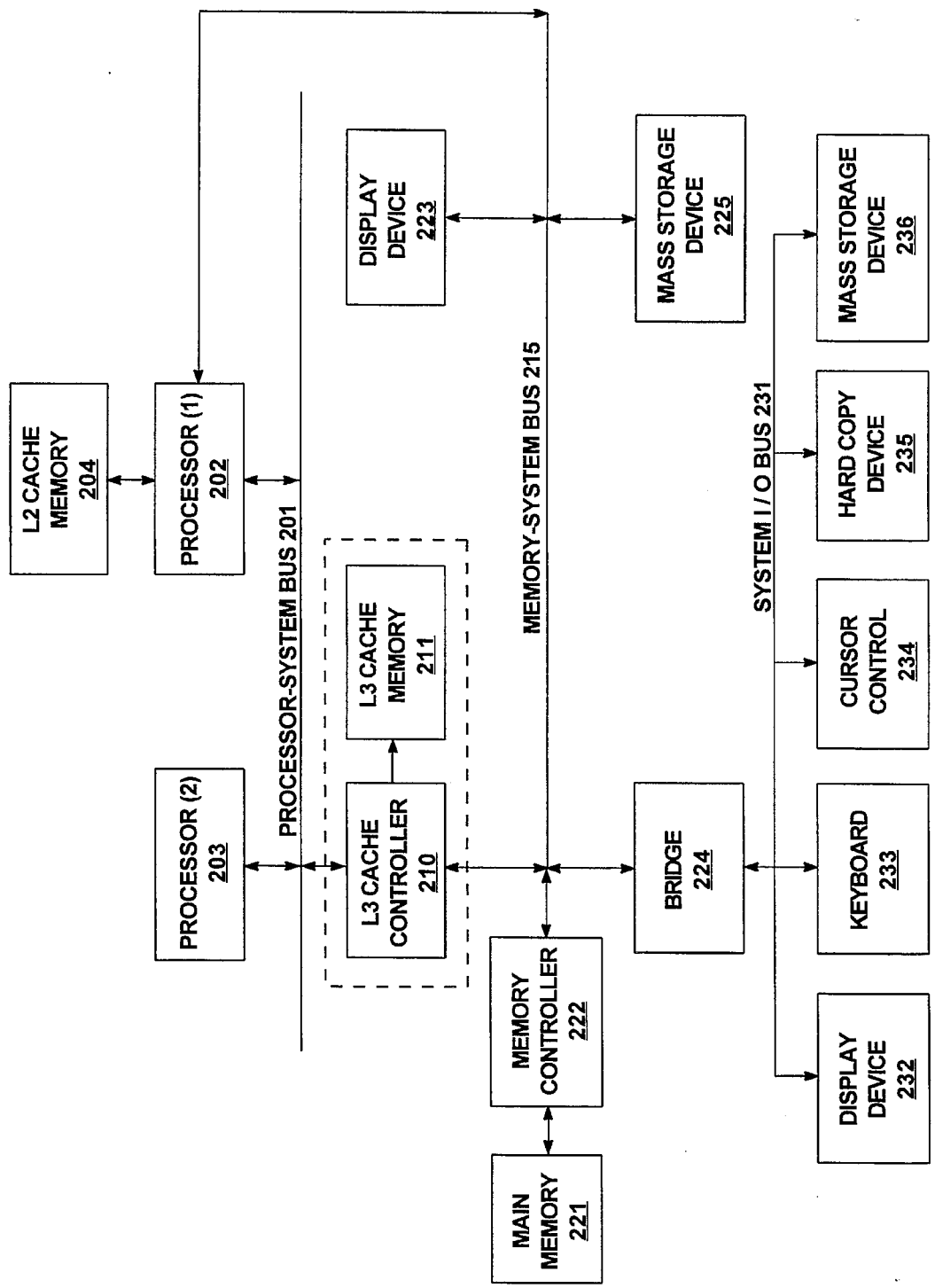
FIG. 2 shows an overview of a multiprocessor computer system upon which the present invention may be practiced.

FIG. 2 shows an overview of a multiprocessor computer system upon which the present invention may be practiced. The computer system generally comprises a processor-system bus or other communication means 201 for communicating information between one or more processors 202 and 203. Processor-system bus 201 includes address, data and control buses. As described above, processors 202 and 203 may include a small, extremely fast internal cache memory, commonly referred to as a level one (L1) cache memory for temporarily storing data and instructions on-chip. In addition, a bigger, slower level two (L2) cache memory 204 can be coupled to processor 202 for temporarily storing data and instructions for use by processor 202. In the currently preferred embodiment, the L1 and L2 cache memories are included in the same chip package as processor 202.

Also coupled to processor-system bus 201 is processor 203 for processing information in conjunction with processor 202. Processor 203 may comprise a parallel processor, such as a processor similar to or the same as processor 202. Alternatively, processor 203 may comprise a co-processor, such as a digital signal processor. Furthermore, a level three (L3) cache memory 211 for temporarily storing data and instructions for use by other devices in the computer system (e.g., processor 202, processor 203, etc.) and a L3 cache controller 210 for controlling access to L3 cache memory 211 may also be coupled to processor-system bus 201. The L3 cache controller 210 is also coupled to memory-system bus 215.

A memory-system bus or other communication means 215 for communicating information is coupled to processor 202 for providing processor 202 and other devices in the computer system access to the memory and input/output (I/O) subsystems. A memory controller 222 is coupled with memory-system bus 215 for controlling access to a random access memory (RAM) or other dynamic storage device 221 (commonly referred to as a main memory) for storing information and instructions for processor 202 and processor 203. Memory controller 212 maintains the order of read and write operations based on specific rules described in detail below. A mass data storage device 225, such as a magnetic disk and disk drive, for storing information and instructions, and a display device 223, such as a cathode ray tube (CRT), liquid crystal display (LCD), etc., for displaying information to the computer user are coupled to memory-system bus 215.

An input/output (I/O) bridge 224 is coupled to memory-system bus 215 and I/O bus 231 to provide a communication path or gateway for devices on either memory-system bus 215 or I/O bus 231 to access or transfer data between devices on the other bus. Essentially, bridge 224 is an interface between the system I/O bus 231 and the memory-system bus 215. Specifically, bridge 224 turns the byte/word/dword data transfer traffic from I/O bus 231 into line size traffic on memory-system bus 215.

I/O bus 231 communicates information between devices in the computer system. Devices that may be coupled to system bus 231 include a display device 232, such as a cathode ray tube, liquid crystal display, etc., an alphanumeric input device 233 including alphanumeric and other keys, etc., for communicating information and command selections to other devices in the computer system (e.g., processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system bus 231.

Of course, certain implementations and uses of the present invention may not require nor include all of the above components. For example, in certain implementations, the L3 cache controller and L3 cache memory may not be required. In such implementations processor 202 and 203 will reside directly on a memory-system bus 215. In other implementations, it may not be required to provide a display device for displaying information. Certain implementations of the present invention may include additional processors or other components.

Figure 3:
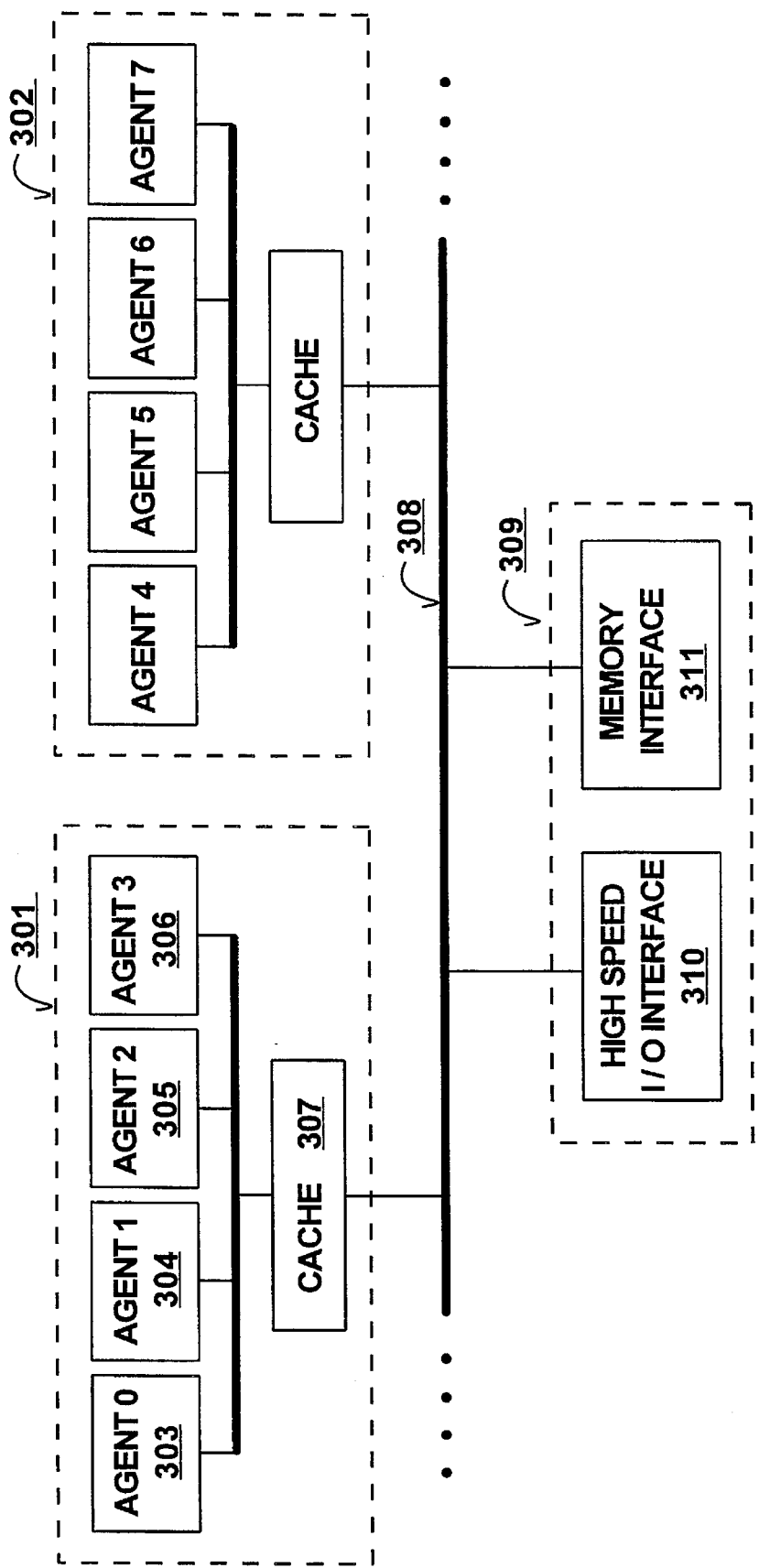
FIG. 3 is a block diagram showing a bus cluster system upon which the present invention may be practiced.

FIG. 3 is a block diagram showing a bus cluster system upon which the present invention may be practiced. The present invention can apply to multiprocessor computer systems having one or more clusters of agents. FIG. 3 shows two such clusters 301 and 302. Each of these clusters are comprised of any number of agents. For example, cluster 301 is comprised of four agents 303–306 and a cache 307. Agents 303–306 can include other microprocessors, co-processors, digital signal processors, direct memory access (DMA) controllers, input/output (I/O) devices, I/O bridges, network devices/controllers, separate caches with or without corresponding processors, etc. In short, an agent can be any device that can perform either loads or stores. Cache 307 is shared between these four agents 303–306. Each cluster is coupled to a system bus 308. These clusters 301–302 are coupled to various other components of the computer system through a system interface 309. The system interface 309 includes a high speed I/O interface 310 for interfacing the computer system to the outside world and a memory interface 311 which provides access to a main memory, such as a DRAM memory array.

In the present invention, processor ordering is inherently assumed by existing software written for most processor system architectures. Support for processor ordering implies that stores generated by any processor in the system are observed in the same order by all processors of the system. In other words, the order of the stores must be maintained. Source codes requiring a producer/consumer relationship depend on this support to ensure proper functionality.

For example, assume that processor 303 is a producer of information and processor 304 is a consumer of that information being generated by processor 303. The code sequences for both the producer and consumer processors are given as follows:

| Producer | Consumer |
|---|---|
| W1: store data to address X | R1: while flag = 0; loop a1 |
| W2: store 1 to flag | R2: load data from address X |

Consequently, the producer processor 303 performs a write, operation W2 of data to address X, followed by a second write operation W2 to set the flag to a "1", thereby indicating that the data in address X is valid. Meanwhile, the consumer processor 304 continuously performs a read operation R2 to determine whether the flag has been set to a "1". This R2 read operation is continuously performed until the flag is set to a "1" (by producer processor 303). Once the flag is observed to have been set (e.g., "1"), the consumer processor 304 performs a read operation R2 to load the data from address X. In order for this piece of code to be successfully executed in the multiprocessor system, the order in which W1 and W2 are written by the producer processor 303 should be the same order in which R1 and R2 appear to be updated to the consumer processor 304.

In the present invention, performance is maximized by implementing speculative processor ordering while preventing processor ordering violations. In the currently preferred embodiment, stores remain in order and are consistent. However, loads are allowed to pass other loads. Store instructions are retired immediately and remain in the store buffer, since retirement does not require a cache/memory access. These stores, known as "senior" stores are executed to memory in the background. The contents of the cache/memory system remain unchanged.

While two consecutive stores (i.e., W1 and W2) have retired in the senior store buffer, the existence of the stores is visible only to the producer processor and not to any consumer processors. If the producer processor reads from the same address locations, it is forwarded to the core directly from the store buffer. This mechanism is known as "store forwarding." Note that this mechanism maintains processor ordering of the processor with respect to its own writes. At this time, if any consumer processor in the system reads from the two locations, neither will reflect the effect of the two stores. This ensures that the processor ordering is maintained for the two writes with respect to all other processors. The senior stores so retired, exit the store buffer one at a time. This causes a memory system update. Hence, the W1 store is guaranteed to be the first to exit the senior store buffer. Since no subsequent store is allowed to exit the senior store buffer unit the system memory is assured to be updated.

When a load passes another load (e.g., speculative load operations), the load buffer snoops the stores from other processors. If an external store conflicts with a load that has already been completed with an earlier load that is still outstanding, this indicates the detection of a violation. In one embodiment, a load is considered to be outstanding if it has not yet been loaded from memory. In an alternative embodiment, outstanding means that memory has been accessed, but the load has not been retired yet. In this alternative embodiment, false violations may occur. This does not hinder correctness, but impacts performance. The illegal load and all subsequent micro-operations (microcode including source fields, destination, immediates, and flags) are aborted. The sequence is then restarted at the load that initiated the abort condition. By redispatching the load at a later time, the correct data is read.

An example is now offered to demonstrate the processor ordering operation with regards to the read/write sequence (R1, R2, W1, and W2) for the producer processor 303 and consumer processor 304 described above. Assume that the load R2 is speculatively processed before that of the prior load R1, thereby resulting in a processor ordering violation. This violation is detected when the store W2 causes a snoop hit on the already completed load R2 while load R1 is still outstanding. When the violation is detected, it is corrected by aborting load R2. In addition, all subsequent speculative states are cleared. Later, the load R2 is redispatched. It accesses the valid data at that time.

Figure 4:
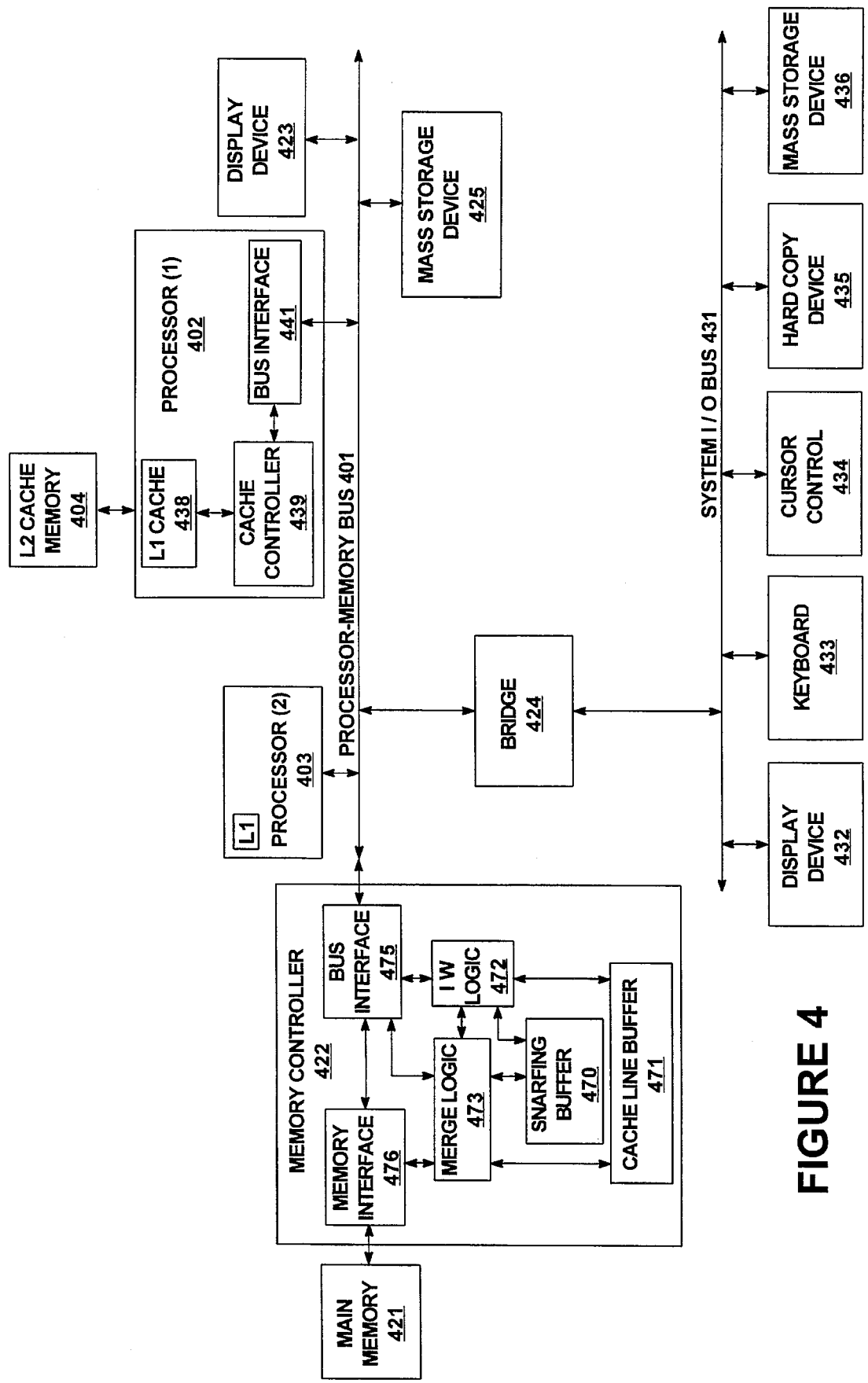
FIG. 4 shows an overview of a multiprocessor computer system of the present invention.

FIG. 4 shows an overview of an example multiprocessor computer system of the present invention. The computer system generally comprises a processor-memory bus or other communication means 401 for communicating information between one or more processors 402 and 403. Processor-system bus 401 includes address, data and control buses. Processors 402 and 403 may include a small, extremely fast internal cache memory, commonly referred to as a level one (L1) cache memory for temporarily storing data and instructions on-chip. In addition, a bigger, slower level two (L2) cache memory 404 can be coupled to processor 402 for temporarily storing data and instructions for use by processor 402. In one embodiment, processors 402 and 403 are Intel® architecture compatible microprocessors; however, the present invention may utilize any type of microprocessor, including different types of processors.

Also coupled to processor-memory bus 401 is processor 403 for processing information in conjunction with processor 402. Processor 403 may comprise a parallel processor, such as a processor similar to or the same as processor 402. Alternatively, processor 403 may comprise a co-processor, such as a digital signal processor. The processor-memory bus 401 provides system access to the memory and input/output (I/O) subsystems. A memory controller 422 is coupled with processor-memory bus 401 for controlling access to a random access memory (RAM) or other dynamic storage device 421 (commonly referred to as a main memory) for storing information and instructions for processor 402 and processor 403. Memory controller 422 maintains a strong order of read and write operations. A mass data storage device 425, such as a magnetic disk and disk drive, for storing information and instructions, and a display device 423, such as a cathode ray robe (CRT), liquid crystal display (LCD), etc., for displaying information to the computer user are coupled to processor-memory bus 401.

In one embodiment memory controller 422 contains a snarling buffer 470, cache line buffer 471, implicit writeback (1W) logic 472 and merge logic 473. Snarfing buffer 470 is a temporary data buffer for storage of data "snarled" off the bus. Cache line buffer 471 is a temporary data buffer used for storing Implicit Writeback Data Transfer data taken off the bus. In one embodiment, IW logic 472 stores data received from the bus into either snarfing buffer 470 or cache line buffer 471, depending on the source of the data. In an alternate embodiment, IW logic 472 transfers the data directly to main memory without storing the data in a temporary buffer. IW logic 472 may also issue an implicit writeback response onto the bus, depending on the request and whether memory controller 422 will be transferring data to satisfy the request. In one mode, IW logic 472 is coupled to the bus through a bus interface 475, which takes data off the bus and places data onto the bus.

Merge logic 473 merges the data in snarfing buffer 470 and cache line buffer 471 together, then stores the cache line in main memory 421. In one mode, merge logic 473 stores the cache line in main memory 421 via a memory interface 476. In one embodiment, snarfing buffer 470 and cache line buffer 471 represent multiple buffers. That is, memory controller 422 contains multiple snarfing buffers and multiple cache line buffers. Additional buffers have not been shown so as not to clutter the drawings.

Memory controller 422's use of snarfing buffer 470, cache line buffer 471, IW logic 472, and merge logic 473 in the present invention is discussed in more detail below. The transferring of data between memory controller 422 and the bus and between memory controller 422 and main memory 421 will be understood by one skilled in the art, and thus will not be described further.

In an alternate embodiment, snarfing buffer 470, cache line buffer 471, IW logic 472, and merge logic 473 are included in other agent(s) on the bus. For example, processors 402 or 403 of FIG. 4 may include this additional logic, snarfing data off the bus and merging it to store in file agent's internal memory. In one mode, processors 402 and 403 include a temporary storage buffer for storing the merged data line; thus, a subsequent request for the same data line can be satisfied directly from the temporary storage buffer rather than memory. In another mode, agents store the merged cache line in an L2 cache memory, such as L2 cache memory 404 of FIG. 4.

In one embodiment, processor 402 also includes a L1 cache memory 438 coupled to a cache controller 439. In one mode, cache controller 439 asserts signals on processor-memory bus 401 and receives signals on bus 401 through bus interface 441. Cache controller 439 checks requests on bus 401 to determine whether cache memory 438 contains a copy of the requested cache line by checking the state of the cache line as described below. Cache controller 439 may assert a HIT# signal or a HITM# signal, depending on the state of the cache line, as discussed below. In one mode, cache controller 439 transfers the cache line in cache memory 438 to bus 401 when it asserts a HITM# signal in response to the request. In one embodiment, cache controller 439 places the cache line onto processor-memory bus 401 through bus interface 441. The issuing of signals and transferring of data to and from bus 401 by cache controller 439 will be understood by one skilled in the art, and thus will not be described further.

In an alternate embodiment, cache controller 439 also controls a L2 cache memory 404 coupled to processor 402. The interaction between cache controller 439 and cache memory 404 is as described above between cache memory 438 and cache controller 439.

Processor 402 as shown includes additional detail. The remaining agents on processor-memory bus 401 may also include the additional logic shown in processor 402. In one embodiment, all agents on the bus which issue requests include cache memory 438 and cache controller 439. This additional logic has not been shown in all agents so as not to clutter the drawings.

An input/output (I/O) bridge 424 is coupled to processor-memory bus 401 and system I/O bus 431 to provide a communication path or gateway for devices on either processor-memory bus 401 or I/O bus 431 to access or transfer data between devices on the other bus. Essentially, bridge 424 is an interface between the system I/O bus 431 and the processor-memory bus 401.

I/O bus 431 communicates information between peripheral devices in the computer system. Devices that may be coupled to system bus 431 include a display device 432, such as a cathode ray tube, liquid crystal display, etc., an alphanumeric input device 433 including alphanumeric and other keys, etc., for communicating information and command selections to other devices in the computer system (e.g., processor 402) and a cursor control device 434 for controlling cursor movement. Moreover, a hard copy device 435, such as a plotter or printer, for providing a visual representation of the computer images and a mass storage device 436, such as a magnetic disk and disk drive, for storing information and instructions may also be coupled to system bus 431.

In some implementations, it may not be required to provide a display device for displaying information. Certain implementations of the present invention may include additional processors or other components. Additionally, certain implementations of the present invention may not require nor include all of the above components. For example, processor 403, display device 423, or mass storage device 425 may not be coupled to processor-memory bus 401. Furthermore, the peripheral devices shown coupled to system I/O bus 431 may be coupled to processor-memory bus 401; in addition, in some implementations only a single bus may exist with the processors 402 and 403, memory controller 422, and peripheral devices 432 through 436 coupled to the single bus.

Figure 5:
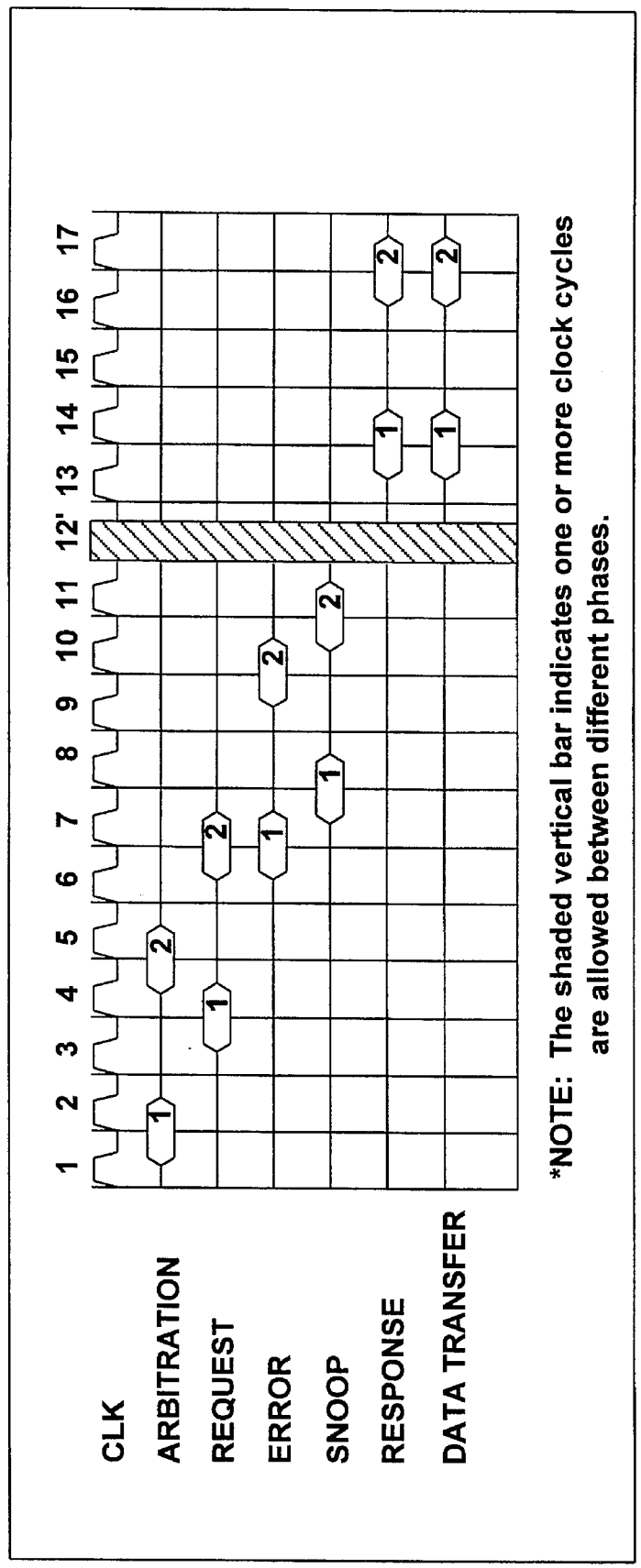
FIG. 5 is a timing diagram of two bus transactions in one embodiment of the present invention.

Different phases from different transactions can overlap, thereby pipelining bus usage and improving bus performance. FIG. 5 shows exemplary overlapped request/response phases for two transactions. Referring to FIG. 5, every transaction begins with an Arbitration Phase, in which a requesting agent becomes the bus owner. The second phase is the Request Phase in which the bus owner drives a request and address information on the bus. The third phase of a transaction is an Error Phase, three clocks after the Request Phase. The Error Phase indicates any immediate errors triggered by the request. The fourth phase of a transaction is a Snoop Phase, four or more clocks from the Request Phase. The Snoop Phase indicates if the cache line accessed in a transaction is valid or modified (dirty) in any agent's cache.

The Response Phase indicates whether the transaction failed or succeeded, whether the response is immediate or deferred, and whether the transaction includes data phases. If a transaction contains a response-initiated data phase, then it enters data transfer along with the response phase.

The use of a pipelined system can pose several problems. For example, in FIG. 5, request 1 is driven in clock T1 and request 2 is driven in clock T4. If request 1 and request 2 are both requests for the same address, the system must maintain cache consistency in order to properly execute both request 1 and request 2.

The determination of a global observation clock resolves this problem. That is, a clock cycle is determined at which the entire system is deemed to observe the transaction. In one embodiment, this global observation clock is at the Snoop Phase. Thus, before the Snoop Phase of a particular transaction, every agent in the system treats the transaction as never having taken place. This is so even though the requesting agent has driven a request onto the bus. However, after the Snoop Phase every agent treats the request as having taken place.

The global observation clock is at the Snoop Phase because every agent knows the fate of the transaction at the Snoop Phase. That is, whether an agent has a modified cache line corresponding to the request is known, and agents which must update the state of their own cache line know to do so. Thus, the agent(s) which are involved with the response to the requesting agent are known.

Note that under certain circumstances, a particular transaction may not be globally observed at the Snoop Phase for that transaction. For example, in systems employing a multiple-bus hierarchy the current transaction is globally observed if the ownership of the requested cache line can be satisfied within the bus cluster of the processor issuing the request (regardless of whether it is in modified or shared state). However, the situation may arise where the cache line is not owned within the bus cluster and is either in a different cluster or system memory, which is reached via the cluster manager of the current cluster. In such a case the cluster manager is responsible for obtaining ownership of the cache line. Three different scenarios exist in such a case.

In the first scenario, the ownership of the next level system bus is immediately available. Consequently, the ownership of the cache line can be guaranteed by the Snoop Phase of the current transaction. Thus, the transaction is globally observed at the Snoop Phase of the current transaction, as discussed above. In a second scenario, the ownership of the next level system bus is not immediately possible, and yet, it can be obtained at a later time. Furthermore, the cache line can be returned back to the requesting processor. In this instance, the cluster manager defers global observation of the transaction. When the next level system bus ownership is finally obtained, the cluster manager returns the ownership of the cache line with a deferred reply. During the Snoop Phase of the deferred reply the transaction is globally observed. Finally, ownership of the next level system bus might not be possible in order to avoid a deadlock. Hence, the transaction is aborted and retried one more time. The transaction is not globally observed until the retried transaction is successfully completed. The retried transaction is globally observed based on the case it falls under during retry.

The states of the corresponding cache lines are updated during the Snoop Phase in order to support the global observation clock. That is, to ensure proper system behavior the cache line states are updated at the global observation clock. For example, in FIG. 5, if request 1 and request 2 are both read requests to the same cache line, the cache line states which must be updated as a result of request 1 are updated prior to the Snoop Phase for request 2. Otherwise, the proper agent(s) may not assert the necessary HIT# or HITM# signals for request 2.

For example, the Snoop Phase for request 1 of FIG. 5 begins at clock 7. At clock 7, all agents on the bus assert or deassert HIT# and HITM# signals, depending on the state of the requested cache line in their caches. These signals are observed by all agents on the bus in the next clock, clock 8. In one embodiment, each agent on the bus updates its cache state in clock 7, along with asserting or deasserting HIT# and HITM# signals. Thus, by clock 8 each agent has updated its snoop state. In the example shown in FIG. 2, the Snoop Phase for request 2 begins at clock 10. Thus, since each agent's cache state is updated by clock 8, each agent asserts or deasserts the proper HIT# and HITM# signals in the Snoop Phase for request 2, even if request 2 is a request for the same cache line as request 1.

In an alternate embodiment, each agent updates its cache state in clock 8 or clock 9, upon observation of the snoop HIT# and/or HITM# signals in clock 8. In the example of FIG. 5, cache consistency is maintained when the cache states are updated prior to the Snoop Phase for request 2. Thus, updating cache states in clock 8 or clock 9 preserves cache consistency.

Figure 6:
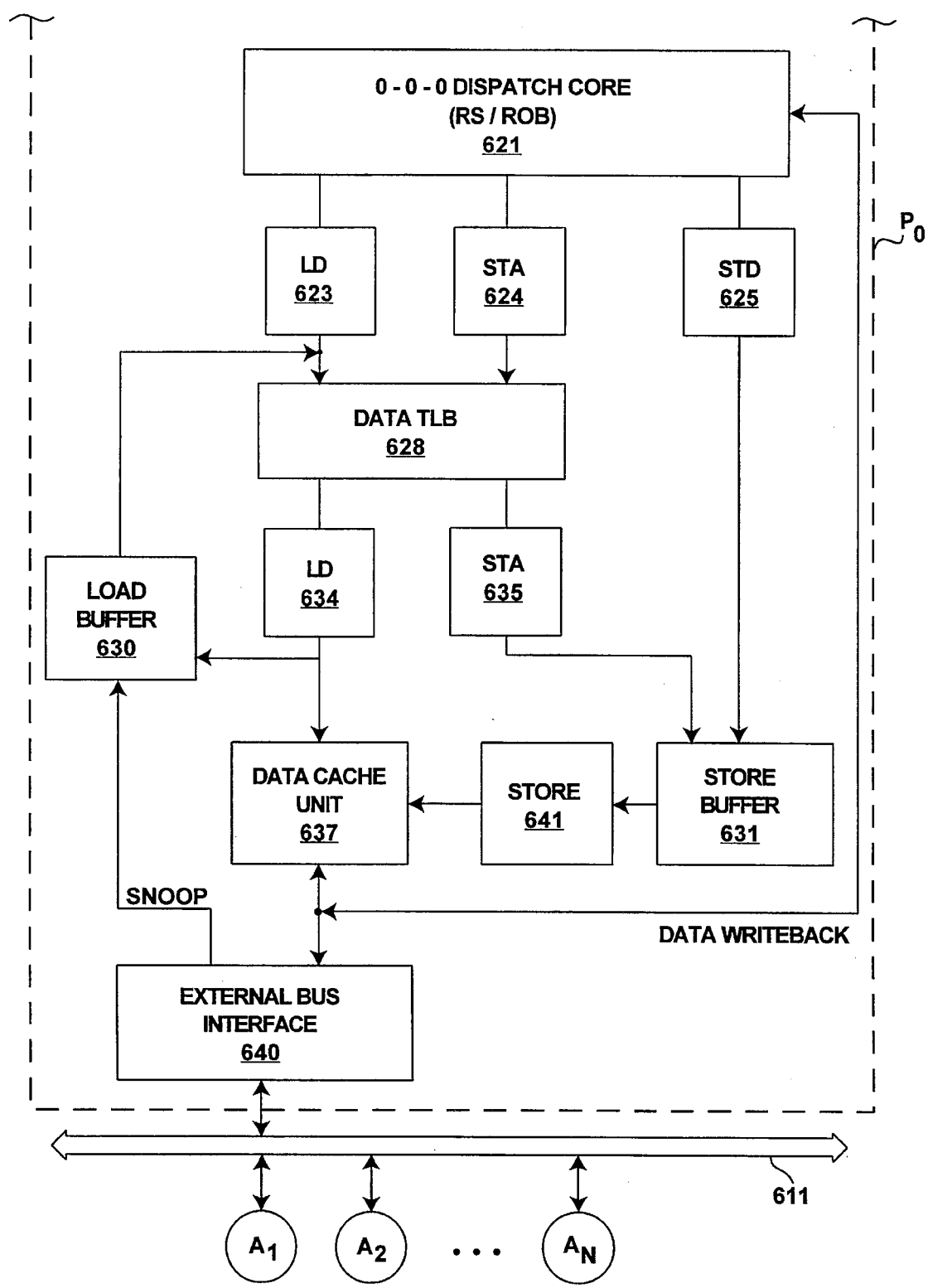
FIG. 6 is a block diagram of the memory subsystem of a processor incorporated into one embodiment of the computer system of the present invention.

FIG. 6 is a block diagram of the memory subsystem of processor $P_0$ in one embodiment of the computer system of the present invention. It is appreciated that other subsystem architectures may be utilized in order to practice the present invention. During execution of a program within processor $P_0$ an instruction is first fetched and then decoded into one or more primitive operations. These primitive operations (called "micro-operations" or "micro-ops") then flow through the machine—potentially being executed out-of-order with respect to one another—until they are ultimately retired. Thus, the operation of the processor $P_0$ is best understood as a series of processes involving micro-operations which are issued from a set of different macro-instructions and which communicate through a set of buffers.

The execution of a program with processor $P_0$ begins with the fetching of instructions from memory, and placement of the fetched instructions into a buffer or queue. Next, the instructions are converted into a set of primitive micro-operations. A separate allocation process determines which of the many physical registers results the micro-operations are to be steered to. Once resources have been allocated, the appropriate operands are fetched and made ready by placing them into a reservation station (RS). The reservation station is a buffer that holds micro-operations that have not yet executed. When data is ready for a given instruction, the RS dispatches to one of a plurality of execution units according to data dependencies and execution unit availability. Once the execution unit performs the requested operation, a write-back is performed back to the reservation station.

The out-of-order engine of processor $P_O$ also includes a re-order buffer (ROB), which is a functional unit where speculative results are collected, reordered and then retired. Retirement is the active process of removing a completed micro-instruction from the re-order buffer and committing its state to whatever permanent architectural state is designated by the original source program.

With continuing reference to FIG. 6, the memory subsystem receives dispatches (mostly memory READs and memory WRITEs) from the out-of-order (O-O-O) dispatch core 621. Dispatch core 621 includes the processor's reservation station and re-order buffer. The memory subsystem receives dispatches from the reservation station and returns data and fault information back to the RS and ROB. When the memory subsystem receives a memory READ (i.e., a LOAD) micro-operation, it may issue a request to bus 611 to read data from external memory 612. When the subsystem receives a memory WRITE (i.e., a STORE) micro-operation, it may write data back to external memory 612, a peripheral I/O device, or to another agent coupled to system bus 611. Since the reservation station of core 621 operates based on data flow dependencies, the memory subsystem of processor $P_0$ needs to detect violations of memory ordering.

The memory subsystem of FIG. 6 includes a data cache unit (DCU) 637 comprising an 8K 2-way set associative array, with a cache line size of 32 bytes in a current embodiment. DCU 637 is partitioned into four data banks.

This allows two accesses (one LOAD, one STORE) at the same time as long as they are on separate banks. DCU 637 also provides a two cycle access time on LOADs and STOREs that hit the cache. Furthermore, DCU 637 is a non-blocking cache, which means that it can process incoming accesses while continuing to process cache misses utilizing external bus 611 (via external bus interface 640). Data cache unit 637 includes four fill buffers, each 256-bits wide, that are used to store outstanding cache accesses. DCU 637 stalls cache misses only when all fill buffers are busy. DCU 637 uses a Modified/Exclusive/Shared/Invalid (MESI) protocol to support cache coherency for multi-processor computer systems.

The memory subsystem of processor $P_0$ further comprises a data translation look-aside buffer (DTLB) 628 that translates linear addresses to physical addresses for memory accesses. DTLB 628 performs a look-up in a cache array containing the mapping from the linear-to-physical address space. DTLB 628 also caches memory region information with each physical address, and can perform two address translations each clock cycle.

In a current embodiment, DTLB 628 contains a small page array and a large page array. The small page array contains array address information for 4K page sizes and contains 64 entries. The large page array contains address information for 2M and 4M page sizes and contains eight entries. Both arrays are four-way set associative caches. DTLB 628 also checks memory accesses for protection privileges, exceptions, traps, data breakpoints, etc. If the translation buffer detects an exception of any sort, it returns fault information to the re-order buffer of dispatch core 621, and notifies the rest of the subsystem to abort the access.

The memory subsystem of FIG. 6 also includes a memory order buffer (MOB) that controls dispatching within the memory subsystem. In FIG. 6, the memory ordering buffer is illustrated as comprising load buffer 630 and store buffer 631. These buffers handle all LOAD and STORE operations and track the progress of these operations as they move through the processor. When an operation is dispatched and cannot complete due to an address or resource conflict, the MOB blocks the operation and stores the dependency information. Load buffer 630 contains 16 entries, while store buffer 631 contains 12 entries in a current embodiment. Tile entries of load buffer 630 and store buffer 631 are allocated as micro-operations, and are issued into the ROB of O-O-O dispatch core 621.

The memory order buffer functions as a kind of second-order reservation station. The MOB re-dispatches blocked operations when the blocking source is removed. Some memory operations cannot execute speculatively, so it monitors the retirement process and dispatches non-speculative operations at the correct time. The memory order buffer also dispatches memory writes (i.e., STOREs) to data cache unit 637.

By way of example, FIG. 6 illustrates how core 621 dispatches a store operation that gets decoded into two micro-operations: a store address micro-operation (STA) and a store data operation (STD), illustrated by blocks 624 and 625, respectively. Load micro-operations dispatched by core 621 are illustrated by block 623 in FIG. 6.

All micro-ops dispatched by the reservation station are tracked by the load and store buffers. For example, store data micro operations are directly entered into store buffer 631, whereas store address and load data micro-operations are translated by DTLB 628 to their physical addresses. Physical addresses for the load data and store address micro-operations are shown in FIG. 6 by blocks 634 and 635, respectively. Store address micro-ops are entered into store buffer 631, while load data micro-ops are sent to the load buffer and data cache unit 637.

As described earlier, data cache unit 637 either provides the appropriate physical data back to dispatch core 621, or issues a memory access to main memory via external bus interface unit 640 and system bus 611. Note that when both store address and store data micro-ops have dispatched, and are no longer speculative, the memory order buffer of the memory subsystem combines them, and dispatches them as a STORE, as shown by block 641, to DCU 637. In many cases, Stores are buffered well after retirement, since they create no dependency on other operations.

It should be understood that STORE operations cannot execute speculatively or out-of-order because there is no way to recover from a write that should not have happened. Store address and calculation of store data, however, can execute speculatively and out-of-order, to increase processor performance.

As explained above, STORE operations are split into two micro-operations: a store address (STA) and a store data (STD). The STA micro-operation is illustrated by block 624 and is an address calculation and translation. The STD micro-operation is illustrated by block 625 and comprises a data conversion operation. Both of these operations write their data into store buffer 631, which is physically partitioned across three units. The memory order buffer contains a linear address, status, and micro-operation information. DCU 637 contains the actual physical addresses.

In one embodiment, store buffer 631 contains twelve entries, holding up to twelve STORE operations. Store buffer 631 is used to queue up all STORE operations before they dispatch to memory. Buffer 631 also checks all LOADs for store address conflicts. This checking keeps the LOADs consistent with previously executed STOREs still remaining in the store buffer.

Load buffer 630 contains sixteen buffer entries, holding up to sixteen loads. The lead buffer is used to queue up LOAD operations. All LOADs go into the lead buffer, so they can be snooped; they are re-dispatched from there. The queue operations are then re-dispatched by load buffer 630 when the conflict has been removed. Processor ordering is maintained for LOADs by snooping external WRITEs against completed LOADs. In accordance with the present invention, an agent's WRITE to a speculatively read memory location forces the out-of-order engine to clear and restart the LOAD operation. This aspect of the invention will be described in more detail shortly.

Within the memory subsystem, resources are allocated when a STORE or LOAD operation is issued into the reservation station. Buffers 630 and 631 receive speculative load and store address operations from the reservation station within the dispatch core 621. A LOAD operation decodes into one micro-operation, while a STORE operation is decoded into store data and store address micro-operations. At allocation time, the operation is tagged with its eventual location in either buffer 630 or 631. The reservation station provides the op-code while the processor's address generation unit calculates and provides the linear address for an access. These operations are either executed immediately or are written into the memory order buffer for dispatch at a later time. In the case of a LOAD, data cache unit 637 is expected to return the data to core 621. In parallel, address and status bits are written into the load buffer to signal the operation's completion.

In the computer system of the present invention, strong-ordering is emulated by processor $P_0$ even though it is an inherently weakly-ordered machine. That is, $P_0$ is a processor that is capable of executing instructions out-of-order; $P_0$ allows LOADs to pass LOADs, yet it presents the architectural model of strong ordering (i.e., no passing) through speculative processor ordering. All completed and non-retired LOAD operations snoop external bus 611 for external STOREs (i.e., WRITEs). If an external WRITE address matches a non-retired LOAD address, then a processor ordering violation is flagged. Instead of retiring the flagged LOAD, as would normally be done, the LOAD is aborted along with all subsequent micro-operations. The processor then starts re-issuing micro-ops starting with the aborted LOAD.

In a current embodiment of the present invention this sequence of steps is known as a RONuke operation. In a RONuke operation, the LOAD is canceled; the speculative progress of the computer system is aborted, and the processor starts executing from the canceled LOAD.

Another way of looking at the problem which can occur between processors of a multi-processing system is that if LOADs execute out-of-order, they can effectively make another processor's STORE operations appear out-of-order. This results from a later LOAD passing an earlier LOAD that has not yet been executed. The later LOAD reads old data while the earlier LOAD, once executed, has the chance of reading new data written by another processor. If allowed to commit its architectural slate, these LOADs would violate processor ordering rules. To prevent this from occurring, load buffer 630 watches (i.e., snoops) all data WRITEs on external bus 611. This is illustrated by FIG. 6 by the snoop line coupling load buffer 630 to external bus 611 through bus interface unit 640. If another processor writes a location that was speculatively read, the LOAD and subsequent operations are cleared and re-executed to get the correct data.

Assume that processor #1 has a strong-ordering memory model, i.e., memory operations are assumed to occur in the original program order. Also, assume that processor #2 is an out-of-order processor, e.g., processor $P_0$. When processor #2 is ready to execute the first LOAD operation to memory location 5, external bus 611 is snooped by load buffer 630 to determine if there is a risk of violating strong-ordering. For example, if the LOAD to memory location 5 is pending execution and a STORE is present on external bus 611 to memory location 5, processor #2 is at risk for violating strong-ordering. In accordance with the present invention, processor #2 takes corrective action to avoid the natural weak-ordering model that would otherwise result. It does this by first destroying the speculative state of the machine, and then re-executing from the aborted LOAD.

Recall that for load buffer 630 inside the memory subsystem keeps track of all outstanding LOADs for the processor at any given point in time. If a LOAD has happened—or is about to happen in the future—the address is present in load buffer 630. Processor $P_0$ snoops bus 611 for STOREs from other agents by snooping those addresses. If an address is the same as any address present in load buffer 630 pending execution, then a potential risk for violating strong-ordering exists. Load buffer 630 snoops external bus 611 and looks for STOREs on the bus which match the address present within buffer 630. When the tagged (snoop hit) LOAD entry of the load buffer eventually tries to retire, the machine's state is first destroyed. The processor then begins re-issuing instructions beginning with the aborted LOAD.

Figure 7:
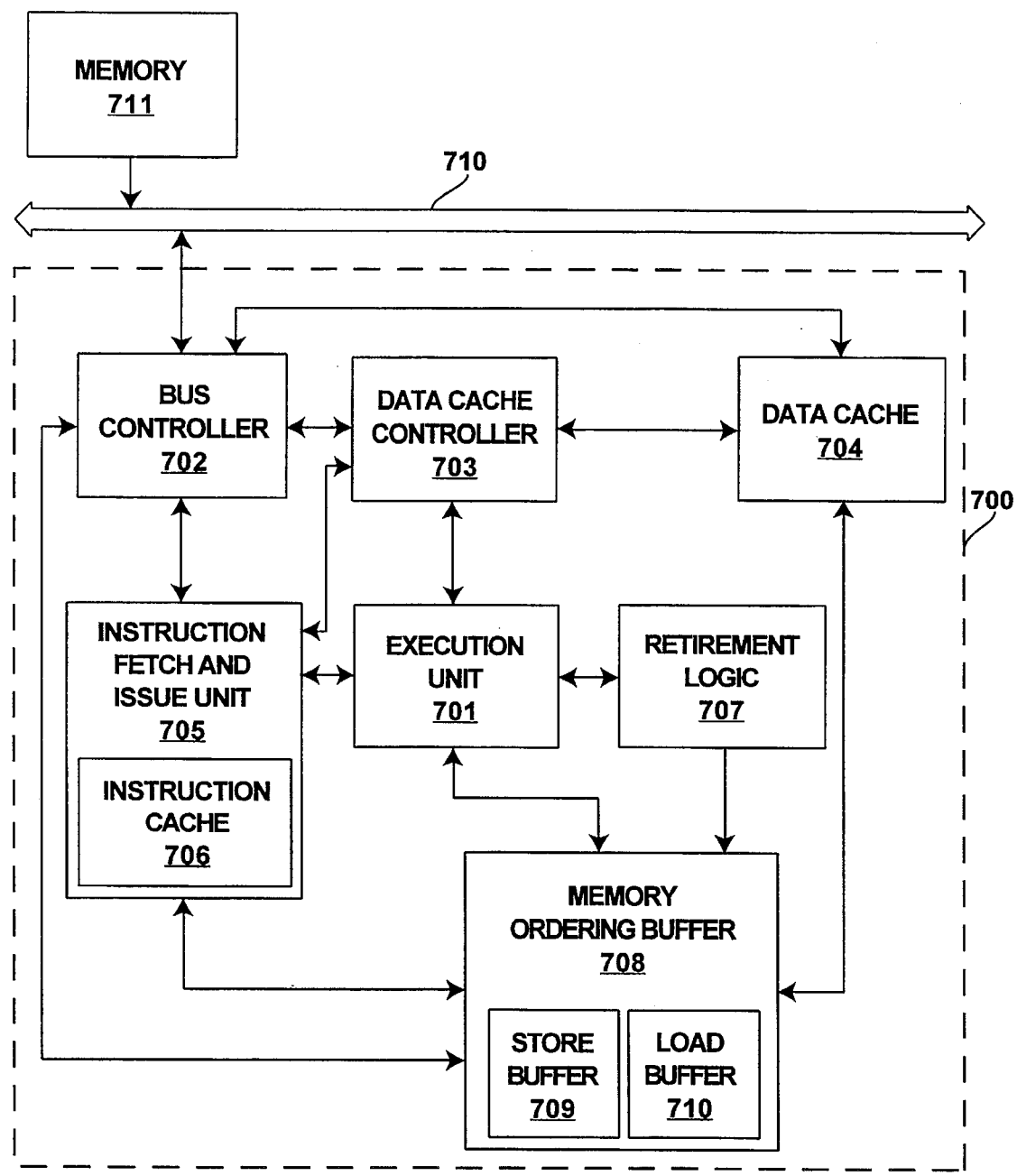
FIG. 7 shows a block diagram illustrating an exemplary processor incorporating the teachings of the present invention.

Referring now to FIG. 7, a block diagram illustrating an exemplary processor 700 incorporating the teachings of the present invention is shown. The exemplary processor 700 comprises an execution unit 701, a bus controller 702, a data cache controller 703, a data cache 704, and an instruction fetch and issue unit 705 with an integrated instruction cache 706. The elements 701–706 are coupled to each other as illustrated. Together they cooperate to fetch, issue, execute, and save execution results of instructions in a pipelined manner.

The instruction fetch and issue unit 705 fetches instructions from an external memory through the bus controller 702 via an external system bus. Bus controller 702 manages transfers of data between external components and processor 700. In addition, it also manages cache coherency transfers. The instruction fetch and issue unit 705 then issues these instructions to the execution unit 701 in an in-order sequence. Basically, the execution unit 701 performs such functions as add, subtract, logical AND, and integer multiply. Some of these instructions are fetched and dispatched speculatively. The execution unit 701 holds and executes the integer and floating point instructions when their operand dependencies on execution results of preceding instructions are resolved. In similar fashion, the execution unit 701 holds and forwards the load and store instructions to the memory ordering buffer 708.

Retirement logic 707 commits the states of these instructions to whatever permanent architectural state that was designated by the original source code. Within memory ordering buffer 708, loads and stores are checked for memory ordering effects. Stores and/or loads are potentially postponed until ordering inconsistencies are resolved.

The memory ordering buffer 708 is comprised of store buffer 709 and load buffer 710. Store buffer 709 is a first-in-first-out (FIFO) structure for storing address, size, data, and other key attributes. The top pointer of the structure points to the store most recently retired. The bottom of store buffer 709 (i.e., the one containing the oldest retired store) is the one ready to be written to a memory subsystem, such as data cache 704. The store buffer 708 is only visible to the processor core (e.g., execution unit 701 and instruction fetch and issue unit 705). External snoops do not recognize the existence of the store.

The load buffer 710 is a scratchpad buffer used by the memory subsystem to impose access ordering on memory loads. Each load operation is tagged with the Store Buffer ID (SBID) of the store previous to it. This SBID represents the relative location of the load compared to all stores in the execution sequence. When the load executes in the memory, its SBID is used as a beginning point for analyzing the load against all older stores in the buffer.

If loads execute out of order, these loads might make other processors' store operations appear to be out of order. This situation might arise when a younger load passes an older load that has not been executed yet (e.g., read operation $R_2$ is executed before a prior read operation $R_1$). This younger load reads old data, while the older load might read new data written by another processor. If allowed to commit to state, these loads would violate processor ordering. The present invention prevents this violation from occurring by utilizing the load buffer 709 to snoop all data writes from other agents on the bus 710. Snooping refers to the act monitoring data and address traffic for particular values. If another processor writes a location that was speculatively read, that load and subsequent operations are cleared and re-executed to retrieve the correct data (e.g., reimpose processor ordering).

Data cache controller 703 controls the access of data to/from the data cache 704. Data cache 704 is a fast, small, hardware-maintained scratchpad memory which can be reached in fewer clock cycles than main memory by loads and stores. The data cache controller 703 and the data cache 704 respond to the load instructions immediately, forwarding data if necessary. In contrast, store instructions are buffered. In other words, instructions are not necessarily executed/forwarded in the order they were, issued. Moreover, some instructions are speculatively executed/forwarded. In any case, the execution results of the integer, floating point, and load instructions are buffered, and then retired or committed in order. In comparison, the buffered store instructions are retired or committed in order and then dispatched in the "background," at the convenience of the memory system. Speculative integer, floating point, and load execution results and buffered stores of mis-predicted branches are purged.

The instruction fetch and execution unit 705 is intended to represent a broad category of instruction fetching and issuing elements found in many computer systems. Their constitutions and functions are well known. In the presently preferred embodiment, the instruction fetch and issue unit 705 includes an instruction cache 706. The instruction cache 706 is a fast local memory that holds the instructions to be executed. When a program attempts to access an instruction that is not yet or no longer in the cache, the processor waits until hardware fetches the desired instructions from another cache or memory downstream. It is the responsibility of the instruction fetch and issue unit 705 to decide which instruction cache entry ought to be accessed next for maximal program performance. In the currently preferred embodiment, the instruction cache 706 and data cache 704 exists in a memory hierarchy.

Figure 8:
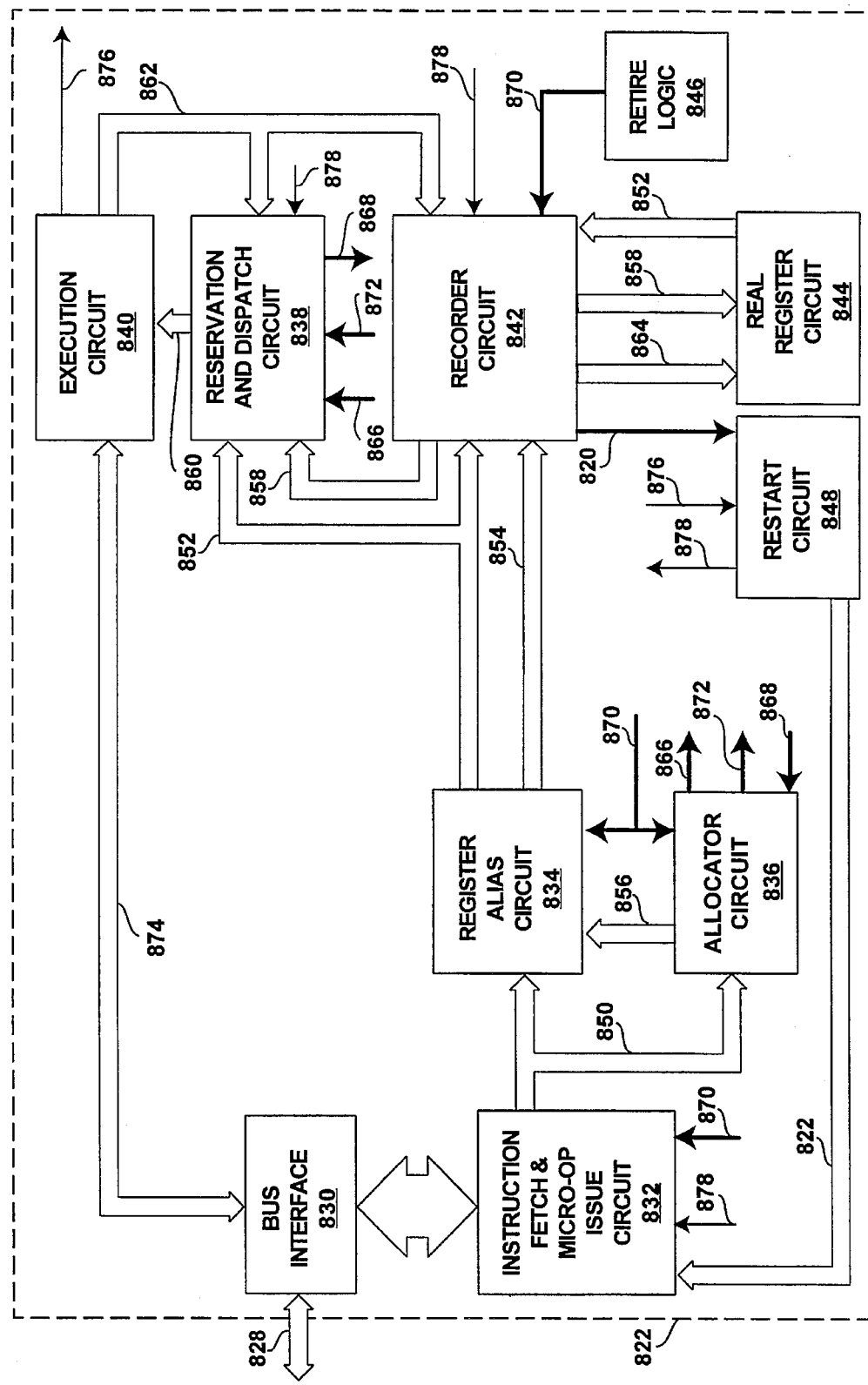
FIG. 8 is a block diagram of a processor in the multiprocessor computer system.

FIG. 8 illustrates the processor 822. The processor 822 comprises a front-end section including a bus interface circuit 830 and an instruction fetch and micro-op issue circuit 832. The processor 822 also comprises a register renaming section including a register alias circuit 834 and an allocator circuit 836. The processor 822 also comprises an out of order execution section comprising a reservation and dispatch circuit 838, an execution circuit 840, a reorder circuit 842, and a real register circuit 844.

The bus interface circuit 830 enables transfer of address, data and control information over the multiprocessor bus 828. The instruction fetch and micro-op issue circuit 832 fetches a stream of macro instructions from the memory subsystem 826 over the multiprocessor bus 828 through the bus interface circuit 830. The instruction fetch and micro-op issue circuit 832 implements speculative branch prediction to maximize macro-instruction fetch throughput.

For one embodiment the stream of macro instructions fetched over the multiprocessor bus 828 comprises a stream of Intel Architecture Microprocessor macro instructions. The Intel Architecture Microprocessor macro instructions operate on a set of architectural registers, including an EAX register, an EBX register, an ECX register, and an EDX register, etc.

The instruction fetch and micro-op issue circuit 832 converts the macro-instruction of the incoming stream of macro instructions into an in-order stream of logical micro operations, hereinafter referred to as logical micro-ops. The instruction fetch and micro-op issue circuit 832 generates one or more logical micro ops for each incoming macro instruction. The logical micro-ops corresponding to each macro instruction are reduced instruction set micro operations that perform the function of the corresponding macro instruction. The logical micro-op specify arithmetic and logical operations as well as load and store operations to the memory subsystem. 826.

The instruction fetch and micro-op issue circuit 832 transfers the in-order stream of logical micro-ops to the register alias circuit 834 and the allocator circuit 836 over a logical micro-op bus 850. For one embodiment, the instruction fetch and micro-op issue circuit 832 issues up to four in-order logical micro-ops during each clock cycle of the processor 122. Alternatively, the in-order logical micro-ops may be limited to four during each clock cycle to minimize integrated circuit die area for the processor 822.

The instruction fetch and micro-op issue circuit 832 contains a micro instruction sequencer and an associated control store. The micro instruction sequencer implements micro programs for performing a variety of functions for the processor 822, including fault recovery functions and processor ordering functions.

Each logical micro-op generated by the instruction fetch and micro-op issue circuit 832 comprises an op code, a pair of logical sources and a logical destination. Each logical source may specify a register or provide an immediate data value. The register logical sources and the logical destinations of the logical micro-ops specify architectural registers of the original macro instructions. In addition, the register logical sources and the logical destinations of the logical micro-ops specify temporary registers for microcode implemented by the micro instruction sequencer of the instruction fetch and micro-op issue circuit 832.

The register alias circuit 834 receives the in-order logical micro-ops over the logical micro-op bus 850, and generates a corresponding set of in-order physical micro-ops by renaming the logical sources and logical destinations of the logical micro-ops. The register alias circuit 834 receives the in-order logical micro-ops over the logical micro-op bus 850, maps the logical sources and the logical destination of each logical micro-op into physical sources and a physical destination, and transfers the in-order physical micro-ops over a physical micro-op bus 852.

Each physical micro-op comprises the opcode of the corresponding logical micro-op, a pair of physical sources, and a physical destination. Each physical source may specify a physical register or provide an immediate data value. The register physical sources of the physical micro-ops specify physical registers contained in the reorder circuit 842 and committed state registers contained in the real register circuit 844. The physical destinations of the physical micro-ops specify physical registers contained in the reorder circuit 842.

The register alias circuit 834 transfers the logical destinations of the logical micro-ops over a logical destination bus 854. The logical destinations transferred over the logical destination bus 854 identify the architectural registers that correspond to the physical destinations on file physical micro-op bus 852.

The allocator circuit 836 tracks the available resources in the reorder circuit 842, the reservation and dispatch circuit 838, and file execution circuit 840. The allocator circuit 836 assigns physical destinations in the reorder circuit 842 and reservation station entries in the reservation and dispatch circuit 838 to the physical micro-ops on the physical micro-,op bus 852. The allocator circuit 836 also assigns load buffer entries in a memory ordering buffer in the execution circuit 840 to the physical micro-ops on the physical micro-op bus 852 that have an opcode specifying a load memory operation.

The allocator circuit 836 transfers allocated physical destinations to the register alias circuit 834 over a physical destination bus 856. The allocated physical destinations specify physical registers in the reorder circuit 842 for buffering speculative results for the physical micro-ops. The allocated physical destinations are used by the register alias circuit 834 to rename the logical destinations of the logical micro-ops to physical destinations.

The allocator circuit 836 allocates the physical registers of the reorder circuit 842 to the physical micro-ops in the same order that logical micro-ops are received over the logical micro-op bus 850. The allocator circuit 836 maintains an allocation pointer for allocating physical registers of the reorder circuit 842. The allocation pointer points to a next set of consecutive physical registers in the reorder circuit 842 for each set of logical micro-ops received over the logical micro-op bus 850. The ordering of the physical registers assigned to the physical micro-ops in the reorder circuit 842 reflects the ordering of the original logical micro-ops.

The allocator circuit 836 specifies the reservation station entries for the physical micro-ops on the physical micro-ops bus 852 by transferring reservation station entry select signals to the reservation and dispatch circuit 838 over a reservation station select bus 866.

The allocator circuit 836 assigns a load buffer entries to each physical micro-ops on the physical micro-ops bus 852 that specifies a load memory opcode. The allocator circuit 836 assigns the load buffer entries by transferring load buffer identifiers to the reservation and dispatch circuit 838 over a load buffer ID bus 872.

The reservation and dispatch circuit 838 holds the physical micro-ops awaiting execution by the execution circuit 840. The reservation and dispatch circuit 838 receives the in-order physical micro-ops over the physical micro-op bus 852, assembles the source data for the physical micro-ops, and dispatches the physical micro-ops to the execution circuit 840.

The reservation and dispatch circuit 838 receives the physical micro-ops over the physical micro-op bus 850 and stores the physical micro-ops in available reservation station entries. The reservation and dispatch circuit 838 assembles source data for the physical micro-ops, and dispatches the physical micro-ops to appropriate execution units in the execution circuit 840 when the source data is assembled.

The reservation and dispatch circuit 838 receives the source data for the pending physical micro-ops from the reorder circuit 842 and the real register circuit 8n over a source data bus 858. The reservation and dispatch circuit 838 also receives source data for the pending physical micro-ops from the execution circuit 840 over a result bus 862 during a write back of speculative results from the execution circuit 840 to the reorder circuit 842.

The reservation and dispatch circuit 838 schedules the physical micro-ops having completely assembled source data for execution. The reservation and dispatch circuit 838 dispatches the ready physical micro-ops to the execution circuit 840 over a micro-op dispatch bus 860. The reservation and dispatch circuit 838 schedules execution of physical micro-ops out of order according to the availability of the source data for the physical micro-ops, and according to the availability of execution unit resources in the execution circuit 840.

The execution circuit 840 writes back the speculative results from the out of order execution of the physical micro-ops to the reorder circuit 842 over the result bus 862. The writes back of speculative results by the execution circuit 840 is out of order due to the out of order dispatching of physical micro-ops by the reservation and dispatch circuit 838 and the differing number of processor 822 cycles required for execution of the differing types of physical micro-ops.

For one embodiment, the execution circuit 840 comprises a set of five execution units EU0-EU4. The reservation and dispatch circuit 838 dispatches up to five physical micro-ops concurrently to the execution units EU0-EU4 over the micro-op dispatch bus 860.

The execution unit EU0 performs arithmetic logic unit (ALU) functions including integer multiply and divide as well as floating-point add, subtract, multiply and divide micro-ops. The execution unit EU1 performs ALU integer functions and jump operations. The execution unit EU2 performs integer and floating-point load operations from memory as well as load linear address functions and segment register operations. The execution unit EU3 performs integer and floating-point store and segmentation register operations. The execution unit EU4 performs integer and floating-point store data operations.

The reorder circuit 842 contains the physical registers that buffer speculative results for the physical micro-ops. Each physical register in the reorder circuit 842 accommodates integer data values and floating-point data values.

The real register circuit 8-4 contains committed state registers that correspond to the architectural registers of the original stream of macro-instructions. Each committed state register in the real register circuit 844 accommodates integer data values and floating-point data values.

For one embodiment, the committed state registers of the real register circuit 44 comprise the EAX, EBX, ECX, and EDX registers, etc. of the Intel Architecture Microprocessor, as well as architectural flags for the Intel Architecture Microprocessor. The real register circuit 844 also contains committed state registers for the microcode registers used by microcode executing in the instruction fetch and micro-op issue circuit 832.

The reorder circuit 842 and the real register circuit 844 receive the physical micro-ops over the physical micro-op bus 852. The physical sources of the physical micro-ops specify physical registers in the reorder circuit 842 and committed state registers in the real register file 844 that hold the source data for the physical micro-ops.

The reorder circuit 842 and the real register circuit 844 read the source data specified by the physical sources, and transfer the source data to the reservation and dispatch circuit 838 over a source data bus 858. Each physical source of the physical micro-ops includes a real register file valid (RRFV) flag that indicates whether the source data is contained in a physical register in the reorder circuit 842 or a committed state register in the real register file 844.

The physical destinations of the physical micro-ops on the physical micro-op bus 852 specify physical registers in the reorder circuit 842 for buffering the speculative results of the out of order execution of the physical micro-ops. The reorder circuit 842 receives the physical destinations of the physical micro-ops over the physical micro-op bus 852, and clears the physical registers specified by the physical destinations.

The reorder circuit 842 receives the logical destinations corresponding to the physical micro-ops over the logical destination bus 854, and stores the logical destinations into the physical registers specified by the physical destinations of the physical micro-ops. The logical destinations in the physical registers of the reorder circuit 842 specify committed state registers in the real register circuit 844 for retirement of the physical micro-ops.

A retire logic circuit 846 imposes order on the physical micro-ops by committing the speculative results held in the physical registers of the reorder circuit 842 to an architectural state in the same order as the original logical micro-ops were received. The retire logic circuit 846 causes transfer of the speculative result data in the reorder circuit 842 to corresponding committed state registers in the real register circuit 844 over a retirement bus 864. For one embodiment, the retire logic circuit 846 retires up to four physical registers during each cycle of the processor 822. For another embodiment, the retire logic circuit 846 retires up to three physical registers during each cycle of the processor 822 to minimize integrated circuit die space.

The retire logic circuit 846 also causes the reorder circuit 842 to transfer the macro instruction pointer delta values for the retiring physical micro-ops over a macro instruction pointer offset bus 820 during retirement.

The restart circuit 48 receives macro instruction pointer delta values over the macro instruction pointer offset bus 820. The restart circuit 848 calculates a committed instruction pointer value according to the macro instruction pointer deltas for the retiring ROB entries.

The retire logic circuit 846 maintains a retirement pointer to the physical registers in the reorder circuit 842. The retirement pointer points to sets of consecutive physical registers for retirement. The retirement pointer follows the allocation pointer through the physical registers in the reorder circuit 842 as the retire logic retires the speculative results of the physical registers to the committed state. The retire logic circuit 84(5, retires the physical registers in order because the physical registers were allocated to the physical micro-ops in order.

The retire logic circuit 846 broadcasts the retirement physical destinations specified by the retirement pointer over a retire notification bus 870. The memory ordering buffer in the execution circuit 840 receives the retirement physical destinations, and issues a set of memory ordering restart signals 876. The memory ordering restart signals 876 indicate whether a memory load operation corresponding to one of the retiring physical destinations has caused a possible processor ordering violation. The memory ordering restart signals 876 indicate which of the retiring physical destinations has caused the possible processor ordering violation.

The memory ordering restart signals 876 are received by the restart circuit 848. If the memory ordering restart signals 876 indicate a possible processor ordering violation, the restart circuit 848 issues a reorder clear signal 878. The reorder clear signal 878 causes the reorder circuit 842 to clear the speculative result data for the unretired physical micro-ops. The reorder clear signal 878 causes the reservation and dispatch circuit 838 to clear the pending physical micro-ops that await dispatch to the execution circuit 840. The reorder clear signal 878 also causes the allocator circuit 836 to reset the allocation pointer for allocating the physical registers in the reorder circuit 842, and causes the retire logic circuit 846 to reset the retirement pointer for retiring the physical registers.

If the memory ordering restart signals 876 indicate a possible processor ordering violation, the restart circuit 848 uses the macro instruction pointer delta values received over the macro instruction pointer offset bus 820 to calculate a restart instruction pointer value. The restart instruction pointer value specifies the macro instruction corresponding to the physical micro-op that caused the possible memory ordering violation. The restart circuit 848 transfers the restart instruction pointer value to the instruction fetch and micro-op issue circuit 832 over a restart vector bus 822.

The instruction fetch and micro-op issue circuit 832 receives the restart instruction pointer value over a restart vector bus 822. The reorder clear signal 878 causes the micro-instruction sequencer of the instruction fetch and micro-op issue circuit 832 to reissue the in order stream of logical micro-ops that were cleared from the reorder circuit 842 before retirement. The instruction fetch and micro-op issue circuit 832 reissues the logical micro-ops by fetching a macro instruction stream starting at the macro instruction address specified by the restart instruction pointer value, and by converting the macro instruction stream into logical micro-ops, and by transferring the logical micro-ops over the logical micro-op bus 850.

If the memory ordering restart signals 876 do not indicate a possible processor ordering violation, then the retirement of the physical registers specified by the retiring physical destinations proceeds. The reorder circuit 842 tests the valid flags for the retiring physical destinations. The reorder circuit 842 retires the speculative result data for each retiring physical register if the valid flag of the retiring physical register indicates valid speculative data. The reorder circuit 842 retires a physical register by causing transfer of the speculative result data to the committed state registers in the real register circuit 844 specified by the logical destinations of the physical register.

The register alias circuit 834 and the allocator circuit 836 receive the retiring physical destinations over a retire notification bus 870. The register alias circuit 834 accordingly updates the register alias table to reflect the retirement. The allocator circuit 836 marks the retired physical registers in the reorder circuit 842 as available for allocation.

Figure 9:
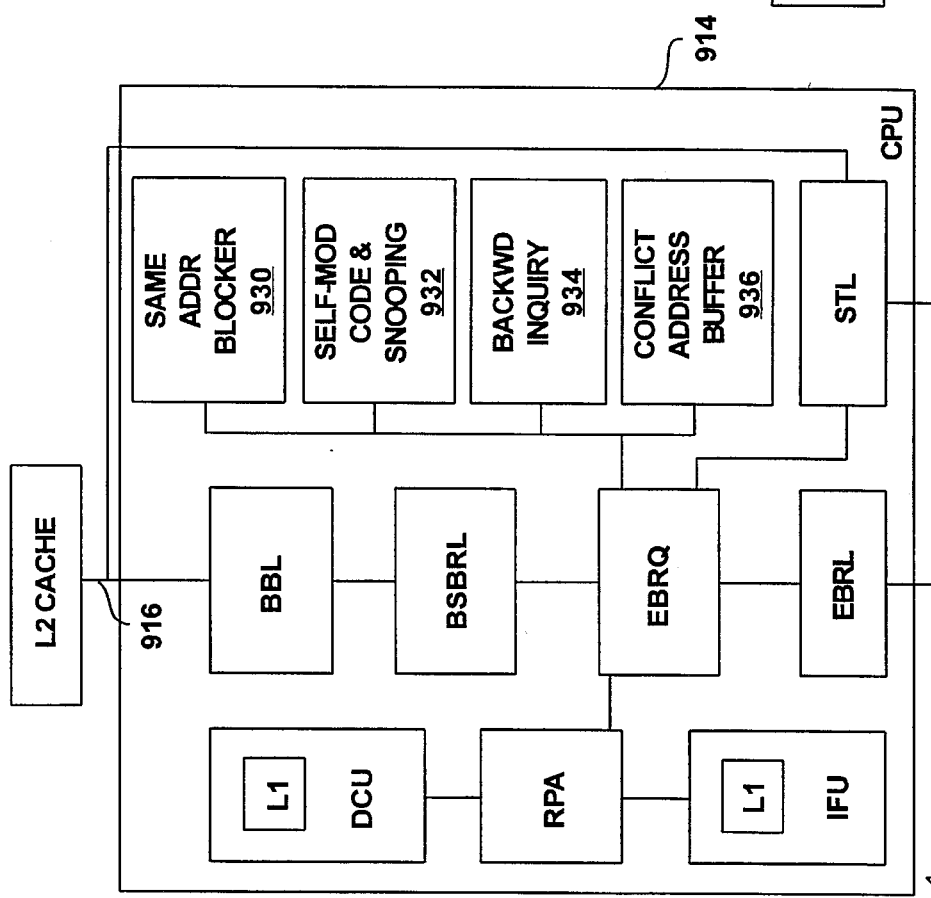
FIG. 9 is a block diagram illustrating the system of the present invention.

FIG. 9 illustrates the computer system 910 of the present invention. The computer system includes a system bus 912 which may actually include a plurality of distinct buses such as a main system bus, an interprocessor communication bus, a local area network bus, or other such bus, each including groups of bus lines for one or more functions such as data, address, and control information transmission.

In the interest of clarity of FIG. 9, and of the reader's ease in understanding the invention, all such buses are represented by bus 912, which will hereinafter be referred to as external bus 912. Other such simplifications have been made herein, for the reader's benefit. The true scope of the present invention should not be misunderstood to be narrowed by such simplifications.

Coupled to the external bus are a variety of representative computer system components, including a memory subsystem (RAM) a hard disk drive (HD). Other such components may also be coupled to the external bus.

Also coupled to the external bus are one or more CPUs. There may also be one or more sockets for accepting additional CPUs. Such additional CPUs may be added to the system to enhance its performance, and may include upgrade CPUs which override the previously-existing CPUs, or they may include additional multiprocessor CPUs which operate in tandem with the other existing CPUs, or they may include enhancement CPUs such as math coprocessors or graphics accelerators which operate to complement the other CPUs. Such a multiprocessor (MP) system may be homogeneous, including CPUs of only a single architecture (ISA), or it may be heterogeneous, including CPUs of different architectures. In one embodiment, the CPUs may be Intel Architecture microprocessors. In any case, the socket(s) may include sockets for accepting additional CPU(s) with their attendant L1 cache(s) and optional L2 cache(s).

Any one or more of the CPUs may include the features described herein below regarding exemplary CPU 914, and any of the socket(s) may provide bus connection for such features in the additional CPU(s).

CPU 914 may, of course, include additional features beyond those which are shown. Other such features have been omitted from FIG. 9, again in the interest of simplicity.

For example, common features such as floating point and integer execution units are not shown, nor are other less well-known features such as an out-of-order engine or speculative execution mechanism. This is not to say, however, that the present invention may not be practiced with such features, or even without all of the details shown.

For the purposes of understanding this invention only, CPU 914 may be described as being built around and including an external bus request queue unit (EBRQ). CPU 914 also includes a queue-to-external-bus request logic unit (EBRL) coupled to the external bus and to the EBRQ.

CPU 914 includes a request prioritization and acknowledgment unit (RPA) coupled to the EBRQ. An instruction fetch unit (IFU) is coupled to the RPA. A data cache unit (DCU) is also coupled to the RPA. The CPU may include a level one cache unit (L1), either a unified cache or, as shown in FIG. 9, a data L1 cache in the DCU and an instruction L1 cache in the IFU.

CPU 914 also includes a status tracking logic unit (STL) coupled to the EBRQ. The STL is coupled to the external bus and the backside bus, either directly as shown or indirectly, and provides information indicating the statuses of the respective buses. Such status information may indicate, for example, whether the bus is busy, performing snooping, suffering parity errors, and any other such information as may be useful in practicing the method of the present invention. The STL may further keep track of: status of data returned from the external bus, status of data forwarded to the L1 cache (instruction and/or data L1), status of data forwarded to the L2 cache, cache state of the data such as MESI status, snoop status of the request, information pertinent to the return of the data to the L2 cache, and error status such as address errors, data errors, and/or external bus response errors. The STL may also keep track of the status of each request, such status information including: whether the request is pending servicing by the BBL/L2, whether the request is currently being serviced by the BBL/L2, whether the request is pending service on the external bus, whether the request is currently being serviced on the external bus, whether the request is pending return service to the BBL/L2, whether data is being returned to the BBL/L2, and whether the request is done/completed.

A queue-to-backside-bus request logic unit (BSBRL) is coupled to the EBRQ and to a backside bus logic unit (BBL). The BBL couples the CPU 914 to a cache, for example a level two cache unit (L2). The L2 cache may be located within the CPU as either an on-die cache or in a multi-chip module, or it may be constructed as a physically separate packed chip. In one embodiment of any of these configurations, the L2 cache may advantageously be coupled to the CPU 914 over a backside bus 916. This will reduce bus traffic on the external bus 912.

It will be understood that a multi-level hierarchical memory system may be constructed having any of a wide variety of configurations. In some configurations, it may include virtual memory, in which a portion of the hard disk is treated as yet another level of cache.

In the system of FIG. 9, various ones of the DCU, IFU, BBL/L2, CPUs, DMA, and other such components may act as agents issuing and receiving bus requests on the external bus. The EBRQ accepts bus requests from any of the agents within the CPU/L2, and sequences them onto and off of the external bus. In the illustrative example shown, the EBRQ handles external bus requests to and from the DCU, IFU, and BBL/L2.

Various bus agents may perform various bus requests, according to different embodiments of the invention. In one embodiment, such bus requests include read and write requests, and may be requested by the DCU, IFU, and BBL/L2 as shown in Table 1:

TABLE 1

|        | Read | Write |
|--------|------|-------|
| DCU    | X    | X     |
| IFU    | X    |       |
| BBL/L2 |      | X     |

The DCU read and write requests are, of course, data reads and writes. The IFU read request is, of course, an instruction fetch. DCU and IFU external bus requests are generally directed to the L2 cache; DCU and IFU operations onto the external bus will typically have been already looked up in, but missed, the L1 cache.

The BBL/L2 write request may be a "dirty victim writeback". When the L2 cache becomes full, new cache line allocation requires that an already occupied cache line be written out to memory. This written out cache line is said to be the "victim" of a cache line replacement. A victimized line only needs to be written out if it contains data which has been changed with respect to the non-cached (or cached-at-a-higher-level) data which that line represents. Such a changed line is "dirty". If a non-dirty line is evicted, it can simply be overwritten and ignored, because the elsewhere-existing data is still valid at that address.

Bus conflicts may occur when one requesting agent issues a write to a given address, and another agent issues a read or a write to the same address. The various units may operate completely independently of each other, but may occasionally make requests to the same address. The order in which these same-address requests get issued onto the external bus, and the way in which they are serviced, is critical in maintaining memory consistency. Various ordering schemes may be employed, such as strong or weak ordering. However, whatever ordering is used, it must be used consistently.

When one requesting unit issues a read and another requesting unit issues a write to the same address, the first unit must receive the data that the second unit is issuing. This may be accomplished by issuing the write onto the external bus before the read and by guarantying that the write will complete. Or, it may be accomplished by providing an alternative mechanism for the read-requesting unit to receive the data from the write-requesting unit.

In the embodiment shown in FIG. 9, the EBRQ accepts new requests from the IFU and the DCU through the RPA, and presents these requests to the BBL through the BSBRL, so the BBL can determine whether the L2 cache contains the requested address, or in other words, whether the L2 cache contains a cache line storing data cached from that address in memory. If an L2 cache miss occurs, the BBL signals this and asks that the requests be serviced by the external bus. This may mean that they get serviced by an L3 cache (not shown), for example, or directly from main RAM. If the request is a read request, and if the data is not in the L2 cache, the BBL may make room in the L2 cache for the data which will ultimately be returned per the request, by evicting a line from the L2 cache as described above.

Figure 10:
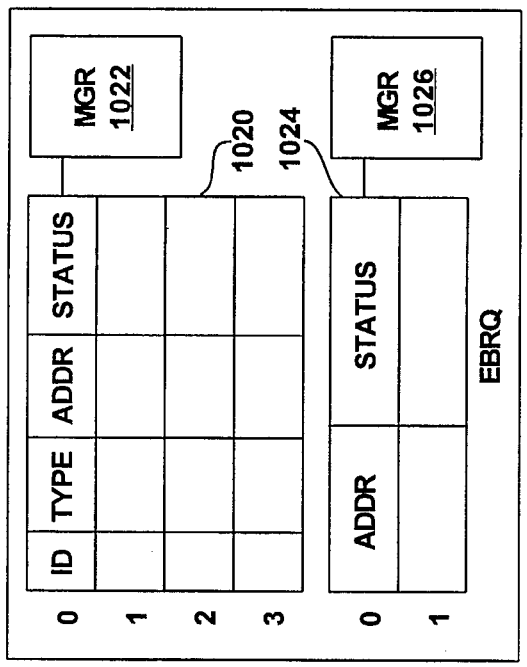
FIG. 10 is a block diagram showing further details of the external bus request queue.

FIG. 10 shows additional details about the EBRQ. The EBRQ includes a queue 1020. In order to achieve high performance across a broad range of applications, the queue 1020 may advantageously employ a first-in-first-out (FIFO) queuing mechanism for choosing which request to send to the BBL/L2 for servicing. Other schemes may be employed in other embodiments.

The queue 1020 includes one or more entries. In the illustrative embodiment shown, it contains four entries at queue locations 0 through 3. Each entry may include a variety of information about a respective request. For example, the entry may include an identification (ID) of the request, a type (TYPE) of the request such as read or write, an address (ADDR) to which the request is directed, and the current status (STATUS) of the request. Other information may also be included, as desired.

A queue manager 1022 controls the allocation and deallocation of entries in the queue 1020. New entries in the queue are allocated when a request from the IFU or DCU is accepted by the RPA. Entries are deallocated from the queue when they have been successfully serviced by the BBL/L2, or when they have been issued and successfully completed on the external bus and (optionally) returned their data to the BBL/L2, or when a serious error occurs which requires premature deallocation such as when several address parity errors occur or when a hard failure response is returned on the external bus. Thus, the queue manager 1022 operates in cooperation with the RPA.

The EBRQ may also include a list 1024 of L2 dirty victim line eviction requests. It may include one or more entries. In the illustrative embodiment shown, it includes two entries at list locations 0 and 1. Each entry may include a variety of information about evicted lines, such as the address (ADDR) of data in the line, and the status (STATUS) of the eviction writeback request.

A list manager 1026 controls the allocation and deallocation of entries in the list 1024.

When a new request arrives from the DCU or IFU, the manager 1022 allocates a next available entry at the end of the queue 1020, according to a predetermined algorithm. The details of that algorithm are not critical to understanding the invention. What is to be understood is that the new request is put at the end of the FIFO.

When that request eventually reaches the front of the FIFO, the manager 1022 removes it and the EBRQ presents it to the BBL. If the BBL is not able to service the request at that particular point in time, for whatever reason, the BBL rejects the request, and the manager 1022 again inserts the request into the queue. In one embodiment, the rejected re,quest is returned to the end of the FIFO.

Requests which are presented to the external bus may be subject to the same rejection and reinsertion scheme. For example, an external bus parity error may force the request to be rejected and reissued at a later time.

In one embodiment, rejected requests do not need to be subjected to the same ordering requirements as outlined above, with respect to other requests, but in such embodiment, appropriate steps must be taken to ensure memory consistency.

The above-detailed scheme ensures that no request is treated "unfairly", yet it provides for high system performance. However, there are additional considerations which the present invention addresses.

In the illustrative embodiment shown in FIG. 9, where the DCU, IFU, and BBL/L2 may issue read and write requests, there are four memory ordering problems which must be addressed. These are shown in Table 2:

TABLE 2

| DCU write | vs. | IFU read |
|---|---|---|
| DCU write | vs. | BBL/L2 write |
| DCU or IFU read | vs. | BBL/L2 write |
| external read | vs. | internal write |

The case of a DCU read vs. a DCU read is ignored in the embodiment shown, because the DCU will not issue two requests to the same address in a manner that would cause conflict.

This fourth case is present in a multiprocessor system. In that embodiment, a read request to a given address and issued onto the external bus by one processor cannot be followed immediately by a write request to the same address issued onto the external bus by another processor, until it can be guaranteed that the read request has snooped the second processor's cache(s) and received any modified data which was cached therein.

Thus, the first, second, and third cases are understood to be purely internal to one CPU's domain.

The illustrated components of the system of the present invention cooperate to perform a number of mechanisms or methods which serve together to prevent memory ordering problems in the EBRQ. These may include, in various embodiments: (A) same address blocking mechanism, (B) self-modifying-code handling mechanism and bus snooping mechanism, (C) backward inquiry mechanism, (D) conflict address buffer mechanism, and (E) other, more general mechanisms.

In one embodiment, as shown in FIG. 9, the CPU 914 further includes same address blocking mechanism 930, self-modifying-code and snooping mechanism 932, backward inquiry mechanism 934, and conflict address buffering mechanism 936.

The same address blocking mechanism ensures that:, when a new request is presented to the BBL for lookup in the L2 cache, its address is compared with every address in the EBRQ corresponding to a request which has already passed the L2 cache. If a match is found, the new request is rejected by the BBL and put at the end of the FIFO, as described above.

The self-modifying-code and self-snooping mechanism ensures that, when an IFU request is presented to the BBL for servicing, a self-modifying-code snoop is performed on the DCU and EBRQ to detect the presence of modified data either existing in the DCU, or in the process of being written as a request in the EBRQ. If modified data is found, the request is sent out onto the external bus with a directive to self-snoop or look back into the CPU for the modified data.

The backward inquiry mechanism ensures that, when the BBL/L2 evicts a dirty victim line, the address is looked up in the DCU and the EBRQ, to see if there exists a more recently modified version of that same data. If it is found to exist, the bus request from the L2 cache victimization is simply removed from the list and is never issued out onto the external bus.

The conflict address buffering mechanism ensures that, when a request from any agent is issued onto the external bus, its address is stored in a conflict address buffer (not shown). Comparisons with this buffer prevent the CPU from issuing any request which may conflict with a previously-issued request to the same address, until the previously-issued request can be guaranteed to be "safe". A request is safe when it has passed the so-called error window and global observation window and is thus guaranteed to complete.

These mechanisms combine to prevent memory from being reordered, or in other words, to prevent cache inconsistencies from occurring, as follows.

In the case of DCU write vs. IFU read, if the IFU read is serviced by the BBL first, the self-modifying-code snoop mechanism will detect the presence of the outgoing modified data in the EBRQ, and will instruct the EBRQ to direct the external bus to self-snoop the CPU. The self-snoop will cause the modified data for the DCU write to be written out through an implicit writeback mechanism of the CPU, and the DCU write will be canceled.

In the case of DCU write vs. BBL/L2 write, when the L2 cache dirty victim request is presented, the backward inquiry mechanism will find the DCU write request already in progress, and will cancel the BBL/L2 write request.

In the case of DCU read or IFU read vs. BBL/L2 write, if a DCU read or IFU read enters the FIFO while a BBL/L2 write to the same address is occurring, the read will be blocked from advancing past the BBL/L2 write by the same address blocking mechanism.

In the case of external read vs. internal write, the conflict address buffering mechanism prevents the internal write from being issued on the external bus until the snoop from the external read is guaranteed to have completed. If the snoop hits the outward-going modified data, the write request will be canceled.

Figure 11:
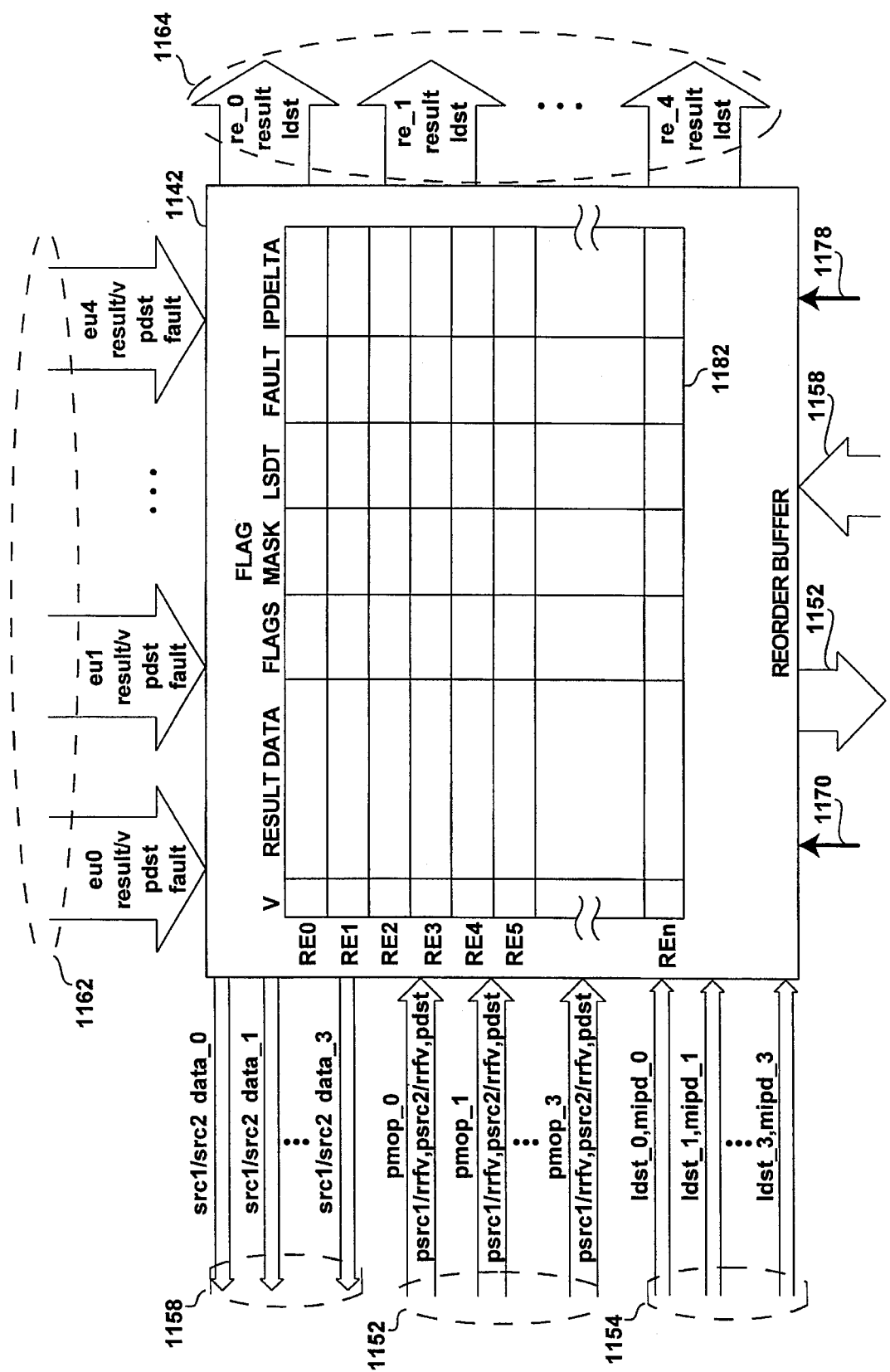
FIG. 11 illustrates the reorder circuit which contains a reorder buffer comprising a set of ROB entries (RE0 through REn) that buffer speculative result data from the out of order speculative execution of physical micro-ops.

FIG. 11 illustrates the reorder circuit 1142. The reorder circuit 1142 implements a reorder buffer 1182 comprising a set of ROB entries (RE0 through REn). The ROB entries RE0 through REn are physical registers that buffer speculative result data from the out of order execution of physical micro-ops. For one embodiment, the ROB entries RE0 through REn comprise a set of 1164 physical registers. For another embodiment, the ROB entries RE0 through REn comprise a set of 1140 physical registers.

Each ROB entry comprises a valid flag (V), a result data value, a set of flags, a flag mask, a logical destination (LDST), fault data, and an instruction pointer delta (IPDELTA).

The valid flag indicates whether the result data value for the corresponding ROB entry is valid. The reorder circuit 1142 clears the valid flag for each newly allocated ROB entry to indicate an invalid result data value. The reorder circuit 1142 sets the valid flag when speculative result data is written back to the ROB entry from the execution circuit 1140.

The result data value is a speculative result from the out of order execution of the corresponding physical micro-op. The result data value may be either an integer data value or a floating-point data value. For one embodiment, the result data value field of each ROB entry RE0 through REn comprises 1186 bits to accommodate both integer and floating-point data values.

The flags and flag mask provide speculative architectural flag information. The speculative architectural flag information is transferred to the architectural flags of the real register circuit 1144 upon retirement of the corresponding ROB entry.

The logical destination LDST specifies a committed state register in the real register circuit 1144. The result data value of the corresponding ROB entry is transferred to the committed state register specified by LDST during retirement of the ROB entry.

The fault data contains fault information for the fault processing microcode executing in the instruction fetch and micro-op issue circuit 1132. When a fault occurs, the fault handing microcode reads the fault data to determine the cause of the fault.

The IPDELTA is a macro instruction pointer delta value that identifies the macro instruction corresponding to the physical register.

The reorder circuit 1142 receives the physical micro-ops pmop_0 through pmop_3 over the physical micro-op bus 1152. The reorder circuit 1142 reads the source data specified by the physical micro-ops pmop_0 through pmop_3 from the reorder buffer 1182. The reorder circuit 1142 transfers the result data values and the valid flags from the ROB entries specified by the physical sources psrc1 and psrc2 of the physical micro-ops to the reservation and dispatch circuit 1138 over the source data bus 1158.

For example, the result data values and valid flags from the ROB entries specified by the physical sources psrc1 and psrc2 of the pmop_0 are transferred as source data src1/src2 data_0 over the source data bus 1158. The source data src1/src2 data_0 provides the source data specified by the physical sources psrc1 and psrc2 of the pmop_0 if the corresponding valid flags indicate valid source data.

Similarly, the reorder circuit 1142 transfers the result data values and valid flags from the appropriate ROB entries as the source data src1/src2 data_1 through source data src1/src2 data_3 over the source data bus 1158 for the physical micro-ops pmop_1 through pmop_3.

The reorder circuit 1142 clears the valid bits of the ROB entries specified by the physical destinations pdst the physical micro-ops pmop_0 through pmop_3 received over the physical micro-op bus 1152. The reorder circuit 1142 clears the valid bits to indicate that the corresponding result data value is not valid because the physical micro-ops pmop_0 through pmop_3 that generate the result data value are being assembled in the reservation and dispatch circuit 1138.

The reorder circuit 1142 receives the logical destinations ldst_0 through ldst_3 and the macro instruction pointer deltas mipd_0 through mipd_3 over the logical destination bus 1154. The reorder circuit 1142 stores the logical destinations ldst_0 through ldst_3 into the LDST fields of the ROB entries specified by the physical destinations pdst the physical micro-ops pmop_0 through pmop_3. The reorder circuit 1142 stores the macro instruction pointer deltas mipd_0 through mipd_3 into the IPDELTA fields of the ROB entries specified by the physical destinations pdst the physical micro-ops pmop_0 through pmop_3.

For example, the reorder circuit 1142 stores the ldst_0 and the mipd_0 into the LDST and the IPDELTA of the ROB entry specified by the physical destination pdst of the pmop_0. The logical destination in the LDST field of a ROB entry specifies a committed state register in the real register circuit 1144 for retirement of the corresponding ROB entry. The macro instruction pointer delta in the IPDELTA field of a ROB entry specifies the original macro instruction of the corresponding ROB entry.

The reorder circuit 1142 receives write back speculative result information from the execution circuit 1140 over the result bus 1162. The write back speculative result information from the execution units EU0 through EU4 comprises result data values, physical destinations pdst and fault data.

The reorder circuit 1142 stores the write back speculative result information from the execution units EU0 through EU4 into the ROB entries specified by the physical destinations pdst on the result bus 1162. For each execution unit EU0 through EU4, the reorder circuit 1142 stores the result data value into the result data value field, and stores the fault data into the fault data field of the ROB entry specified by the physical destination pdst.

The result data values from the executions circuit 1140 each include a valid flag. Each valid flag is stored in the valid flag field of the ROB entry specified by the physical destination pdst. The execution units EU0 through EU4 set the valid flags to indicate whether the corresponding result data values are valid.

The reorder circuit 1142 receives the retirement physical destinations over the retire notification bus 1170. The retirement physical destinations cause the reorder circuit 1142 to commit the speculative result data values in the ROB entries RE0 through REn to architectural state by transferring the speculative result data values to the real register circuit 1144 over the retirement bus 1164.

The retirement bus 1164 carries the speculative results for a set of retirement micro-ops rm_0 through rm_4. Each retirement micro-op rm_0 through rm_4 comprises a result data value and a logical destination ldst from one of the ROB entries RE0 through REn.

The retirement physical destinations from the retire logic circuit 1146 also cause the reorder circuit 1142 to transfer the macro instruction pointer deltas for the retiring ROB entries to the restart circuit 1148 over the macro instruction pointer offset bus 1120.

The reorder circuit 1142 receives the reorder clear signal 1178 from the restart circuit 1148. The reorder clear signal 1178 causes the reorder circuit 1142 to clear all of the ROB entries.

Figure 12:
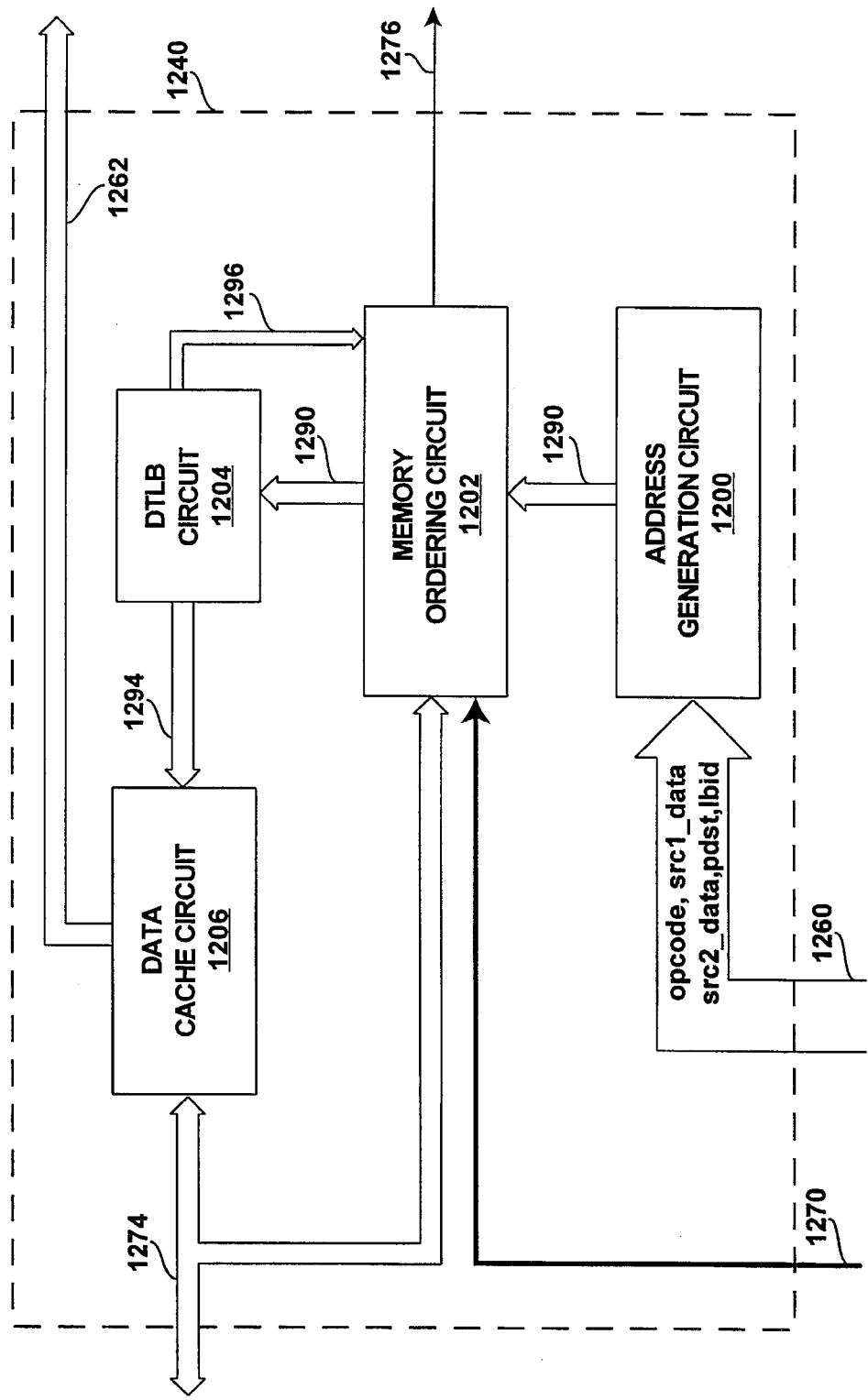
FIG. 12 illustrates a load memory circuit which comprises an address generation circuit, a memory ordering circuit, a data translate look-aside buffer (DTLB) circuit, and a data cache circuit.

FIG. 12 illustrates a load memory circuit in the execution circuit 1240. The load memory circuit comprises an address generation circuit 1200, a memory ordering circuit 1202, a data translate look-aside buffer (DTLB) circuit 104, and a data cache circuit 1206.

The address generation circuit 1200 receives dispatched load memory physical micro-ops from the reservation and dispatch circuit 1238 over the micro-op dispatch bus 1260. Each dispatched load memory physical micro-op on the micro-op dispatch bus 1260 comprises an opcode, a pair of source data values src1_data and src2_data, a physical destination pdst, and a load buffer identifier lbid.

The address generation circuit 1200 determines a linear address for each dispatched load memory physical micro-op according to the source data values src1_data and src2_data. The linear address may also be referred to as a virtual address. For one embodiment, the address generation circuit 1200 implements memory segment registers and generates the linear address according to the memory segmentation of Intel Architecture Microprocessors.

The address generation circuit 1200 transfers linear load memory micro-ops to the memory ordering circuit 1202 over a linear operation bus 1290. Each linear load memory operation on the linear operation bus 1290 corresponds to a dispatched load memory physical micro-op received over the micro-op dispatch bus 1260. Each linear load memory micro-op comprises the opcode of the corresponding load memory physical micro-op, the linear address 1_addr determined from the corresponding source data values src1_data and src2_data, the corresponding physical destination pdst, and the corresponding load buffer identifier lbid.

The memory ordering circuit 1202 contains a load buffer. The memory ordering circuit 1202 receives the linear load memory micro-ops over the linear operation bus 1290. The memory ordering circuit 1202 stores the linear load memory micro-ops in the load buffer according to the corresponding load buffer identifier lbid. The memory ordering circuit 1202 dispatches the linear load memory micro-ops from the load buffer to the DTLB circuit 104 over the linear operation bus 1290.

The DTLB circuit 1204 receives the dispatched linear load memory micro-ops from the memory ordering circuit 1202 over the linear operation bus 1290. The DTLB circuit 1204 provides a physical address to the data cache circuit 106 over a read bus 1294 for each linear load memory micro-op received from the memory ordering circuit 1202.

The DTLB circuit 1204 converts the corresponding linear address 1_addr into a physical address for the memory subsystem 1226. The DTLB circuit 1204 maps the linear address 1_addr of each linear load memory micro-op into a physical address according to a predetermined memory paging mechanism.

The DTLB circuit 1204 transfers the mapped physical address corresponding linear address 1_addr of each linear load memory micro-op to the memory ordering circuit 1202 over a physical address bus 1296. The memory ordering circuit 1202 stores the physical addresses for each linear load memory micro-op in the corresponding load buffer entry. For one embodiment, the memory ordering circuit 1202 stores a portion of the physical addresses for each linear load memory micro-op in the corresponding load buffer entry.

The data cache circuit 1206 reads the data specified by the physical address on the read bus 1294. If the physical address causes a cache miss, the data cache circuit 1206 fetches the required cache line from the memory subsystem 1226. The data cache circuit 1206 receives cache lines from the memory subsystem 1226 over an interface bus 1274 through the bus interface circuit 1230 which is coupled to the multiprocessor bus 1228.

The data cache circuit 1206 transfers the read result data, a corresponding valid bit, and fault data for the read access to the reorder circuit 1242 and the reservation and dispatch circuit 1238 over the result bus 1262. The result bus 1262 also carries the physical destination from the corresponding load buffer in the memory ordering circuit 1202.

The memory ordering circuit 1202 senses or "snoops" bus cycles on the multiprocessor bus 1228 through the bus interface circuit 1230 over the interface bus 1274. The memory ordering circuit 1202 "snoops" the multiprocessor bus 1228 for an external store or read for ownership operation by one of the processors 1223–1224 that may cause a processor ordering violation for one of the dispatched linear load memory micro-ops. The memory ordering circuit 1202 "snoops" the multiprocessor bus 1228 for an external store operation targeted for the physical address of an already dispatched linear load memory micro-op stored in the load buffer.

During retirement of each load memory physical micro-op, the memory ordering circuit 1202 generates the memory ordering restart signals 1276 to indicate a possible processor ordering violation according to the snoop detection.

Figure 13:
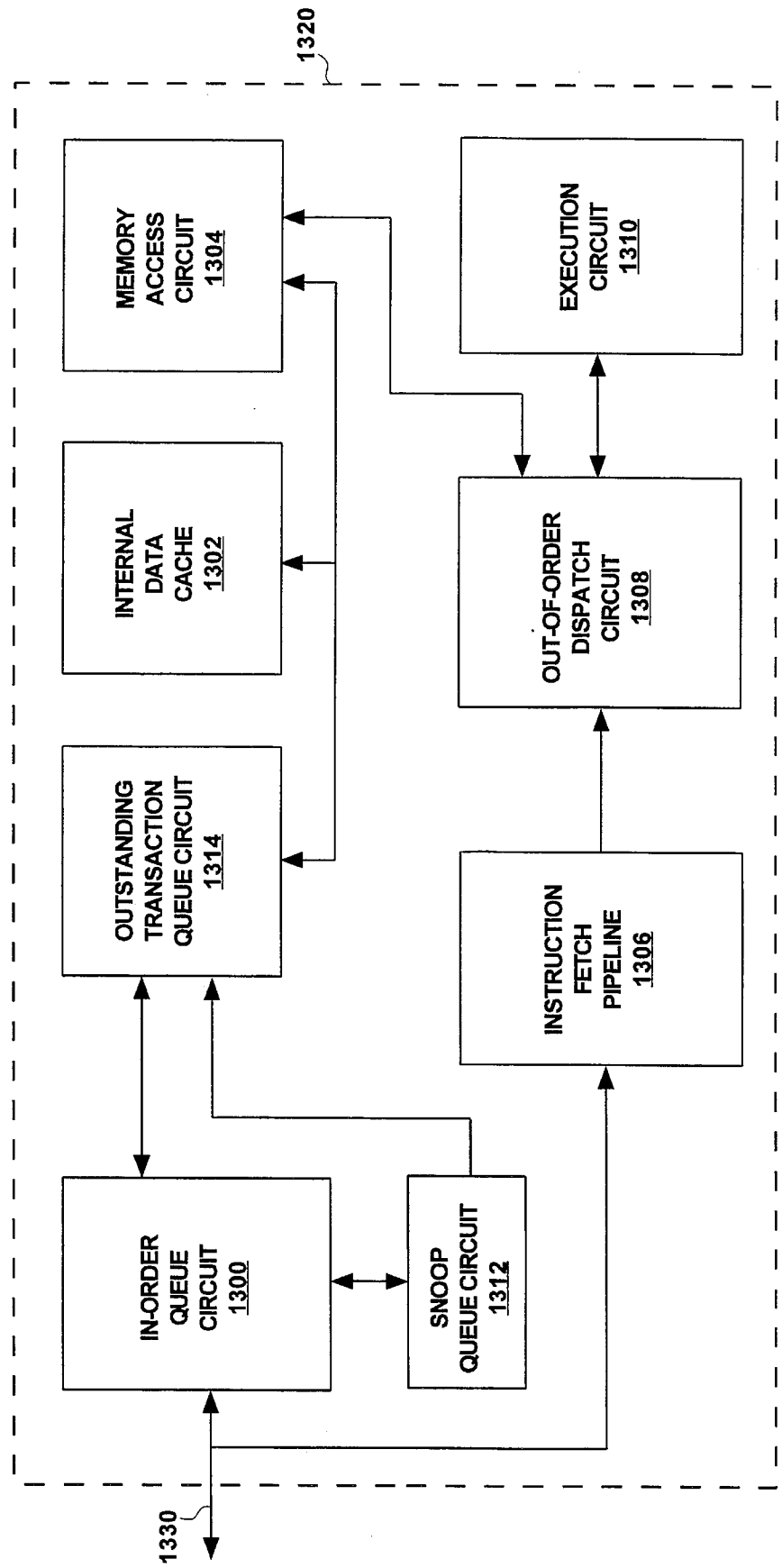
FIG. 13 illustrates a processor for one embodiment: which comprises an internal data cache, a memory access circuit, and transaction queues for tracking deferred transactions.

FIG. 13 illustrates the processor 1320 for one embodiment. The processor 1320 comprises an internal data cache 1302, a memory access circuit 1304, an instruction fetch pipeline 1306, an out-of-order dispatch circuit 1308, and an execution circuit 1310. The processor 1320 further comprises an in-order queue circuit 1300, a snoop queue circuit 1312, and an outstanding transaction queue circuit 1314.

The instruction fetch pipeline 1306 fetches an instruction stream from the memory subsystem 1326 according to a sequential program order. The instruction fetch pipeline 1306 transfers the instruction stream to the out-of-order dispatch circuit 1308. The out-of-order dispatch circuit 1308 dispatches instructions of the instruction stream to the execution circuit 1310 according to availability of source data for the instructions and execution resources in the execution circuit 1310 rather than the sequential program order.

The out-of-order dispatch circuit 1308 dispatches memory access instructions including load and store instructions to the memory access circuit 1304. The memory access circuit 1304 executes the memory access instructions by accessing the internal data cache 1302. The memory access circuit 1304 enters communication transactions in the outstanding transaction queue circuit 1314. Each entry in the outstanding transaction queue circuit 1314 corresponds to a communication transaction issued by the processor 1320 over the bus 1330. Each entry in the outstanding transaction queue circuit 1314 indicates whether the corresponding communication transaction is deferred, and indicates the final cache state for the cache, line according to completion of the communication transaction.

The in-order queue circuit 1300 logs bus transaction information for the bus 1330. Each entry in the in-order queue circuit 1300 corresponds to a transaction on the bus 1330. Each entry in the in-order queue circuit 1300 includes the status of the DEFER and HITM signals for the corresponding transactions. The outstanding transaction queue circuit 1314 obtains information to determine the final cache state for communication transactions from the in-order queue circuit 1300.

The snoop queue circuit 1312 reads the status of the DEFER and HITM signals from the in-order queue circuit 1300. The snoop queue circuit 1312 determines snoop ownership transfers for each entry of the in-order queue circuit 1300. The snoop queue circuit 1312 determines whether a transaction requires that the processor 1320 pick up snoop ownership or a cache line, or postpone snoop ownership for the cache line, or regain snoop ownership during a deferred transaction.

The memory access circuit 1304, and the outstanding transaction queue circuit 1314 maintain the cache states for the cache lines in the internal cache 1302. The cache states for the internal data cache 1302 comprise a modified state, an exclusive state, a shared state, and an invalid state. A cache line in the invalid state is not a variable in the internal data cache 1302.

A cache line in the modified state is stored in modified form in the internal data cache 1302. A modified cache line in the internal data cache 1302 is not current in the memory subsystem 1326 or in a valid state in any of the internal data caches of the processors 1321–1323 or the input/output subsystem 1325. Similarly, a modified cache line in the internal data cache 1302 is not stored in the memory subsystem 1355 or in any of the internal data caches of the processors 1350–1352 or the input/output subsystem 1354.

A cache line in the exclusive state is stored in the internal data cache 1302. The exclusive state cache line is also current in either the memory subsystem 1326 or the memory subsystem 1355.

A cache line in the shared state is stored in the internal data cache 1302. The shared cache line may also be stored in an internal data cache one of any of the processors 1321–1323 or 1350–1352 and is current in either the memory subsystem 1326 or the memory subsystem 1355.

Figure 14:
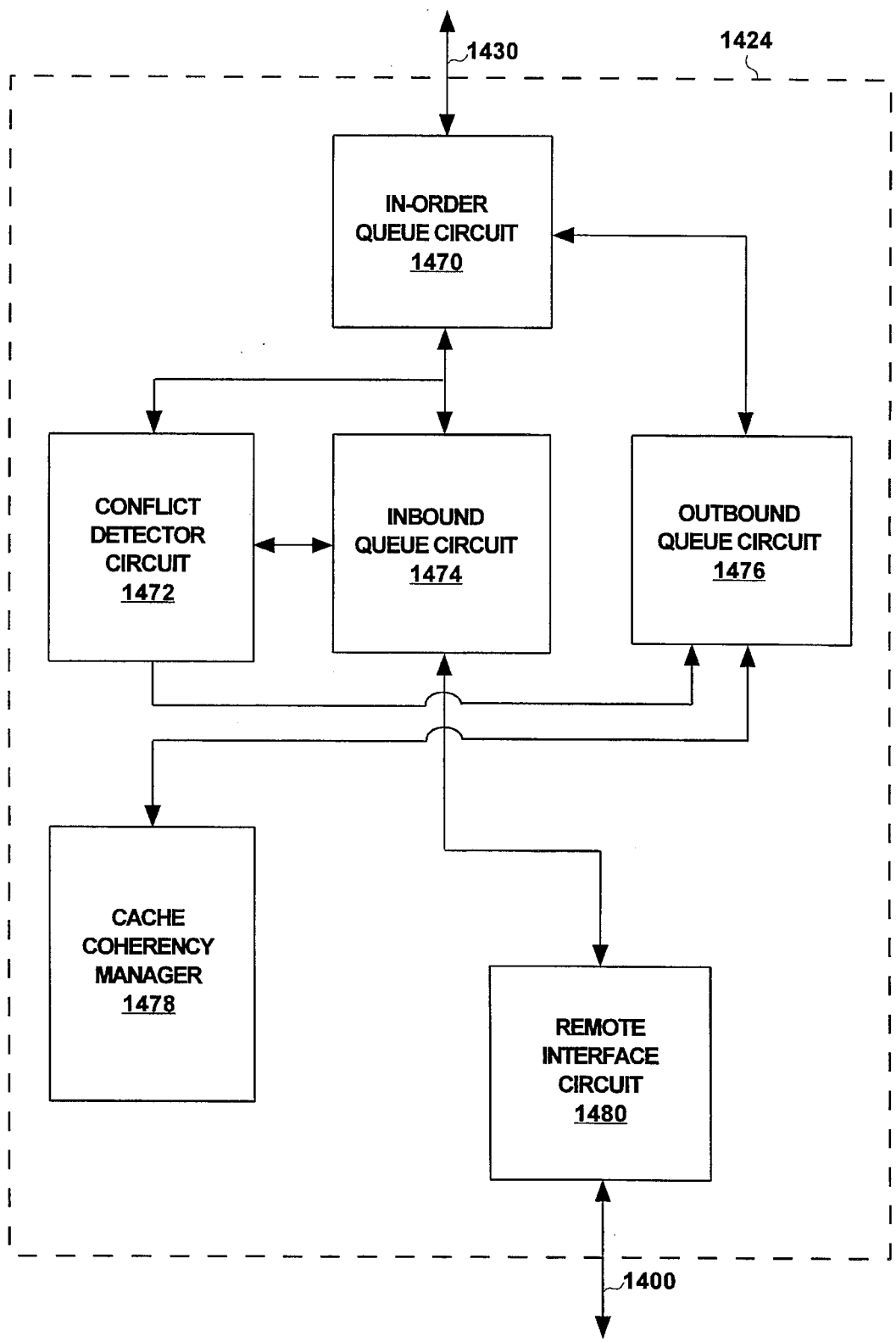
FIG. 14 illustrates a node interface circuit for one embodiment which comprises transaction queues for tracking deferred transactions and for propagating deferred transactions between bus clusters.

FIG. 14 illustrates the node interface circuit 1424 for one embodiment. The node interface circuit 1424 comprises an in-order queue circuit 1470, an inbound queue circuit 1474, and an outbound queue circuit 1476. The node interface circuit 1424 further comprises a conflict detector circuit 1472, a cache coherency manager 1478, an a remote interface circuit 1480.

The in-order queue circuit 1470 logs communication transaction information for the bus 1430. Each entry in the in-order queue circuit 1470 corresponds to a transaction on the bus 1430. The in-order queue circuit 1470 transfers communication transactions that require access to the bus duster 1412 into the inbound queue circuit 1474. The in-order queue circuit 1470 creates deferred reply transaction entries in the outbound queue circuit 1476 for communication transactions that require access to the bus cluster 1412 and consequently a later deferred reply transaction.

The remote interface circuit 1480 accesses communication transactions from the inbound queue circuit 1474 and performs the required access to the bus cluster 1412 over the system interconnect bus 1440. The remote interface circuit 1480 collects returning cache line data and snoop status from the bus cluster 1412 and writes the cache line data and snoop status into the appropriate deferred reply transaction entries in the outbound queue circuit 1476. The outbound queue circuit 1476 issues the assembled deferred reply transactions over the bus 1430. The remote interface circuit 1480 removes completed remote transactions from the inbound queue circuit 1474.

The conflict detector circuit 1472 accesses the inbound queue circuit 1474 and the in-order queue circuit 1470. The conflict detector circuit 1472 determines whether a transaction logged in the in-order queue circuit 1470 is targeted for that same cache line a remote transaction logged in the inbound queue circuit 1474. The conflict detector circuit 1472 enters an invalidate line entry for a back invalidation transaction into the outbound queue circuit 1476 if the conflicting remote access to a cache line is detected. The back invalidation transaction is later issued over the bus 1430 to cause a retry of the conflicting access.

Figure 15:
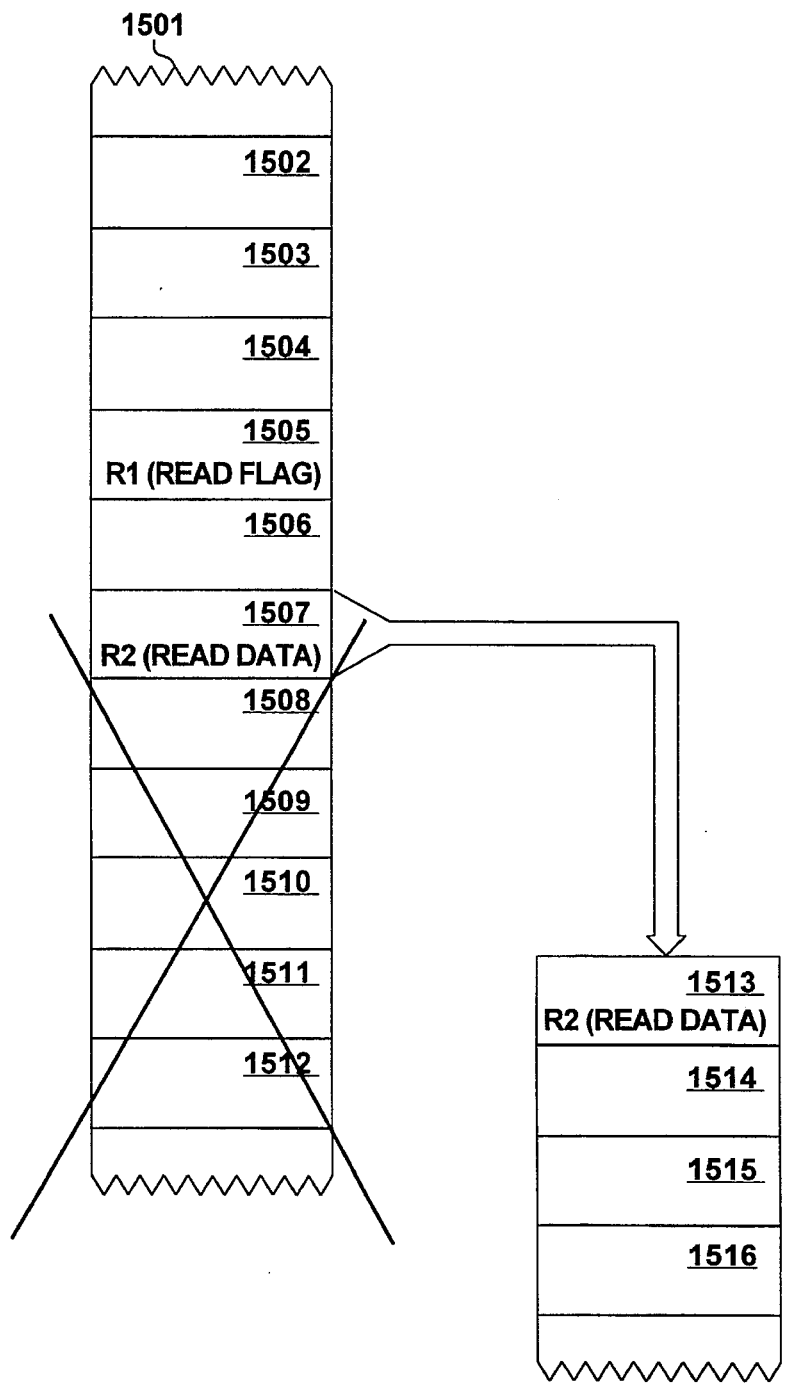
FIG. 15 shows an example of an abort and redispatch process.

FIG. 15 shows an example of an abort and redispatch process. A program flow sequence 1501 having multiple states 1502–1512 is shown. Speculative processing leads to a speculative load R2 being completed before a prior load R1. This violation is detected by snooping the load buffer when the external store W2 is executed. The detected violation results in the R2 load 1508 along with all subsequent states 1509–1512 being cleared. Later, the R2 load is redispatched. Furthermore, all the following speculative states 1514–1516 are re-calculated.

In the currently preferred embodiment, only a subset of the physical address bits are snooped. This embodiment might cause false snoop hits if the partial address matches an aliased address. False snoop hits pose no problems with respect to the correctness of processor ordering. However, false snoop hits result in the generation of false violations and violation recoveries. Excessive false snoop hits would degrade performance. Hence, utilizing a subset of the physical address bits is a tradeoff between hardware storage of the address versus performance. Furthermore, the memory system manages stores in chunks of cache lines (e.g., 32 bytes), so the store is only visible over that range (e.g., 32 bytes).

Figure 16:
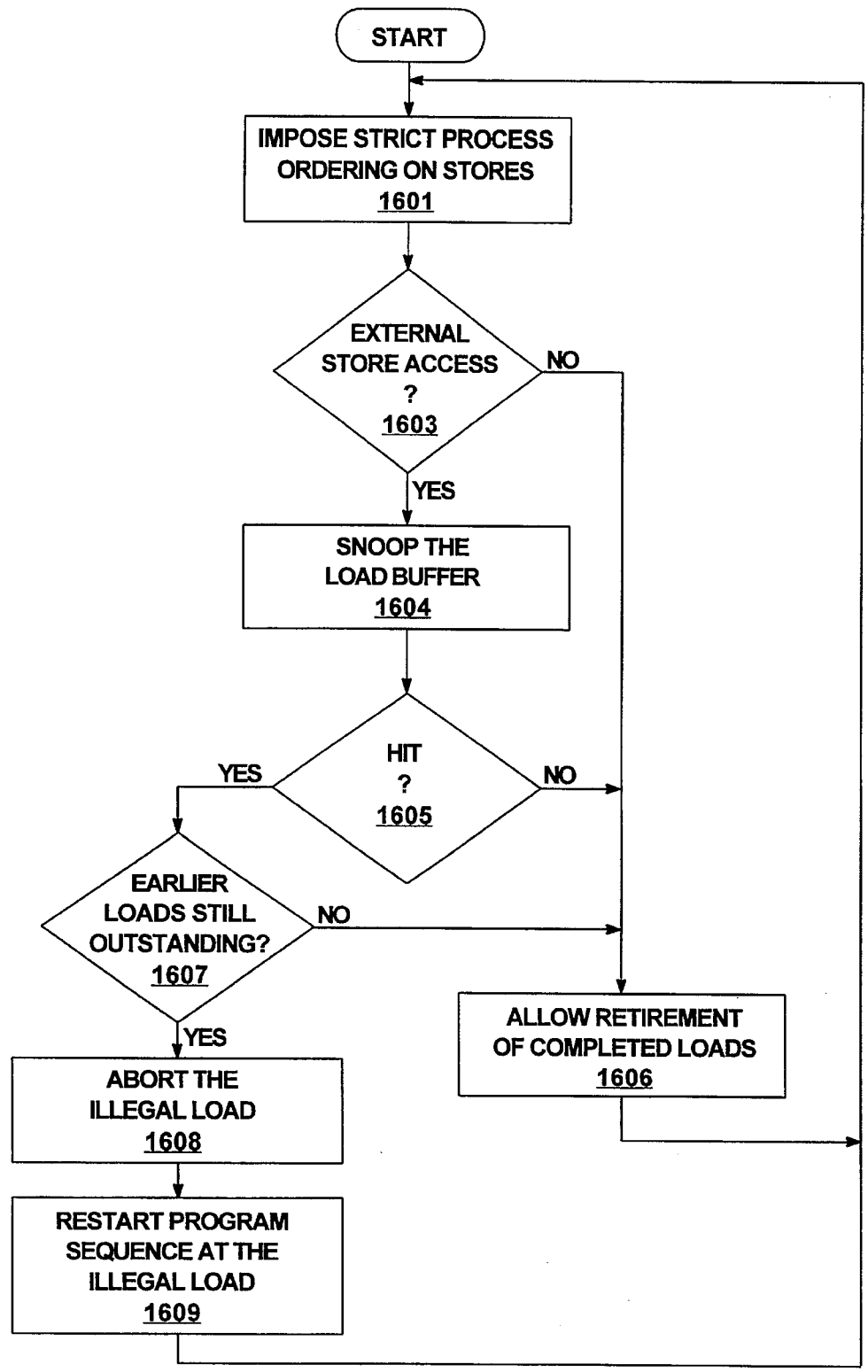
FIG. 16 is a flowchart describing the steps for providing a memory consistency model (i.e., process ordering) in a multiprocessor system.

FIG. 16 is a flowchart describing the steps for providing a memory consistency model (i.e., process ordering) in a multiprocessor system. In step 1601, strict processor ordering is imposed on stores. In other words, stores are not allowed to pass other stores. Loads are allowed to pass other loads or other stores. When another processor performs a store, the original processor's load buffer is snooped, steps 1603 and 1604. A determination is made as to whether the snoop results in a hit, step 1605. A hit occurs if the store matches the address of a load currently residing in the load buffer. If the snoop does not result in a hit (i.e., a miss), step 1601 is repeated. Note that non-snooped and snooped but not hit loads are allowed to retire in the normal manner, step 1606.

If the snoop results in a hit, a determination is made as to whether the load buffer contains an earlier load that is still outstanding, step 1607. If there is no such earlier outstanding load, then the completed stores and speculative loads are allowed to retire, step 1606. Retirement refers to the act of removing a completed micro-operation from the re-order buffer and committing its state to whatever permanent architectural state that was designated by the original instruction. Step 1601 is repeated following step 1606. Otherwise, a processor violation has occurred and is detected. The violation causes a fault signal to be generated. The fault signal from the memory subsystem is used to abort the illegal load (i.e., the load which caused the violation), step 1608. Next, the program sequence following the illegal load is aborted and restarted at a later time, step 1609. The process repeats, beginning with step 1601.

Figure 17:
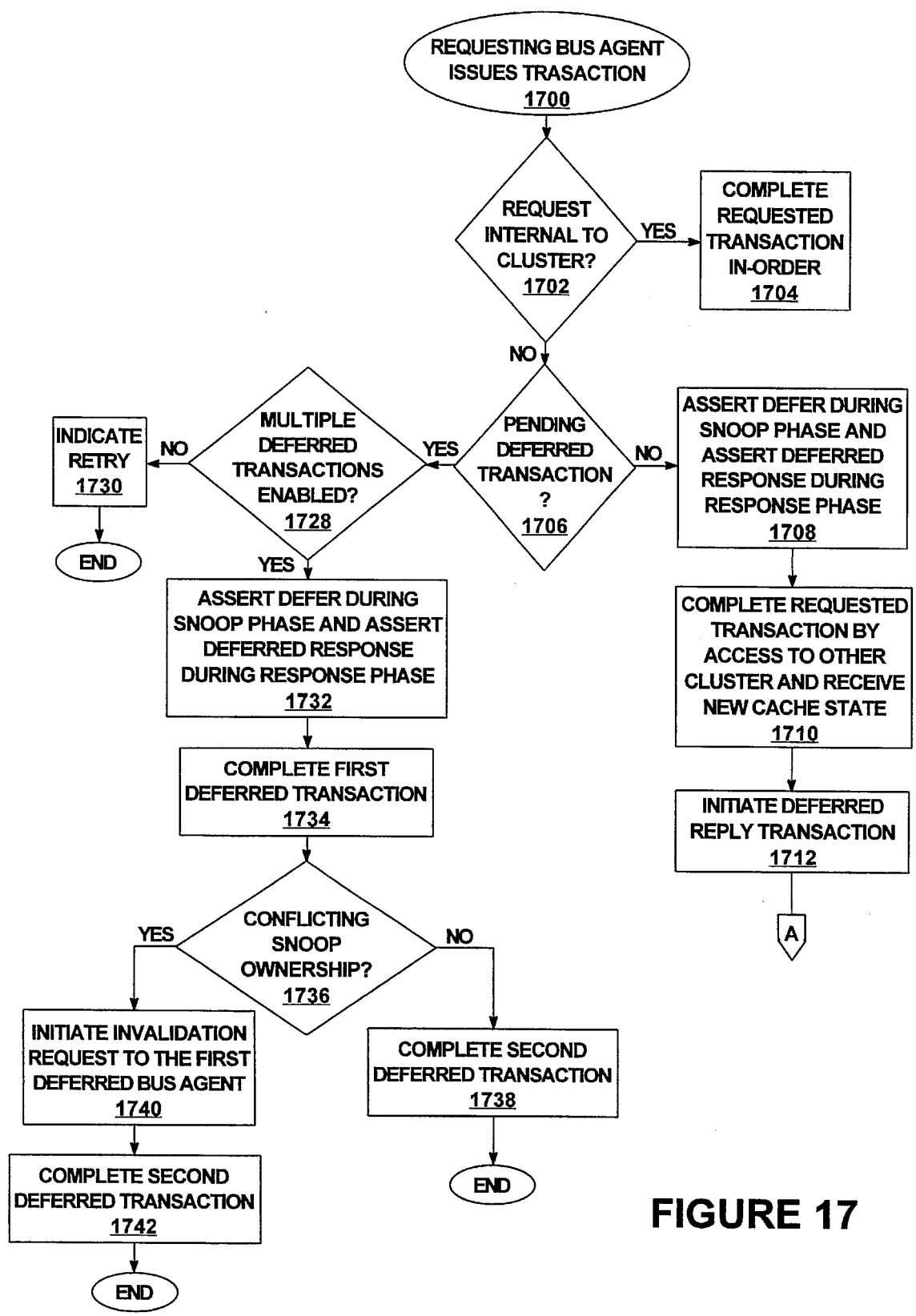
FIGS. 17–18 provide a flow chart that illustrates the handling of a communication transaction by the node interface circuit.
Figure 18:
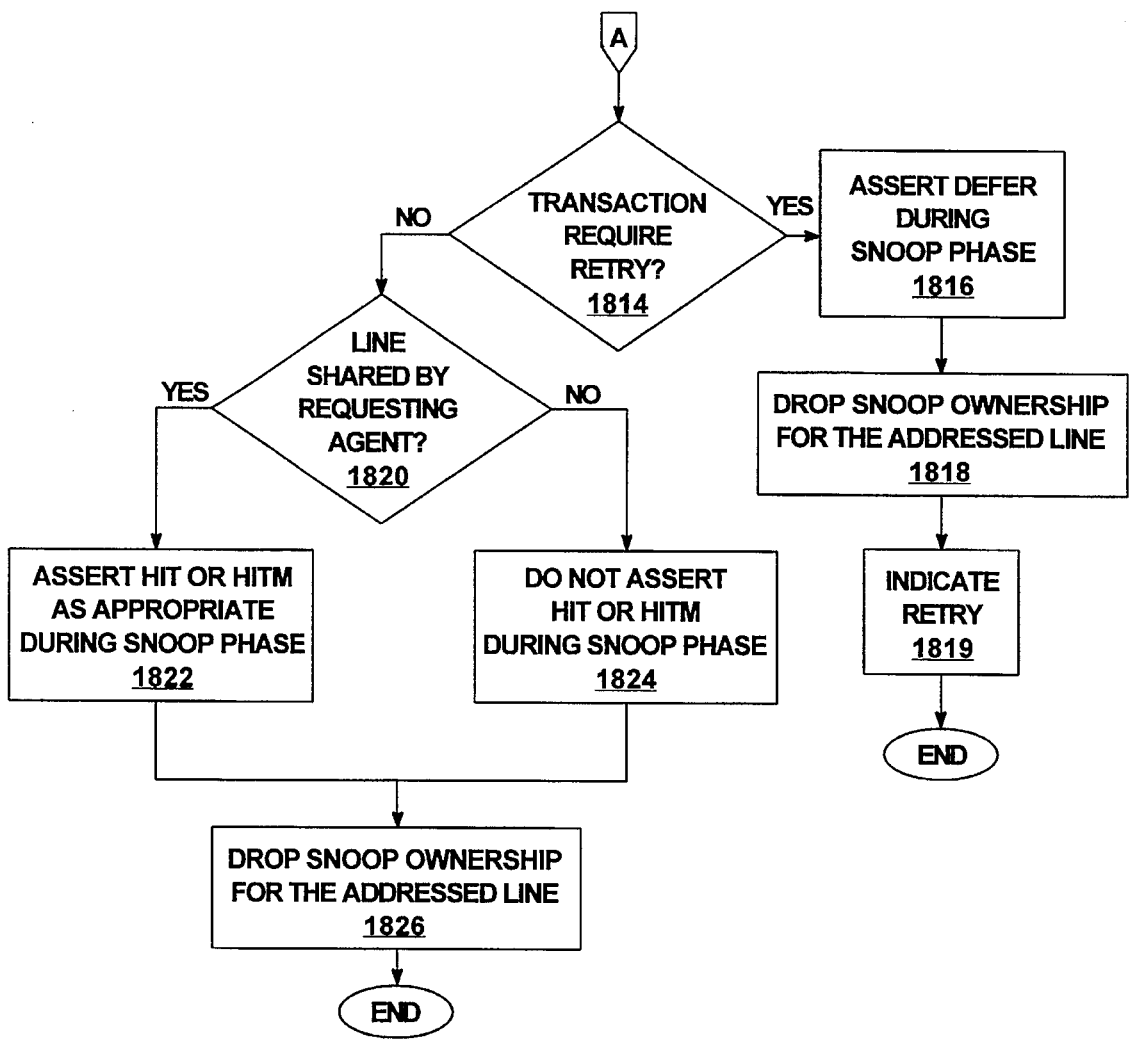

FIGS. 17–18 is a flow chart that illustrates the handling of a communication transaction by the node interface circuit. At block 1700, a requesting bus agent initiates a communication transaction over the bus.

At decision block 1702 the node interface circuit determines whether the request specified by the communication transaction can be satisfied within the bus cluster. If the request can be completed wiling the bus cluster then control proceeds to block 1704. At block 1704, the node interface circuit completes the requested communication transaction in-order, i.e. by not deferring the communication transaction.

If the node interface circuit determines that the request cannot be satisfied within the bus cluster at decision block 1702, then control passes to decision block 1706. At decision block 1706, the conflict detector circuit determines whether a deferred transaction is pending that conflicts with the communication transaction. A pending deferred transaction conflicts with the communication transaction of the pending deferred transaction and the communication transaction target the same cache line data. If a pending deferred transaction does not conflict with the communication transaction then control proceeds to block 1708.

At block 1708, the node interface circuit defers the communication transaction by asserting the DEFER signal during the snoop phase of the communication transaction and then asserting a deferred response during the response phase of the communication transaction. The not interface also creates a deferred reply transaction entry in the outbound queue. Thereafter, at block 1710 the remote interface circuit completes the communication transaction by accessing the bus cluster. At block 1710, the remote interface circuit receives a new cache state for the cache line specified by the communication transaction from the bus cluster and places the new cache state and cache line data if necessary into the corresponding deferred reply transaction entry in the outbound queue.

Thereafter, at block 1712 the node interface circuit initiates the corresponding deferred reply transaction from the outbound queue onto the bus. At decision block 1814, the node interface circuit determines whether the communication transaction requires a retry. The transaction requires a retry if not successfully completed to the bus cluster 1712. If the communication transaction requires retry at decision block 1814, then control proceeds to block 1816.

At block 1816, the node interface circuit asserts the DEFER signal during the snoop phase of the deferred reply transaction. Thereafter at block 1818, the node interface circuit drops snoop ownership for the cache line specified by the communication transaction, and at block 1819 the node interface circuit indicates a retry for the communication transaction. The snoop ownership is assumed by the original requesting bus agent for the communication transaction.

If the transaction does not require retry at decision block 1814 then control proceeds to decision block 1820. At decision block 1820, the node interface circuit determines whether the cache line specified by the communication transaction is shared with a bus agent coupled to the bus cluster. If the cache line is shared then control proceeds to block 1822.

At block 1822, the node interface circuit asserts the HIT signal or the HITM signal during the snoop phase of the deferred reply transaction according to the snoop results for the communication transaction from the bus cluster. If the cache line is not shared at decision block 1820 then control proceeds to block 1824. At block 1824 the node interface circuit does not assert the HIT or the HITM signal during the snoop phase of the deferred reply transaction. In either case, at block 1826 the node interface circuit passes snoop ownership for the cache line of communication transaction to the requesting bus agent.

If a pending deferred transaction does conflict with the communication transaction at decision block 1706 then control proceeds to decision block 1728. At decision block 1728, the node interface circuit determines whether multiple deferred transactions are enabled. If multiple deferred transactions are not enabled then control proceeds to block 1730. At block 1730, the node interface circuit indicates a retry for the communication transaction. The requesting bus agent later retries the communication transaction thereby allowing time to complete the pending deferred transaction.

If multiple deferred transactions are enabled at decision block 1728 then control proceeds to block 1732. At block 1732, the node interface circuit defers the communication transaction asserting the DEFER signal during the snoop phase and indicating a deferred response during the response phase of the communication transaction.

Thereafter, at block 1734 the first pending deferred transaction is completed in accordance with the sequence of blocks 1710–1712 and 1814–1826.

Thereafter, at decision block 1736 the cache coherency manager determines whether a conflicting snoop ownership exists between the first deferred transaction completed at block 1734 and the communication transaction deferred at block 1732 (the second deferred transaction). A snoop ownership conflict exists if the first and second deferred transactions target the same cache line. If a conflicting snoop ownership does not exist at decision block 1736 then control proceeds to block 1738. At block 1738, the node interface circuit completes the communication transaction deferred at block 1732 in accordance with blocks 1710–1712 and 1814–1826.

If a conflicting snoop ownership exists at decision block 1736 then control proceeds to block 1740. At block 1740, the node interface circuit initiates an invalidate line communication transaction on the bus to the requesting bus agent for the conflicting deferred transaction completed at block 1734. The invalidation request is a back invalidation for the first deferred transaction that invalidates the cache line having conflicting snoop ownership. Thereafter, at block 1742 the node interface circuit completes the communication transaction deferred at block 1732 in accordance with blocks 1710–1712 and 1814–1826.

Figure 19:
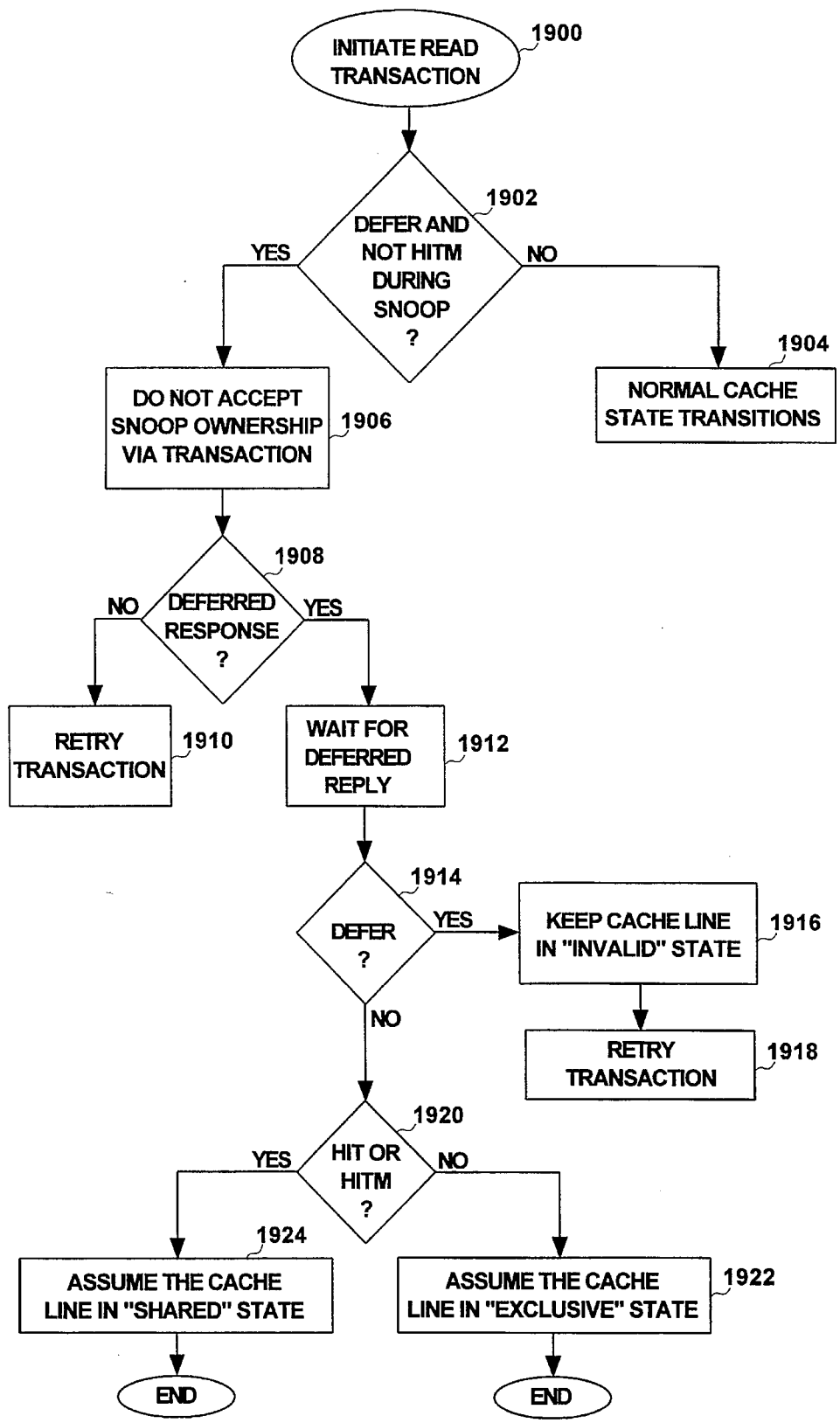
FIG. 19 is a flowchart illustrating a read transaction by a requesting bus agent.

FIG. 19 is a flowchart illustrating a read request by a requesting bus agent. At block 1900, the requesting bus agent initiates a read transaction on the bus.

During the snoop phase of the read transaction at decision block 1902, the requesting bus agent senses the state of the DEFER and the HITM signals on the bus. If the DEFER signal is asserted and the HITM signal is not asserted at decision block 1902 then control proceeds to block 1906. Otherwise control proceeds to block 1904. At block 1904, the requesting bus agent performs normal cache state transitions because the read transaction is completed in-order.

At block 1906, the requesting bus agent does not assume snoop ownership for the cache line specified by the read transaction. At decision block 1908, the requesting bus agent checks for a deferred response during the response phase of the read transaction. If a deferred response is not indicated at decision block 1908 then control proceeds to block 1910. At block 1910 the requesting bus agent retries the read transaction if the addressed bus agent indicated retry during the response phase of the read transaction.

If a deferred response is indicated at decision block 1908 then control proceeds to block 1912. At block 1912, the requesting bus agent waits for a deferred reply transaction on the bus. Thereafter, at decision block 1914 the requesting bus agent senses the DEFER signal during the snoop phase of the deferred reply transaction. If the DEFER signal is asserted during the snoop phase of the deferred reply transaction then control proceeds to block 1916. At block 1916 the requesting bus agent maintains cache line of the read transaction in the invalid state. Thereafter, at block 1918 fire requesting bus agent retries the read transaction by reinitiating the read transaction over the bus.

If the DEFER signal is not asserted during the snoop phase of the deferred reply transaction at decision block 1914 then control proceeds to decision block 1920. At decision block 1920, if the HIT signal or the HITM signal is asserted during the snoop phase during the snoop phase of the deferred reply transaction then control proceeds to block 1924. At block 1924, the requesting bus agent assumes ownership of the cache line specified in the read transaction in the shared cache state.

If the HIT or the HITM signal is not asserted during the snoop phase of the deferred reply transaction at decision block 1920 then control proceeds to block 1922. At block 1922 the requesting agent assumes ownership of the cache line specified in the read transaction in the exclusive cache state.

Figure 20:
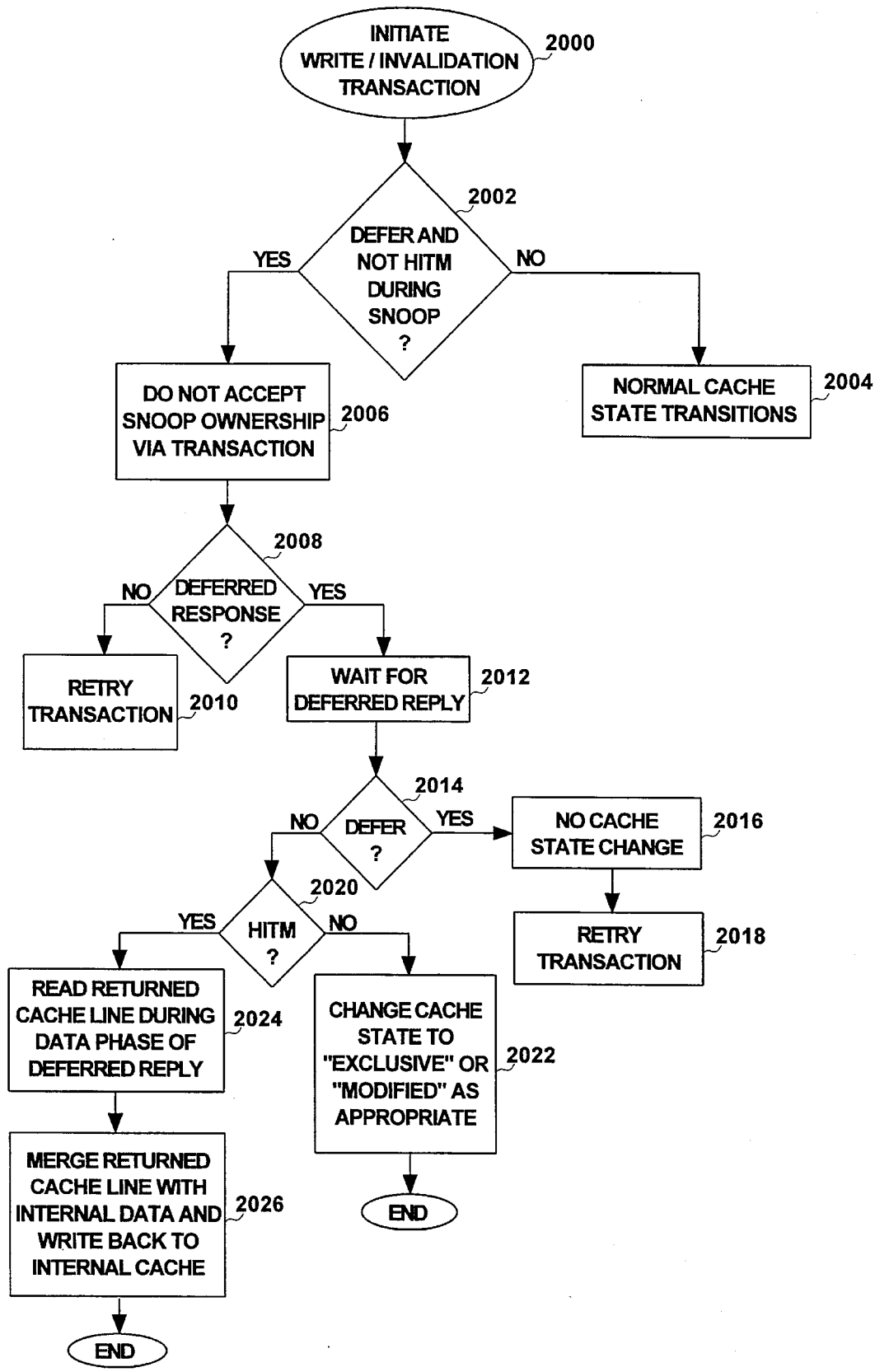
FIG. 20 is a flowchart illustrating a write transaction or an invalidation transaction by a requesting bus agent.

FIG. 20 is a flowchart illustrating a write transaction or an invalidation transaction by a requesting bus agent over the bus. At block 2000, the requesting bus agent initiates the write or invalidation transaction over the bus.

During the snoop phase of the write or invalidation transaction at decision block 2002, the requesting bus agent senses the state of the DEFER and the HITM signals on the bus. If the DEFER signal is asserted and the HITM signal is not asserted at decision block 2002 then control proceeds to block 2006. Otherwise control proceeds to block 2004. At block 2004, the requesting bus agent performs normal cache state transitions because the write or invalidation transaction is completed in-order.

At block 2006, the requesting bus agent does not assume snoop ownership for the cache line specified by the write or invalidation transaction. At decision block 2008, the requesting bus agent checks for a deferred response during the response phase of the write or invalidation transaction. If a deferred response is not indicated at decision block 2008 then control proceeds to block 2010. At block 2010 the requesting bus agent retries the write or invalidation transaction if the addressed bus agent indicated retry during the response phase of the write or invalidation transaction.

If a deferred response is indicated at decision block 2008 then control proceeds to block 2012. At block 2012, the requesting bus agent waits for a deferred reply transaction on the bus.

At decision block 2014, if the DEFER signal is asserted during the snoop phase of the deferred reply transaction then control proceeds to block 2016. At block 2016, the requesting bus agent performs no cache state changes for the cache line specified by the write or invalidation transaction. Thereafter, at block 2018 the requesting bus agent retries the write or invalidation transaction over the bus.

If the DEFER signal is not asserted during the snoop phase of the deferred reply transaction at decision block 2014 then control proceeds to decision block 2020. At decision block 2020, the requesting bus agent determines whether the HITM signal is asserted during the snoop phase of the deferred reply transaction. If the HITM signal is not asserted at decision block 2020 then control proceeds to block 2022. At block 2022 the requesting bus agent changes the cache state for the cache line of the write or invalidation transaction to the exclusive state or the modified state as indicated by the snoop results.

If the HITM signal is asserted during the snoop phase at decision block 2020 then control proceeds to block 2024. At block 2024 the requesting bus agent reads the returned cache line during the data phase of the deferred reply transaction. Thereafter, at block 2026 the requesting bus agent merges the returned cache line with internal data and writes back the merged cache line into the internal cache of the requesting bus agent.

Figure 21:
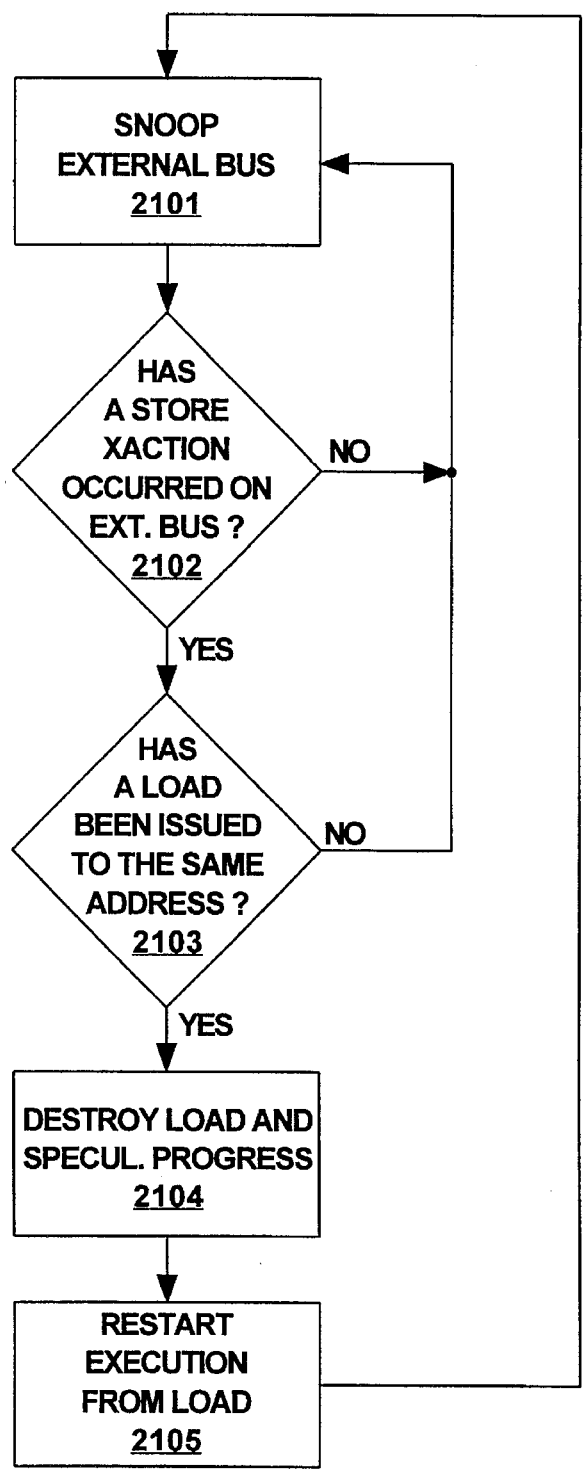
FIG. 21 is a simplified flow diagram of the operation of one embodiment of the computer system of the present invention.

FIG. 21 shows a flowchart describing the steps of one embodiment for executing a transaction. Initially, the external bus performs a snoop, step 2101. Next, a determination is made as to whether there has been a store transaction on the external bus, step 2102. If so, step 2101 is repeated. Otherwise, a determination is made as to whether there has been a load to the same address, step 2103. If there has been no load to the same address, step 2101 is repeated. Otherwise, the load and the speculative progress are destroyed, step 2104. The execution is then restarted from the load, step 2105.

Figure 22:
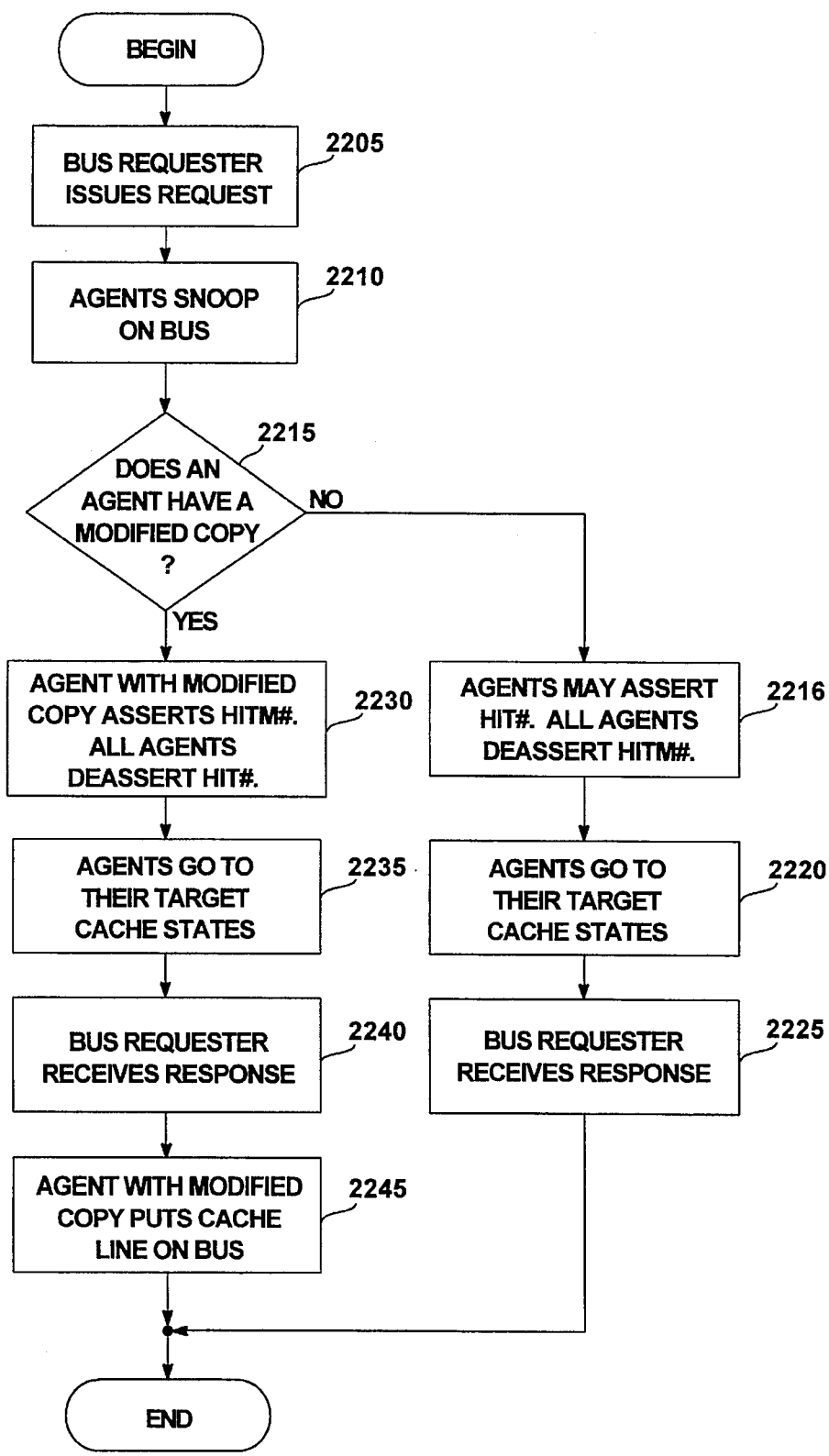
FIG. 22 is a flowchart describing the steps for supporting an operation to memory on a pipelined bus in one embodiment of the present invention.

FIG. 22 shows a flowchart describing the steps followed by one embodiment of the present invention. Initially, an agent on the processor-memory bus issues a request on the bus, step 2205, targeting another agent on bus, or perhaps a device on system I/O bus. The request is issued in the Request Phase, after the processor is awarded the bus during the Arbitration Phase. If no errors occur which require abortion of the request in the Error Phase, all agents on the bus do a snoop lookup in the Snoop Phase, step 2210.

During the Snoop Phase, each agent performing a snoop lookup determines whether it has the cache line corresponding to the request in modified state, step 2215. If no agent on the bus has a modified copy of the cache line, then each agent on the bus deasserts HITM# and either asserts or deasserts HIT#, step 2216. In some situations, agents may keep their cache lines in shared state, depending on the nature of the request; these agents assert a HIT# signal. All other agents deassert a HIT# signal. Each agent on the bus then changes the state of its cache line to its target cache state, step 2220. This target cache state is dependent on the nature of the request issued in step 2205 and is discussed in more detail below. The processor then receives a response from the target agent, memory the controller in the Response Phase, step 2225. If necessary (e.g., a read request), the processor also receives data from the target agent in the Data Transfer Phase.

However, if an agent performing a snoop lookup does have a modified copy of the corresponding cache line, then the processor asserts a HITM# signal during the Snoop Phase, step 2230. In addition, all other agents on the bus deassert a HIT# signal. The processor deasserts HIT# because in normal operation in this embodiment a processor deasserts HIT# when it asserts HITM#. All other agents deassert HIT# because no other agent can have a valid copy of the cache line if the processor has a modified copy. All agents on the bus observe the HIT# and HITM# signals. The HITM# signal from the processor informs both the processor and the memory controller that the processor has the most recent version of the requested cache line, and that any access to that cache line should therefore involve the copy of the cache line contained in the processor. The response by the processor and the memory controller to the HITM# signal is dependent on the nature of the request, as described in more detail below.

Next, each agent on the bus which must change the state of its cache line to its target cache state, step 2235. This target cache state is dependent on the nature of the request issued in step 2205 and is discussed in more detail below.

The requesting agent receives a response during the Response Phase, step 2240. The content of this response is dependent on the initial request, whether the target agent can respond, and whether a HITM# signal was asserted by an agent on the bus. If the HITM# signal was asserted by the processor, then data from the processor is placed on the bus during the Data Transfer Phase. The memory controller and/or the processor may then latch, or take, the data off the bus. How the memory controller and/or the processor use this data is dependent on the original request, as described in more detail below.

The processor, after asserting the HITM# signal, places the entire cache line onto the bus in the Data Transfer Phase, step 2245. Thins action by the processor is termed an "Implicit Writeback Data Transfer." The Implicit Writeback Data Transfer is performed by a processor in the Data Transfer Phase of a transaction when that processor asserts a HITM# signal during the Snoop Phase for that transaction.

Figure 23:
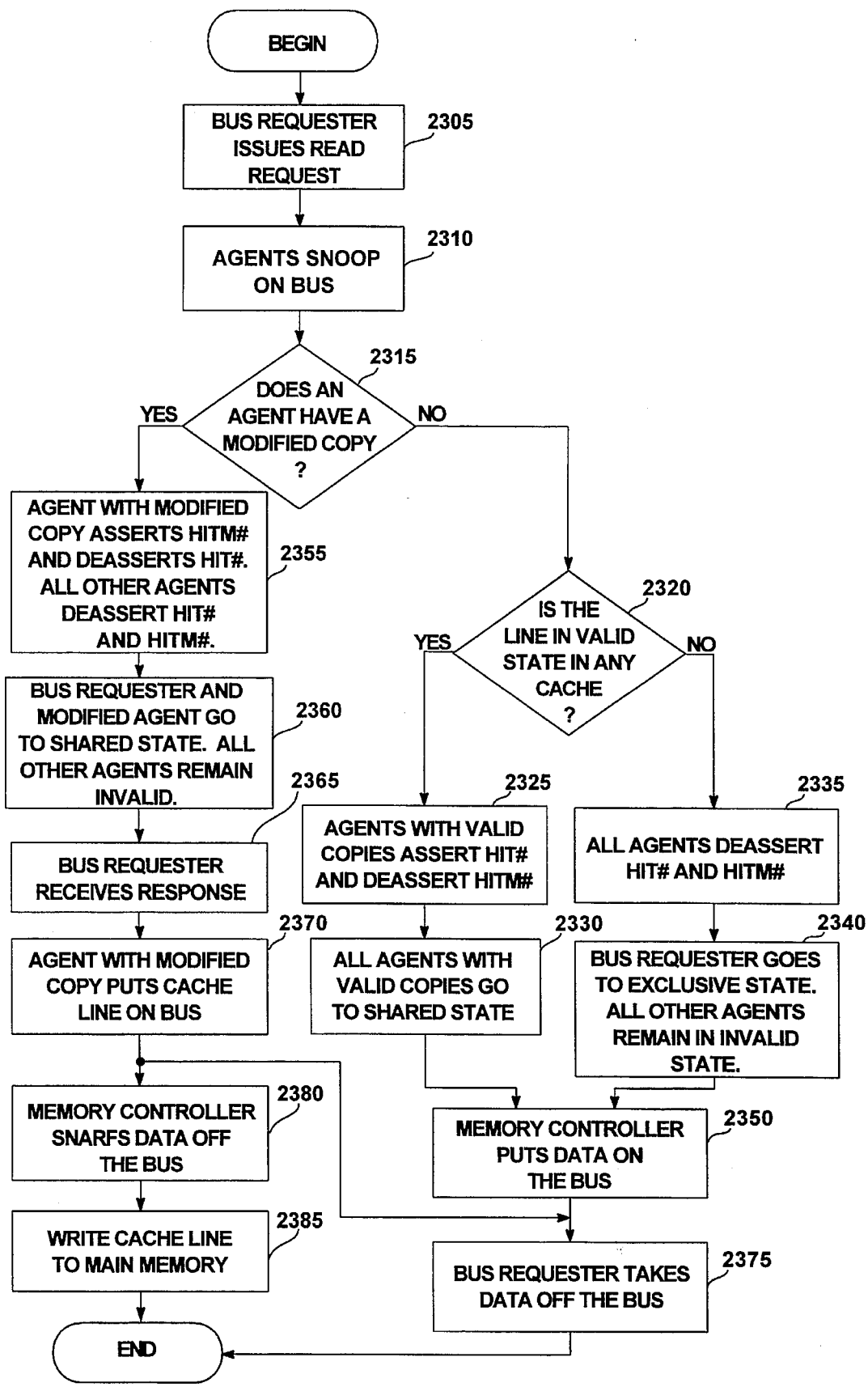
FIG. 23 is a flowchart describing the steps for performing a read operation on a pipelined bus in one embodiment of the present invention.

FIG. 23 shows a flowchart describing the steps followed by one embodiment of the present invention during a read request in the system. The requesting processor issues a request onto the bus during the Request Phase, step 2305. The request shown in FIG. 23 is a read request targeted to the main memory. As above, all other agents on the bus perform a snoop lookup, step 2310, to determine whether an agent has a copy of the requested cache line in modified state, step 2315.

In the event no agent on the bus has a modified copy of the cache line, the steps which are followed are dependent on whether any agent has a copy of the cache line in a valid state, step 2320. If an agent has a copy of the cache line in a valid state, then that agent asserts a HIT# signal and deasserts a HITM# signal, step 2325. All agents without a valid copy deassert both HIT# and HITM# signals. Thus, the agents on the bus know that one or more agents have a valid copy of the cache line, but that no agent has a modified copy of the cache line. Therefore, each agent on the bus with a valid copy of the cache line changes that cache line's state to shared state, step 2330. The requesting agent also changes its state for that cache line to, shared state because the processor will be receiving a valid copy of the cache line in the Data Transfer Phase, as described below.

Figure 24:
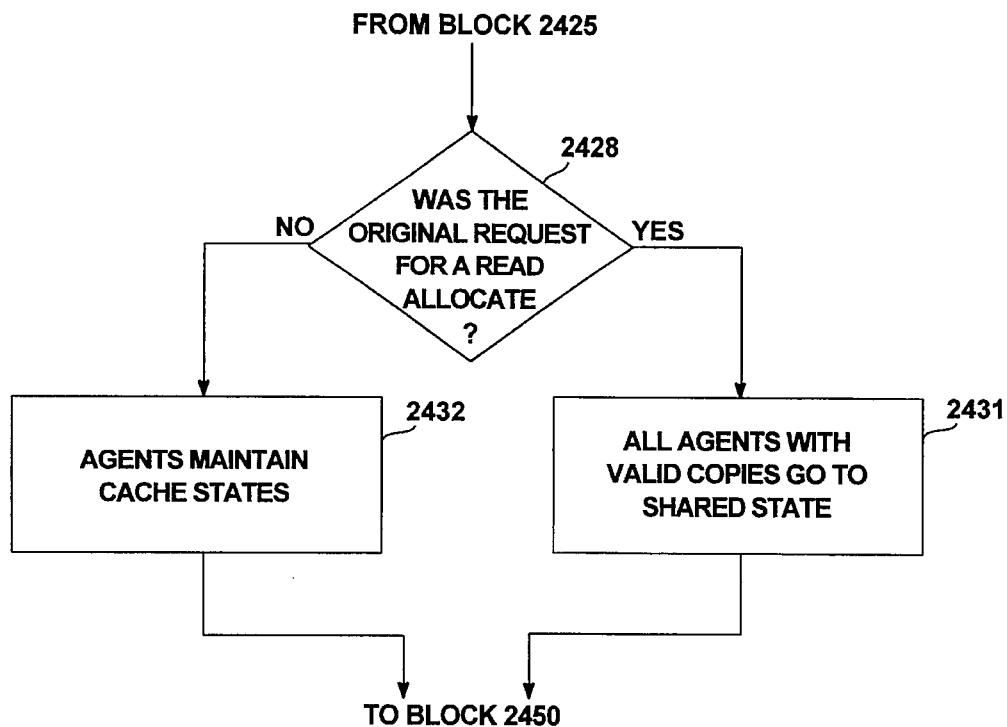
FIG. 24 is a flowchart describing the steps for updating cache states in a read operation in an alternate embodiment of the present invention.

In an alternate embodiment, shown in FIG. 24, each agent changes state to its target state dependent on the original read request. As shown in FIG. 24, the target state is dependent on whether the original request was a read allocate request, step 2428. The processor may request no read allocate, for example, to indicate it is not maintaining a copy of the cache line in its cache. If the processor requests read allocate, then each agent on the bus with a valid copy of the cache line, including the processor, changes that cache line's state to shared state, step 2431. However, if the processor does not request read allocate, then each agent on the bus maintains its cache state for that cache line, step 2432. Thus, an agent in exclusive state remains in exclusive state and agents in shared state remain in shared state.

Returning to the embodiment of FIG. 23, step 2320, in the event no agent on the bus has a valid copy of the cache line, then all agents deassert both HIT# and HITM# signals, step 2335. Thus, the processor changes its copy of the cache line to exclusive state because it will be receiving the cache line from the memory controller in the Data Transfer Phase; all other agents keep the cache line in invalid state, step 2340.

The memory controller satisfies the read request, regardless of whether an agent had a valid copy of the cache line, because no agent had a modified copy of the requested cache line. The memory controller issues a normal response in the Response Phase to the processor and places the corresponding data on the bus during the Data Transfer Phase, step 2350. The processor then retrieves the data from the bus, step 2375, and proceeds to utilize the data as needed.

Returning to step 2315, if an agent on the bus, such as a processor, has a modified copy of the requested cache line, then the processor asserts a HITM# signal and deasserts a HIT# signal during the Snoop Phase, step 2355. All other agents on the bus deassert both HIT# and HITM# signals. The assertion of the HITM# signal informs the memory controller that another agent on the bus has the most recent version of the requested data. Thus, the memory controller knows that it should not transfer its version of the requested cache line to the processor.

The cache states for this cache line are also updated in the processors in the Snoop Phase, step 2360. One processor transfers ownership of the cache line to the requesting processor. In one mode, both processors change their cache line states to shared state and ensure the main memory updates its version of the cache line. One embodiment of the present invention follows this approach, step 2360, due to its efficient handling of partial write data transfers, discussed in more detail below. In an alternate mode, the processor could transfer the cache line to another processor and change its cache line to invalid state while the processor changes its cache line to modified or exclusive state.

Thus, when both processors change their cache line states to shared state, in the Snoop Phase for subsequent transactions on the bus neither processors assert a HITM# signal for this cache line. The memory controller has the responsibility of responding to any subsequent requests for this cache line (until some other caching agent regains ownership of the cache line and changes its cache line state to modified state).

Figure 25:
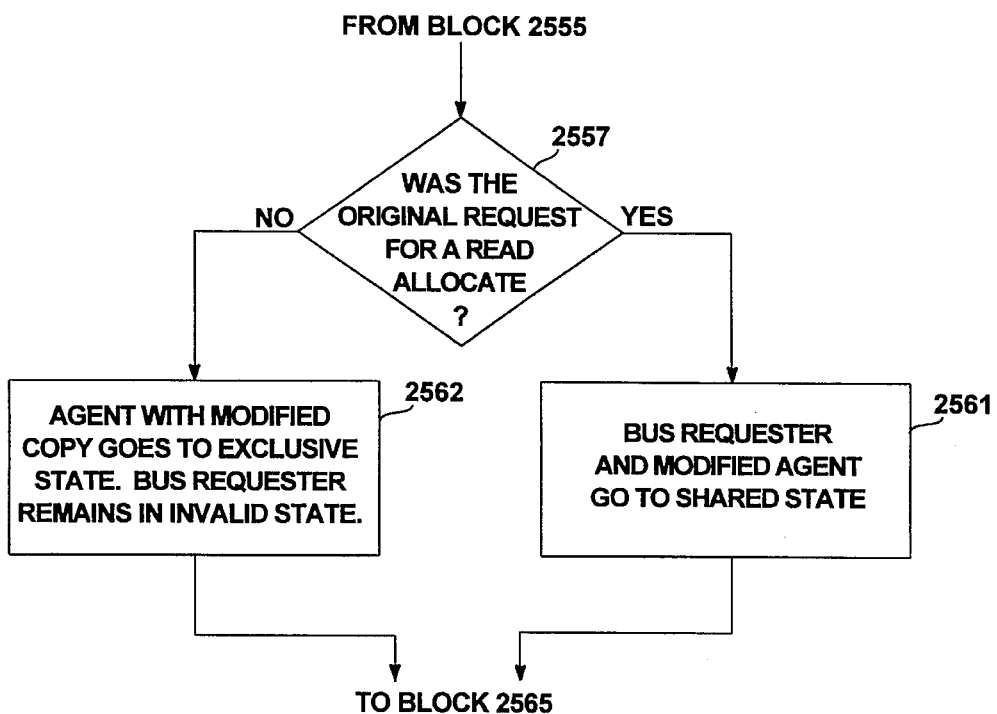
FIG. 25 is a flowchart describing the steps for updating cache states in a read operation in another embodiment of the present invention.

In an alternate embodiment, shown in FIG. 25, each agent updates its cache state dependent on the original read request. As shown in FIG. 25, the target state is dependent on whether the original request was a read allocate request, step 2557. If the processor requests a read allocate, then the agent with a modified copy of the cache line changes that cache line's state to shared state and the processor changes its cache line to shared state, step 2561. However, if the processor does not request a read allocate, then the agent with a modified copy of the cache line changes that cache line to exclusive state and the processor remains in invalid state, step 2562. The agent with a modified copy of the cache line does not remain in invalid state because main memory will receive a copy of the cache line, as described below.

Returning to the embodiment of FIG. 23, it should be understood by those skilled in the art that although ownership of a cache line is transferred prior to the actual transfer of the cache line's data, cache consistency is maintained due to the pipelined nature of the bus. That is, a subsequent request may be informed that the data will come from the main memory even though the modified version is still in the cache of the processor. However, by the time the Data Transfer Phase for the subsequent request arrives, the data will have already been transferred to the main memory in the Data Transfer Phase of a prior transaction.

After the cache states are updated, the memory controller issues an Implicit Writeback Response to the processor, step 2365, in the Response Phase. The assertion of the HITM# signal by the processor informed the memory controller that it should not transfer its version of the cache line to the processor; thus, the memory controller issues an Implicit Writeback Response rather than a normal response. The Implicit Writeback Response informs the processor that the request has not been retried, but that another agent on the bus has a modified copy of the requested cache line and will be responding with the requested data.

The processor places the entire modified cache line on the bus in the Data Transfer Phase, step 2370. In one embodiment of the present invention, the processor places the cache line onto the bus in response to a signal from the memory controller indicating it is ready for a data transfer. The memory controller issues this signal during the response phase when it has an available cache line buffer in which to place the cache line. As shown in FIG. 23, both the memory controller and the requesting agent take the data off the bus, steps 2380 and 2375 respectively. Requesting the processor takes the data off the bus, step 2375, and proceeds to use it as needed.

The memory controller also takes the data off the bus, step 2380. This action by the memory controller is termed "snarfing" the data because the memory controller is taking data off the bus which was requested by another agent. The memory controller then writes the data to main the processor, step 2385, thereby maintaining cache consistency. That is, as described above, when the processor requests data which is in modified state in another processor, the processor transfers the data to the other processor and both change their cache lines to shared state. Shared state, however, requires that the main memory also has the most recent version of the cache line. Thus, by snarfing the cache line and writing it to main memory, both processors and main memory have the most recent copy of the cache line.

In a multiple-bus hierarchy the cluster manager acts as the memory controller on the bus for purposes of the discussion related to FIG. 23. For example, the cluster manager snarfs the data off the bus and updates its cache rather than the memory controller snarfing the data. In such a situation, the cluster manager either defers or retries the request, depending on whether ownership of the next level bus is available. In this situation, the global observation of the transaction which would have occurred at step 2340, as well as the placing of data on the bus step 2350, is deferred as discussed above.

Figure 26:
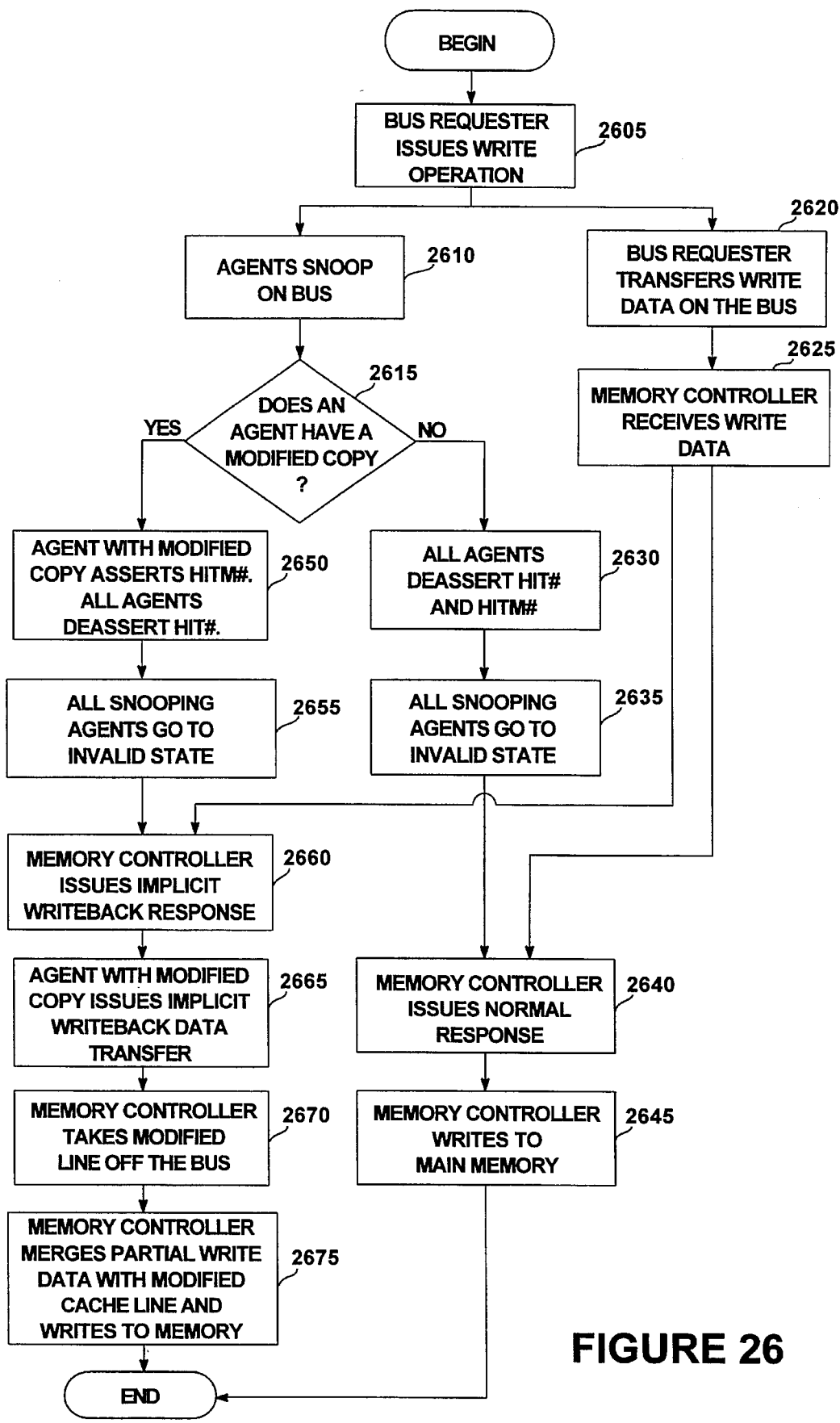
FIG. 26 is a flowchart describing the steps for performing a write operation on a pipelined bus in one embodiment of the present invention.

FIG. 26 shows a flowchart describing the steps followed by one embodiment of the present invention during a write operation. The requesting processor issues a request onto the bus during the Request Phase, step 2605. The request shown in FIG. 26 is a write operation targeted to the main memory. All other agents on the bus perform a snoop lookup, step 2610, to determine whether an agent has a copy of the cache line being written to in modified state, step 2615.

In addition to agents performing a snoop lookup, the processor places its write data onto the bus, step 2620; the write data is received by the memory controller, step 2625. As shown in FIG. 26, this transfer of write data by the requesting processor occurs regardless of whether an agent on the bus has a modified or valid copy of the cache line. In one embodiment of the present invention the processor places the write data onto the bus upon receipt of a signal from the memory controller in the Snoop Phase indicating the memory controller is ready for a data transfer.

In the event no agent on the bus has a modified copy of the cache line, all agents on the bus deassert both HIT# and HITM# signals, step 2630. The existence of the write operation indicates to all snooping agents that their copy of the cache line must be invalidated; thus, all snooping agents change the state of their cache line to invalid, step 2635. The deassertion of the HIT# and HITM# signals indicates to the memory controller that it must satisfy the write request, as no valid or modified copy of the cache line exists in any agent's cache. Thus, the memory controller issues a normal response to the processor in the Response Phase, step 2640. The memory controller, which received the write data in step 2625, then writes the data to the main memory, step 2645, thereby completing the write operation.

Figure 27:
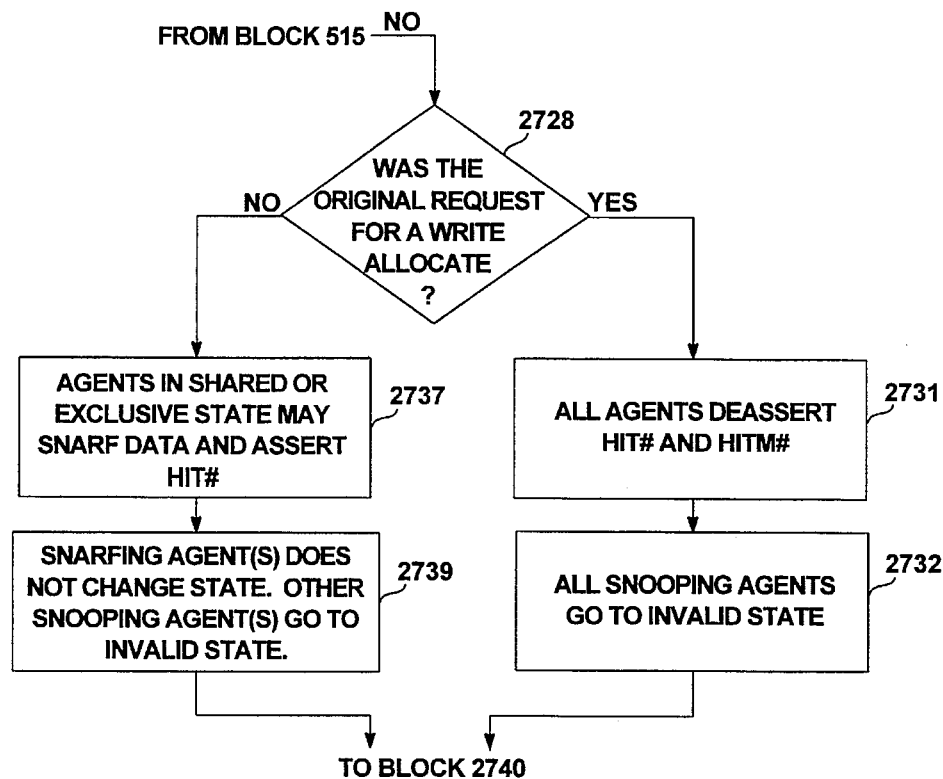
FIG. 27 is a flowchart describing the steps for updating cache states in a write operation in an alternate embodiment of the present invention.

In an alternate embodiment, shown in FIG. 27, each agent asserts or deasserts a HIT# signal and updates its cache state dependent on the original write request, step 2728. If the processor requests a write allocate, then all agents deassert HIT# and HITM#, step 2731. All snooping agents also change the state of their cache line to invalid, step 2732. However, if the processor does not request a write allocate, then an agent(s) with a shared or exclusive copy of the cache line snarfs the data, asserts a HIT# signal and deasserts a HITM# signal, step 2737. The agent(s) which asserted a HIT# signal does not change that cache line's state; all other agents on the bus go, to invalid state, step 2739. In one mode, the agent(s) does not snarf the data and assert a HIT# signal if it does not want a valid copy of the cache line.

Returning to the embodiment of FIG. 26, step 2615, if an agent on the bus, such as the processor has a modified copy of the requested cache line, then the processor asserts a HITM# signal and deasserts a HIT# signal during the Snoop Phase, step 2650. Since the processor had a modified copy of the cache line, all other agents on the bus also deassert a HIT# signal. The assertion of a HITM# signal informs the memory controller that another agent on the bus has the most recent version of the requested data. Thus, the memory controller knows that merely performing the write operation by the processor may not maintain cache consistency.

For example, if the write operation by the processor is a partial write data transfer, then the entire cache line is not modified by this write operation. If a more recent version of the cache line exists in the cache of the processor, portions of the cache line in the processor not being written to by the other processor may have been modified by prior write operations. Thus, if the cache line in the processor were not taken into account, the main memory would have an incorrect copy of the data, even though it believes it has the most recent copy.

As discussed above, the states of this cache line are updated in the Snoop Phase. All snooping agents on bus 2655 change their cache lines to invalid state, step 2655.

The memory controller observed the HITM# signal issued by the processor in step 2650; thus, the memory controller knows that a modified version of the cache line exists in an agent's cache. In response, the processor controller temporarily stores the write data received in step 2625 in a snarfing buffer and holds the data in the snarfing buffer until the remainder of the cache line is transferred over the bus, as described below. In addition, the memory controller issues an Implicit Writeback Response to the processor, step 2660. The Implicit Writeback Response informs the processor that another agent on the bus had a modified copy of the cache line and that this modified cache line will be placed on the bus during the Data Transfer Phase.

Figure 28:
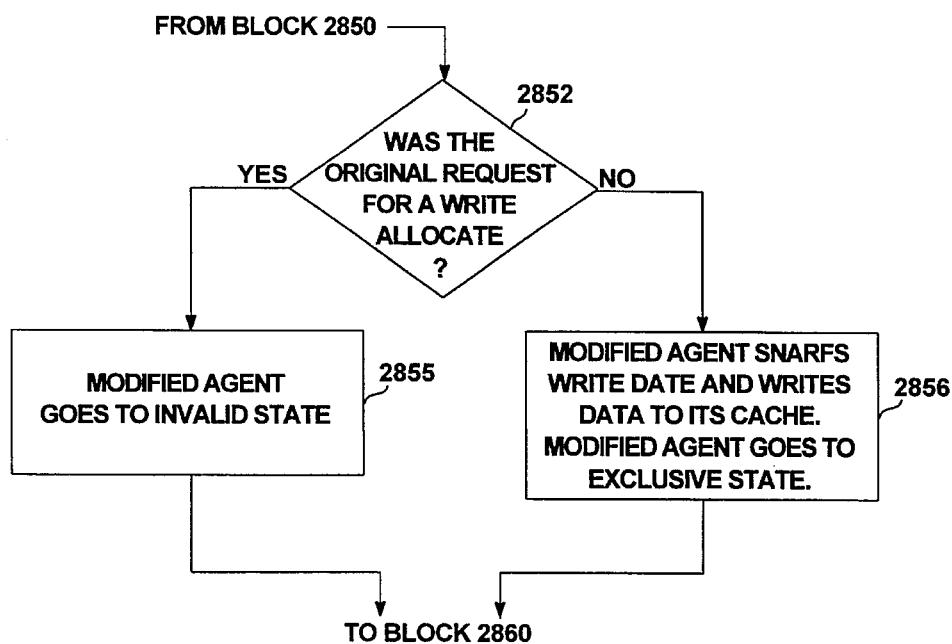
FIG. 28 is a flowchart describing the steps for updating cache states in a write operation in another embodiment of the present invention.

In an alternate embodiment, shown in FIG. 28, the agent which asserted the HITM# signal may also take the write data off the bus. Whether the processor takes the data off the bus is dependent on the write allocate policy employed, step 2852. That is, if the processor requests no write allocate then the other processor takes the data off the bus and writes the data to its cache, step 2856. The processor also changes its state for the cache line to exclusive. However, if the processor requests a write allocate, then the other processor does not take the data off the bus and changes its cache line to invalid state, step 2855.

Returning to the embodiment of FIG. 26, the main memory maintains the most recent version of the cache line. This is done so that main memory is updated rather than continuously updating the agent caches.

Thus, in the Data Transfer Phase, the processor places the entire modified cache line on the bus, step 2665. This data transfer is the Implicit Writeback Data Transfer. The Implicit Writeback Data Transfer must be done in order to provide the memory controller with the additional portion of the cache line which may not have been written to by the processor. In one embodiment of the present invention, the other processor places the cache line onto the bus in response to a second signal from the memory controller indicating it is ready for a data transfer. The memory controller issues this signal in the Response Phase when it has an available cache line buffer in which to place the cache line.

The memory controller takes the modified cache line from the Implicit Writeback Data Transfer off the bus, step 2670. In one mode, this data is temporarily stored in a cache line buffer within the memory controller. The data is then merged with the data stored in the snarfing buffer, described above, and the merged cache line is written to the main memory, step 2675. To perform the merge, the memory controller combines the portion of the cache line in the snarfing buffer with the data received from the Implicit Writeback Data Transfer that does not overlap the updated portion in the snarfing buffer.

It should be noted that although the above discussion refers to partial write data transfers, the steps employed apply equally to a non-partial write data transfer. That is, if the entire cache line was updated by a write operation from the processor, then the entire cache line would be stored in the snarfing buffer in the memory controller. Subsequently, when the memory controller performs the merge in step 2665, the result of the merge would simply be the data stored in the snarfing buffer; no data from the Implicit Writeback Data Transfer would be used in the merge.

In one embodiment the requesting processor changes its state for the cache line to invalid state in the Snoop Phase. In an alternate embodiment, the processor changes its state for the cache line to shared state or exclusive state, depending on whether another agent also has a copy of the cache line. In one mode, if a HITM# signal was asserted during the Snoop Phase, then the processor snarfs the Implicit Writeback Data from the bus. The processor then merges this data with its original write data, and updates its cache with the merged cache line. Thus, the processor would change its state for the cache line to exclusive state. In another mode, if no HITM# signal was asserted then the processor changes its cache line state to exclusive state, or shared state if other agents on the bus are keeping valid copies of the cache line.

The cluster manager acts as the memory controller on the bus for purposes of the discussion related to FIG. 26. For example, the cluster manager receives the write data from the processor, merges it with the Implicit Writeback Data Transfer from another processor, and stores the merged cache line in its own cache. Thus, the cluster manager would have a modified copy of the cache line for any subsequent requests to that cache line. The situation could arise where the cache line processor is writing to is invalid within the cluster and access must be made to the next level bus. In such a situation, the cluster manager either defers or retries the request, depending on whether ownership of the next level bus is available. In this situation, the global observation of the transaction which would have occurred at step 2635, as well as the write step 2645, is deferred as discussed above.

As shown in FIGS. 22–26, the snooping agent which has a modified copy of the requested cache line behaves similarly whether the request is a read request or a write request. That is, the snooping agent asserts a HITM# signal, deasserts a HIT# signal, and places the referenced cache line onto the bus at the appropriate time. Thus, due to this similarity, one embodiment of the present invention manages write data transfers, partial write data transfers and read requests with a minimal amount of logic complexity in every agent.

Figure 29:
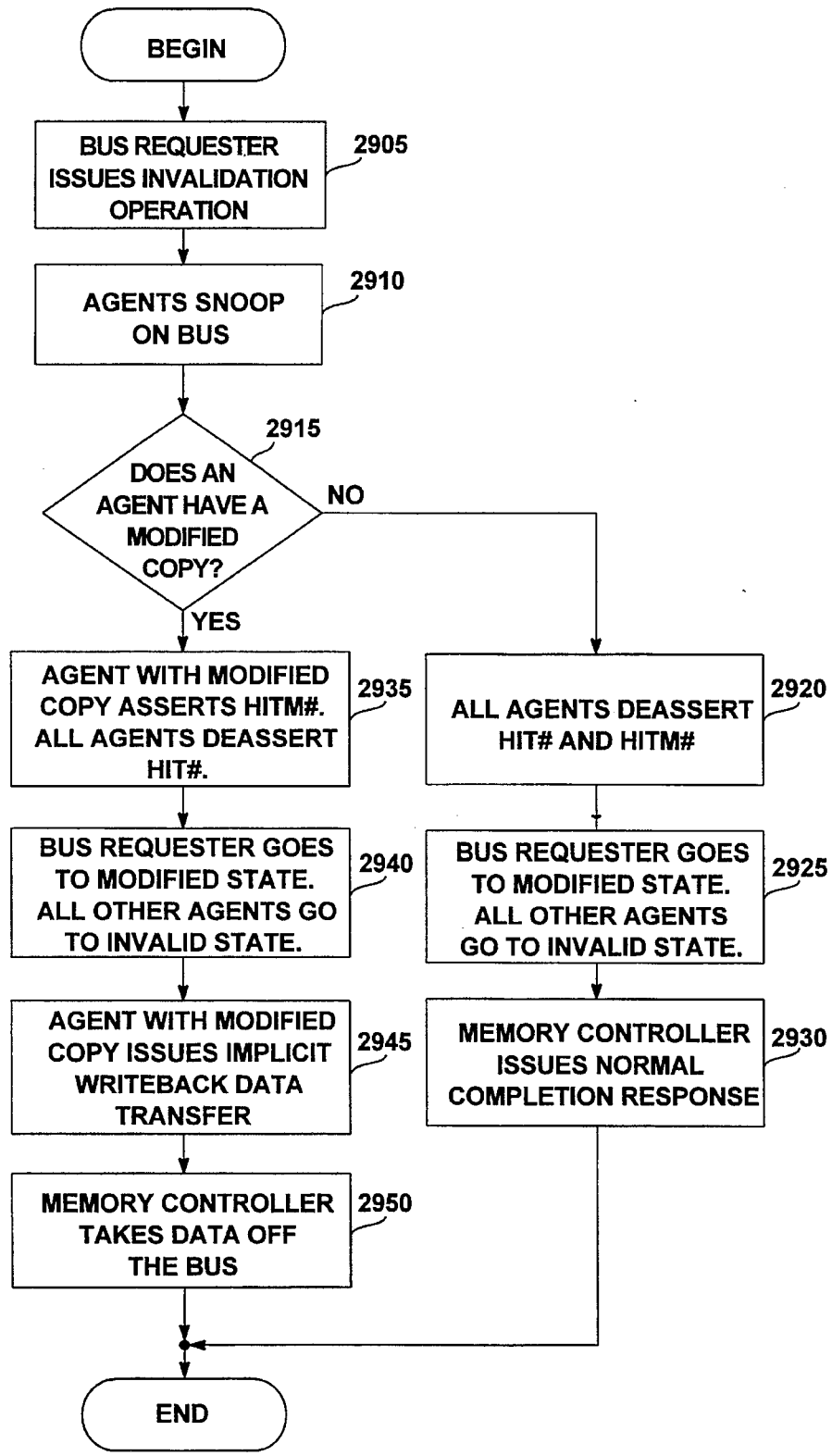
FIG. 29 is a flowchart describing the steps for performing a cache line invalidation operation on a pipelined bus in one embodiment of the present invention.

FIG. 29 shows a flowchart describing the steps followed by one embodiment of the present invention during an invalidate cache line request. As described above in FIG. 22, the requesting agent issues a request onto the bus during the Request Phase, step 2905. The request shown in FIG. 29 is an invalidation request for a cache line. That is, the processor is issuing a request to invalidate a particular cache line in every other cache. This might be done, for example, if the processor has a copy of the cache line in its cache in shared state and desires to write to it; the processor could invalidate all other cache lines and then update its cache state to modified and write to the cache line in its own cache.

As above, all other agents on the bus do a snoop lookup, step 2910, to determine whether one has a copy of the cache line in modified state, step 2915. In the event no agent on the bus has a modified copy of the cache line, each agent deasserts HIT# and HITM# signals, step 2920. The invalidation request then proceeds with each agent on the bus, except the processor, invalidating its copy of the cache line and cache line ownership going to the processor (that is, the cache line in the processor is changed to modified state), step 2925. The memory controller then issues a normal completion response to the processor, step 2930, and processing continues.

However, if an agent on the bus, such as another processor, has a modified copy of the requested cache line, then other processor asserts a HITM# signal and deasserts a HIT# signal during the Snoop Phase, step 2935. All other agents on the bus also deassert a HIT# signal during the Snoop Phase. The assertion of the HITM# signal informs the processor that another agent on the bus has current ownership of the cache line. Thus, ownership of the cache line must be transferred.

As above, the internal cache states of the processors are modified in the Snoop Phase. Thus, the cache line in the processor is changed to modified state and the cache line in the other processor is changed to invalid state, step 2940. Therefore, in step 2940 the processor obtains ownership of the cache line even though the actual data has not been transferred yet.

The updating of cache states in the Snoop Phase guarantees that modified data is not lost. Thus, if the next request on the bus is an access to the same cache line, the processor asserts a HITM# signal because it has ownership of the cache line. By the time data transfer must occur for this next request, the processor will have the most recent version of the cache line in its cache, as discussed above.

In the Data Transfer Phase, the other processor issues an Implicit Writeback Data Transfer of the cache line, step 2945. This transfer is the entire cache line being transferred to the processor. In one embodiment of the present invention, the other processor places the cache line onto the bus in response to a signal from the memory controller indicating it is ready for a data transfer. The memory controller issues this signal during the response phase when it has an available cache line buffer in which to place the cache line. The processor takes the data off the bus, and the memory controller snarfs the data off the bus, step 2950. Thus, the cache line in the processor is now in modified state and the main memory also has the most recent version of the modified cache line. Alternatively, main could change its cache state to exclusive state since the main memory also has a valid copy.

As discussed above with reference to FIGS. 23–28, in a multiple-bus hierarchy the cluster manager acts as the memory controller on the bus for purposes of the discussion related to FIG. 29. For example, cluster manager takes the data off the bus in step 2950. In order to invalidate a cache line, the cache line for all caches in all clusters is invalidated. Thus, the situation could arise where the cache line being invalidated is also contained within the cluster and access must be made to the next level bus in order to invalidate it. In such a situation, the cluster manager either defers or retries the request, depending on whether ownership of the next level bus is available. In this situation, the global observation of the transaction, which would have occurred at step 2925, is deferred as discussed above.

In an alternate embodiment of the present invention, the snooping agent (i.e., the agent which has a modified copy of the requested cache line) merges the data rather than memory controller. In the event of a partial write data transfer, a processor takes the partial write data off file bus. The processor then transfers the cache line from its own cache into a temporary storage buffer and merges the cache line with the partial write data. Thus, the processor maintains a modified copy of the cache line and alleviates the memory controller of the data merge responsibility.

Upon completion of the merge, the processor has two options: the cache for the processor may be updated or the cache line may be written to the main memory. If the processor updates the cache, one embodiment entails continuously updating the temporary buffer and writing the buffer contents to cache memory only on a miss to the temporary buffer. Thus, the processor efficiently responds to multiple requests for the same cache line.

In the second option, the processor updates the main memory. Thus, upon completion of the merge operation the processor transfers the cache line over the bus to the main memory. This transfer is a separate transaction, and thus is accomplished by arbitrating for the bus and issuing a write to memory request in the Request Phase when granted access to the bus.

Thus, it can be seen that according to the present invention, cache consistency is maintained in a pipelined bus system. In one embodiment, memory accesses are satisfied in a single transaction, regardless of whether the data accessed is contained in a main memory unit of the bus or a cache memory within an agent on the bus.

It should be understood by those skilled in the art that although the particular embodiments shown above discuss read, write and invalidate operations, the present invention is not limited to these operations. Other operations which may be issued over the bus are also within the scope and spirit of the present invention.

Whereas many alterations and modifications of the present invention will no doubt be comprehended a person skilled in the art: after having read the foregoing description, it is to be understood that the particular embodiments shown and described by way of illustration are in no way intended to be considered limiting. Therefore, references to details of the particular embodiments are not intended to limit the scope of the claims which in themselves recite only those features regarded as essential to the invention.

Thus, a method and apparatus for supporting read, write, and invalidation operations to memory which maintain cache consistency have been described.

What is claimed is:

1. A computer system including:

a bus;

a multi-level memory system coupled to the bus;

a CPU coupled to the bus and to the multi-level memory system, and including,
a cache consistency mechanism for ensuring consistency of data among various level(s) of cache within the multi-level memory system, the cache consistency mechanism including,
an external bus request queue for ensuring that requests to a same address are issued and serviced on the bus according to a predetermined memory ordering scheme, wherein the external bus request queue maintains status information regarding both read and write requests which are to be issued to various levels of the multi-level memory system.

2. The computer system of claim 1 wherein the external bus request queue comprises:

a FIFO for queuing external bus requests.

3. A method of operating a computer system to maintain memory consistency, the computer system including a pipelined external bus, one or more CPUs coupled to the external bus and including an external bus request queue, a memory system including a main memory and one or more levels of cache and coupled to the external bus, the method comprising the steps of:

executing a program on the CPU, the program including a plurality of memory data requests which the program expects will be serviced according to a predetermined ordering, wherein the plurality of memory data requests includes both read and write requests;

issuing the plurality of data requests onto the external bus in a pipelined ordering;

queuing the issued data requests in entries of the external bus request queue to monitor status information regarding each issued data request; and updating the entries to maintain memory consistency, ensure that each request receives current data, and service requests according to the predetermined ordering.

4. The method of claim 3 wherein the CPU includes a bus agent (DCU, IFU) having L1 cache memory, and wherein:

the issuing step includes the bus agent issuing a request specifying given data and indicating that it has not looked in the L1 cache for the given data; and the method further includes the step of, responsive to the bus agent indicating that it has not looked in the L1 cache, self-snooping the L1 cache at a later time.

5. The method of claim 4 wherein the external bus request queue includes a FIFO having a start and an end, wherein:

the queuing step includes entering requests at the start of the FIFO;

the updating step includes advancing requests from the start toward the end of the FIFO; and the method further comprises the steps of,
looking for same address conflicts between a current request in the external bus request queue and a previously issued request which has been entered into the external bus request queue and has passed an L2 cache, and
if a same address conflict is found, blocking the current request by sending it back to the start of the FIFO.

6. An apparatus for use in a computer system having a multi-level memory system, the apparatus comprising:
a cache consistency mechanism for ensuring consistency of data among various level(s) of cache within the multi-level memory system, the cache consistency mechanism including,
an external bus request queue for ensuring that requests to a same address are issued and serviced on the bus according to a predetermined memory ordering scheme, wherein the external bus request queue maintains status information regarding both read and write requests which are to be issued to various levels of the multi-level memory system.

7. The apparatus of claim 6 wherein the external bus request queue comprises:
a FIFO queue for queuing external bus requests.

8. The apparatus of claim 6, further comprising:
a bus agent having an L1 cache memory; and
a self-snooping logic for self-snooping the L1 cache memory at a later time in response to a request received from the bus agent which indicates that it has not looked in the L1 cache memory.

9. The apparatus of claim 6, further comprising:
a control logic, coupled to the external bus request queue, to look for same address conflicts between a current request in the external bus request queue and a previously issued request which has been entered into the external bus request queue and has passed an L2 cache memory; and
blocking logic, coupled to the external bus request queue and the control logic, to block the current request.

10. The apparatus of claim 9, wherein the external bus request queue includes a FIFO queue having a start and an end, and wherein the blocking logic is for blocking the current request by sending the current request to the start of the FIFO queue.

11. An apparatus for use in a computer system to maintain memory consistency, the computer system including a pipelined external bus, one or more CPU's coupled to the external bus and including an external bus request queue, a memory system including a main memory and one or more levels of cache memory and coupled to the external bus, the apparatus comprising:
means for executing a program on the CPU, the program including a plurality of data requests which the program expects will be serviced according to a predetermined ordering, wherein the plurality of memory data requests includes both read and write requests;
means for issuing the plurality of data requests onto the external bus in a pipelined ordering;
means for queuing data requests to monitor status information regarding each issued data request; and
means for updating the entries to maintain memory consistency, ensure that each request receives current data, and service requests according to the predetermined ordering.

12. The apparatus of claim 11, wherein the CPU includes a bus agent (DCU,IFU) having L1 cache memory, and wherein:
the means for issuing includes means for the bus agent issuing a request specifying given data and indicating that it has not looked in the L1 cache memory for the given data; and
the apparatus further including means, responsive to the bus agent indicating that it has not looked in the L1 cache memory, for self-snooping the L1 cache memory at a later time.

13. The apparatus of claim 12 wherein:
the means for queuing includes a FIFO having a start and an end;
the means for updating includes means for advancing requests from the start toward the end of the FIFO; and
the apparatus further comprises,
means for entering requests at the start of the FIFO;
means for looking for same address conflicts between a current request in the FIFO and a previously issued request which has been entered into the FIFO and has passed an L2 cache, and
means for blocking, if a same address conflict is found, the current request by sending it back to the start of the FIFO.

* * * * *